(12) United States Patent
Dowski, Jr. et al.

(10) Patent No.: US 7,995,853 B2
(45) Date of Patent: Aug. 9, 2011

(54) OPTIMIZED IMAGE PROCESSING FOR WAVEFRONT CODED IMAGING SYSTEMS

(75) Inventors: Edward Raymond Dowski, Jr., Lafayette, CO (US); Gregory Edward Johnson, Boulder, CO (US); Ashley K. Macon, Longmont, CO (US); Hans B. Wach, Longmont, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 952 days.

(21) Appl. No.: 11/929,981

(22) Filed: Oct. 30, 2007

(65) Prior Publication Data

US 2008/0107354 A1    May 8, 2008

Related U.S. Application Data

(63) Continuation of application No. 10/376,924, filed on Feb. 27, 2003, now Pat. No. 7,379,613.

(60) Provisional application No. 60/360,147, filed on Feb. 27, 2002.

(51) Int. Cl.
*G06K 9/40* (2006.01)
*G06K 9/64* (2006.01)
*G01B 9/02* (2006.01)

(52) U.S. Cl. ........ 382/255; 382/260; 382/275; 382/279; 356/521

(58) Field of Classification Search .................. 382/254, 382/255, 260, 275, 279; 356/521; 359/708, 359/728
See application file for complete search history.

(56) References Cited

U.S. PATENT DOCUMENTS

| 4,837,451 | A |   | 6/1989  | Pinson |
|-----------|---|---|---------|--------|
| 4,928,300 | A |   | 5/1990  | Ogawa et al. |
| 5,006,989 | A | * | 4/1991  | Parker ............................. 701/20 |
| 5,168,375 | A |   | 12/1992 | Reisch et al. |
| 5,179,273 | A |   | 1/1993  | Lisson et al. |
| 5,710,839 | A |   | 1/1998  | Cok |
| 5,748,371 | A |   | 5/1998  | Cathey, Jr. et al. |

(Continued)

FOREIGN PATENT DOCUMENTS

JP       10-288514       10/1998

(Continued)

OTHER PUBLICATIONS

Eun et al. "An efficient 2-D convolver chip for real-time image processing." Proceedings of the Design Automation Conference 1998 (IEEE), pp. 329-330.

(Continued)

*Primary Examiner* — Brian Q Le
(74) *Attorney, Agent, or Firm* — Lathrop & Gage LLP

(57) ABSTRACT

An image processing system includes a wavefront coding element that codes a wavefront forming an optical image, a detector for converting the optical image to a data stream and an image processor for processing the data stream with a reduced set filter kernel to reverse effects of wavefront coding and generate a final image. The reduced set filter kernel may include a reduced set distributive filter kernel. An image processing method includes wavefront coding a wavefront that forms an optical image, converting the optical image to a data stream, and processing the data stream with a reduced set filter kernel to reverse effects of wavefront coding and generate a final image. The processing consists of processing the image, for each pixel, with filter tap logic consisting of a shifter.

17 Claims, 47 Drawing Sheets

U.S. PATENT DOCUMENTS

| | | | |
|---|---|---|---|
| 5,751,340 A | 5/1998 | Strobl et al. | |
| 2003/0142877 A1 | 7/2003 | George et al. | |

FOREIGN PATENT DOCUMENTS

| | | |
|---|---|---|
| JP | 11-144451 | 5/1999 |
| JP | 2000-005127 | 1/2000 |
| JP | 2002-014006 | 1/2002 |
| JP | 2002-033941 | 1/2002 |
| JP | 2002-049008 | 2/2002 |

OTHER PUBLICATIONS

Wach, Hans B., et al., "Channel Reduction and Applications to Image Processing." Applied Optics, vol. 39, No. 11, pp. 1794-1798, Apr. 10, 2000.

Wach, Hans B., et al., "Control of Chromatic Focal Shift Through Wave-Front Coding," Applied Optics., vol. 37, No. 23, pp. 5359-5367, Aug. 10, 1998.

Dowski, Jr., Edward, et al., "Marrying Optics & Electronics," Spie's OE Magazine, pp. 42-43, Jan. 2002.

Bradburn, Sara, et al, "Realizations of Focus Invariance in Optical-Digital Systems With Wave Front Coding," Applied Optics, vol. 36, No. 5, pp. 9157-9166, Dec. 10, 1997.

Dowski, Jr., Edward R., et al., "Wavefront Coding: A Modern Method of Achieving High Performance and/or Low Cost Imaging Systems," SPIE Conference on Current Developments in Optical Design and Optical Engineering VIII, Denver, Colorado, SPIE vol. 3779, pp. 137-145, Jul. 1999.

Related PCT Application Serial No. PCT/US03/06289, International Search Report dated Jul. 15, 2003.

Related European Application Serial No. 03711338, Preliminary Amendment filed upon entry dated Sep. 8, 2004.

Related European Application Serial No. 03711338, 109 and 110 Notice dated Oct. 5, 2004.

Related European Application Serial No. 03711338. Response to 109 and 110 Notice filed Nov. 5, 2004.

Related European Application Serial No. 03711338, Article 92(2) issued Oct. 14, 2005.

Related European Application Serial No. 03711338, Response to 92(2) filed Apr. 21, 2006.

Related European Application Serial No. 03711338, Notice of Grant issued May 15, 2007.

U.S. Appl. No. 10/376,924, Selected pages from Image File Wrapper, Sep. 22, 2006 through Jan. 24, 2008, 116 pages.

U.S. Appl. No. 11/929,941, Office Action mailed Jan. 23, 2008, 16 pages.

U.S. Appl. No. 11/929,941, Response to Office Action filed Jul. 23, 2008, 14 pages.

U.S. Appl. No. 11/929,941, Office Action mailed Oct. 30, 2008, 23 pages.

U.S. Appl. No. 11/929,941, Response to Office Action filed Jan. 30, 2009, 20 pages.

Chinese Application No. 03809371.5 Office Action with English Translation, May 26, 2006, 13 pages.

Chinese Application No. 03809371.5 English Translation of Response to First Office Action, filed Oct. 10, 2006, 7 pages.

Chinese Application No. 03809371.5 Response to First Office Action with English Translation, filed Oct. 13, 2006, 44 pages.

Chinese Application No. 03809371.5 Office Action with English Translation, Dec. 1, 2006, 7 pages.

Chinese Application No. 03809371.5 Response to Second Office with English Translation, filed Feb. 15, 2007, 36 pages.

Chinese Application No. 03809371.5 Certificate of Patent, Sep. 19, 2007, 2 pages.

Chinese Application No. 200710136351.5 Office Action with English Translaction; Oct. 28, 2008; 8 pages.

Patent Abstracts of Japan, JP 06-030393, Casio Comput Co. Ltd., Apr. 2, 1994; 2 pages.

Patent Abstracts of Japan, JP 07-245709, Ricoh Co. Ltd., Sep. 19, 1995; 2 pages.

Patent Abstracts of Japan, JP 08-241068, Matsushita Electric Ind. Co. Ltd., Sep. 17, 1996; 2 pages.

Patent Abstracts of Japan, JP 08-313823, Olympus Optical Co. Ltd., Nov. 29, 1996; 2 pages.

European Application No. 07019276.0, Seach Report, Feb. 12, 2008, 4 pages.

European Application No. 03711338.8 Decision to Grant, Oct. 18, 2007; 2 pages.

Japanese Patent Application No. 2003-571784, Notice of Rejection with English Translation, Jul. 9, 2008; 9 pages.

* cited by examiner

Filtered with Generalized Integer Filter

Filtered with Reduced Set Power of Two Filter

Generalized Filter = [ 1  -3  6  -4  -2  -40  206  -22  -58  -10  -2  -1  -1  -1 ]
Reduced Set Filter = [ 1  -2  4  -2  -32  128  -16  -32  -8  -4  -1  -1  -1  -1 ]

Filtered with Reduced Set
Gradient Power of Two Filter

Filtered with Generalized Integer Filter

Generalized Filter = [ 1  -3   6  -4  -1  -32  -33  +256  206  -40  223  -33  -256  +1  +16  -58  -32  -1  -1  -1  -1 ]

Reduced Set Filter = [ 1  -2  +4  -1  -4  -1  +256  223  -22  -33  +1  +16  -10  -16  +8  -5  -8  0  -2  -1  -1  -1  +0  +0  -1 ]

Gradients are $+/-2^n$.

Each 2D PSF normalized to a constant volume

Each 2D PSF normalized to a constant peak value

OPTIMIZED IMAGE PROCESSING FOR WAVEFRONT CODED IMAGING SYSTEMS

CROSS-REFERENCE TO RELATED APPLICATIONS

This application is a continuation of, and claims priority to, commonly owned and U.S. patent application Ser. No. 10/376,924 filed 27 Feb. 2003 now U.S. Pat. No. 7,379,613, which claims priority to U.S. Provisional Patent Application No. 60/360,147 filed 27 Feb. 2002. Both of the above-identified patent applications are incorporated herein by reference.

BACKGROUND

Wavefront coding is a set of specialized aspheric optics, detection and signal processing. In the prior art, the signal processing is dictated by the aspheric optics such that the spatial blur caused by wavefront coding is removed. The aspheric optics "code" the wavefront so that the sampled image is relatively insensitive to misfocus-related aberrations. The intermediate image from the coded wavefront (i.e., the image sampled by the detector) is not sharp and clear. Signal processing processes data from the detector to remove the spatial blur caused by the aspheric optics, to "decode" wavefront coding.

By way of example, FIG. 1 shows one prior art wavefront coded optical imaging system 100. System 100 includes optics 101 and a wavefront coded aspheric optical element 110 that cooperate to form an intermediate image at a detector 120. Element 110 operates to code the wavefront within system 100. A data stream 125 from detector 120 is processed by image processing section 140 to decode the wavefront and produce a final image 141. A digital filter (a "filter kernel") 130 is implemented by image processing section 140. Filter kernel 130 consists of filter taps, or "weights," that are real or integer values with a maximum dynamic range due to the limits of processing hardware and software, for example 128-bit extended floating-point arithmetic, real number mathematics, and scaling/truncation of integer values. Scaling may for example include general series of partial products computations and accumulations.

In the prior art, optical element 110 and detector 120 do not necessarily match the available processing capability of image processing section 140; accordingly, image degradation may be noted within final image 141. If optical element 110 and detector 120 are matched to the available processing capability, it may require a very complex and costly hardware implementation in terms of detector capability, optical design of element 110, and/or computer processing architectures associated with image processing section 140.

SUMMARY OF THE INVENTION

As described herein below, wavefront coding imaging systems are disclosed with jointly optimized aspheric optics and electronics. In one example, the optics and electronics are jointly optimized for desired optical and/or mechanical characteristics, such as to control aberrations, minimize physical lens count, loosen mechanical tolerances, etc. In another example, the optics and electronics are jointly optimized with targeted emphasis on electronic parameters, so as to reduce the amount of silicon and/or memory required in hardware processing; this serves to optimize image quality in the presence of non-ideal detectors and/or to optimize image quality with a fixed hardware processing solution (e.g., a low cost solution).

An emphasis on optimizing electronic processing is for example important in imaging applications that involve high unit quantities and dedicated hardware processing. Examples of such applications include miniature cameras for cell phones, video conferencing, and personal communication devices. By jointly optimizing the optics and mechanics with the electronic parameters, high quality imaging systems are made that are inexpensive in terms of physical components, assembly, and image processing.

In certain aspects therefore, wavefront coded optical imaging systems are disclosed with optimized image processing. In one aspect, the image processing is optimized for hardware implementations in which digital filters have filter tap values that are a specialized, reduced set of integers. These integers in turn affect the processing hardware to reduce complexity, size and/or cost. Examples of such reduced set filter tap values include "power of two" values, sums and differences of power of two values, and filters where differences of adjacent filter values are powers of two. The restrictions associated with these example reduced sets operate to reduce the number of multiplications (or generalized partial products summations) associated with image processing.

The filter tap values may associate with the spatial location of the filter kernel. The dynamic range of the filter tap values may also be a function of the spatial position relative to positioning of the optical elements and wavefront coding element. In one example, values near the geometric center of the filter kernel have a larger dynamic range and values near the edge of the filter kernel have a smaller dynamic range, useful when the wavefront coding response tends to converge toward small values as distance from the kernal center increases. The filter tap values may also be a function of multi-color imaging channel characteristics since different wavelength bands respond differently when processed by a detector or a human eye.

By way of example, two easy to describe optical forms of wavefront coded optics that are suitable for system optimization herein include weighted sums of separable powers, $p(x,y)=\text{Sum } a_i [\text{sign}(x)|x|^{b_i}+\text{sign}(y)|y|^{b_i}]$, and the cosinusoidal forms $p(r,\theta)=\text{Sum } a_i\, r^{b_i}*\cos(c_i*\theta+\phi_i)$.

In one aspect, an image processing method is provided, including the steps of: wavefront coding a wavefront that forms an optical image; converting the optical image to a data stream; and processing the data stream with a reduced set filter kernel to reverse effects of wavefront coding and generate a final image.

The step of processing may include the step of utilizing a filter kernel that is complementary to an MTF of the optical image.

The steps of wavefront coding, converting and processing may occur such that the MTF is spatially correlated to mathematical processing of the data stream with the reduced set filter kernel.

In one aspect, the method includes the step of formulating the reduced set filter kernel to an MTF and/or PSF of the optical image resulting from phase modification of the wavefront through constant profile path optics.

The method may include the step of processing the data with a reduced set filter kernel consisting of a plurality or regions wherein at least one of the regions has zero values.

The step of wavefront coding may include the step of wavefront coding the wavefront such that a PSF of the optical image spatially correlates to the regions of the reduced set filter kernel.

In another aspect, the method includes the step of modifying one of the wavefront coding, converting and processing steps and then optimizing and repeating (in a design loop) one other of the wavefront coding, converting and processing steps. For example, the step of processing may include utilizing a reduced set filter kernel with a weighted matrix.

In another aspect, an image processing method is provided, including the steps of: wavefront coding a wavefront that forms an optical image; converting the optical image to a data stream; and processing the data stream with a color-specific filter kernel to reverse effects of wavefront coding and generate a final image.

In another aspect, an image processing method is provided, including the steps of: wavefront coding a wavefront that forms an optical image; converting the optical image to a data stream; colorspace converting the data stream; separating spatial information and color information of the colorspace converted data stream into one or more separate channels; deblurring one or both of the spatial information and the color information; recombining the channels to recombine deblurred spatial information with deblurred color information; and colorspace converting the recombined deblurred spatial and color information to generate an output image. The method may include a first step of filtering noise from the data stream. In one aspect, the method generates an MTF of the optical image such that spatial correlation exists with the first step of filtering noise. A second step of filtering noise may occur by processing the recombined deblurred spatial and color information. This second step of filtering noise may include the step of utilizing a complement of an MTF of the optical image.

In another aspect, an optical imaging system is provided for generating an optical image. A wavefront coding element codes a wavefront forming the optical image. A detector converts the optical image to a data stream. An image processor processes the data stream with a reduced set filter kernel to reverse effects of wavefront coding and generate a final image. The filter kernel may be spatially complementary to a PSF of the optical image. A spatial frequency domain version of the filter kernel may be complementary to an MTF of the optical image.

In another aspect, an electronic device is provided, including a camera having (a) a wavefront coding element that phase modifies a wavefront that forms an optical image within the camera, (b) a detector for converting the optical image to a data stream, and (c) an image processor for processing the data stream with a reduced set filter kernel to reverse effects of wavefront coding and generate a final image. The electronic device is for example one of a cell phone and a teleconferencing apparatus.

In another aspect, an image processing method includes the steps of: wavefront coding a wavefront with constant profile path optics that forms an optical image; converting the optical image to a data stream; and processing the data stream to reverse effects of wavefront coding and generate a final image.

DETAILED DESCRIPTION OF ILLUSTRATED EMBODIMENTS

Figure 2:
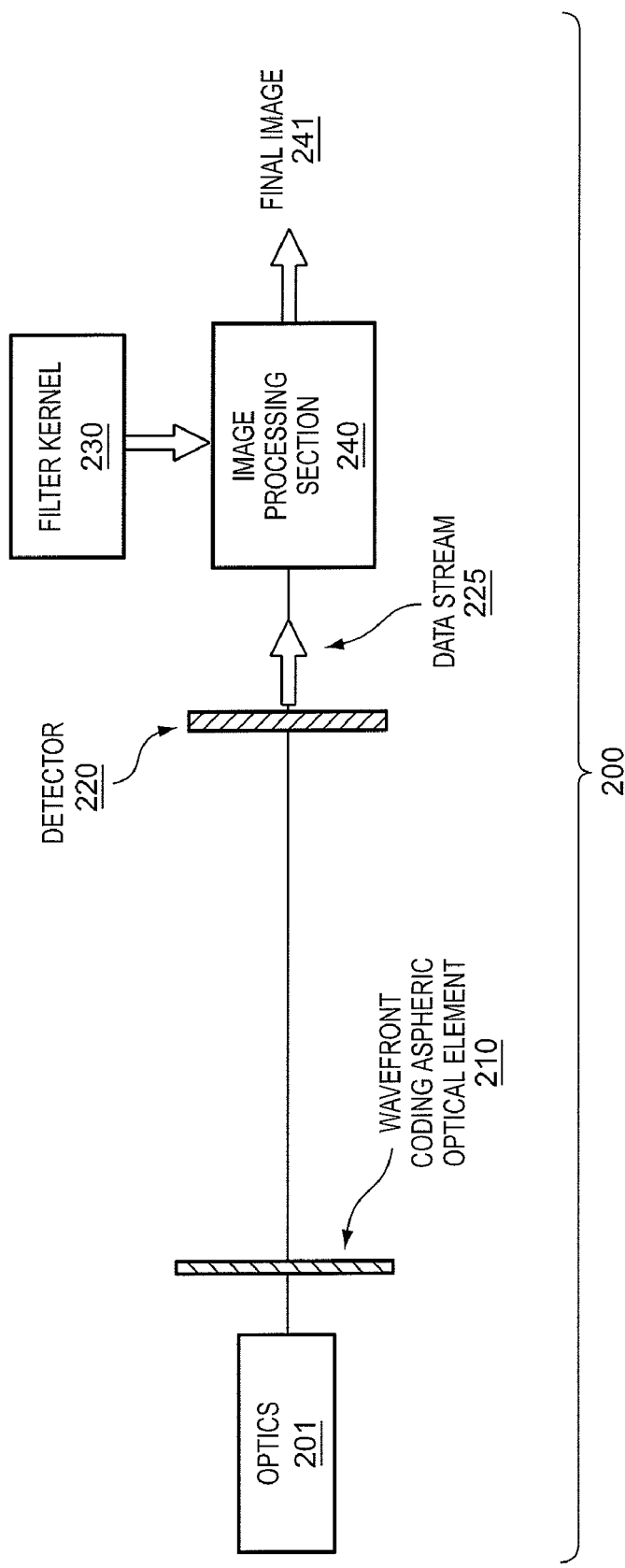
FIG. 2 shows one wavefront coded optical imaging system with optimized image processing.

FIG. 2 shows one wavefront coded optical imaging system 200 with optimized image processing. System 200 includes optics 201 and a wavefront coded aspheric optical element 210 that cooperate to form an intermediate image at a detector 220. Element 210 operates to code the wavefront within system 200; by way of example, element 210 is a phase mask that modifies phase of the wavefront. A data stream 225 from detector 220 is processed by image processing section 240 to decode the wavefront and produce a final image 241. System 200 has a filter kernel 230 with a reduced set of filter kernel values that optimally match the particular image processing implementation of image processing section 240. Filter kernel 230 may be constructed and arranged with the reduced set of kernel values such that a final image 241 of system 200 is substantially equivalent to final image 141 of system 100. As described in more detail below, certain examples of the reduced set of kernel values (i.e., tap or weight values) suitable for use with filter kernel 230 include: (i) powers of two, (ii) sums and differences of powers of two, (iii) a difference between adjacent taps restricted to a power of two, and (iv) taps with a range of values specified by spatial location or color of the image being processed.

Figure 3:
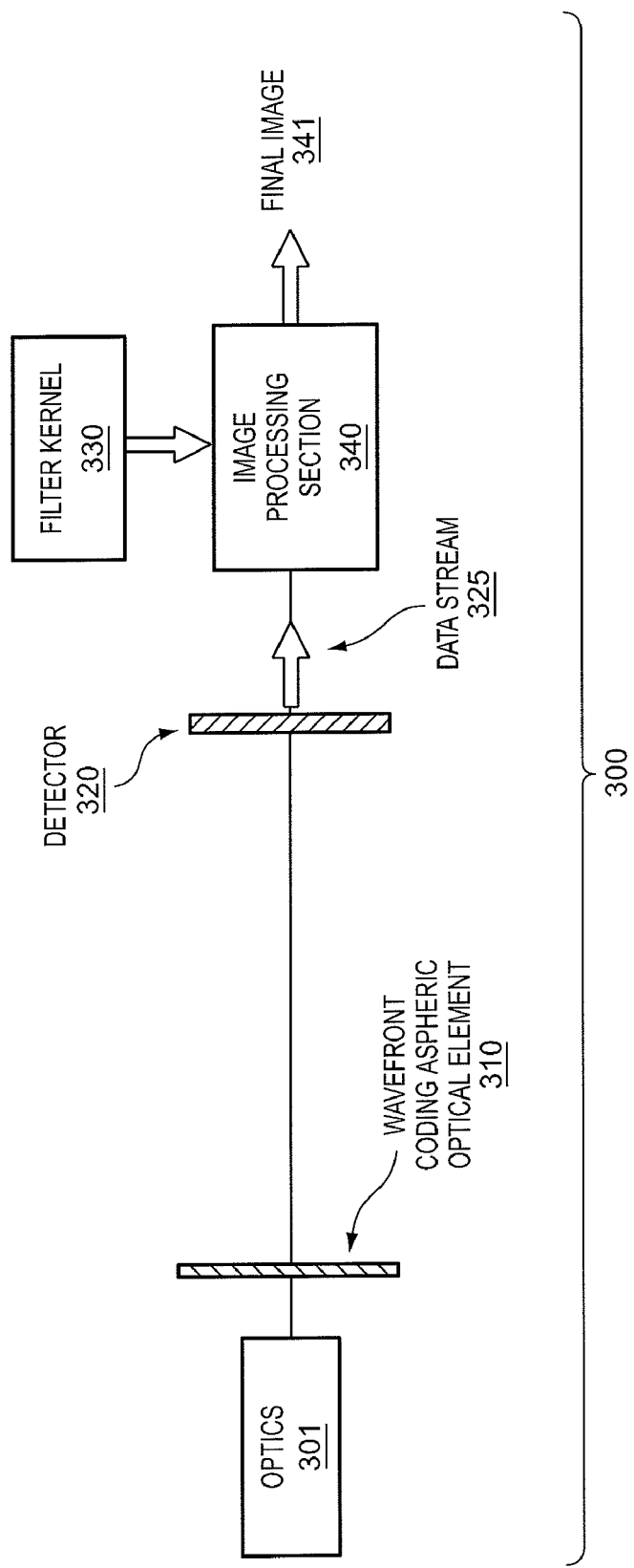
FIG. 3 shows one other wavefront coded optical imaging system with optimized image processing.

FIG. 3 shows another wavefront coded optical imaging system 300 with optimized image processing. System 300 includes optics 301 and a wavefront coded aspheric optical element 310 that cooperate to form an intermediate image at a detector 320. Element 310 operates to code the wavefront within system 300. A data stream 325 from detector 320 is processed by image processing section 340 to decode the wavefront and produce a final image 341. Image processing section 340 processes data stream 325 using a filter kernel 330. Detector 320, data stream 325, filter kernel 330 and image processing section 340 are constructed are arranged to optimize system 300 in terms of complexity, size, and/or cost. Final image 341 may be substantially equivalent to final image 141, FIG. 1. As described in more detail below, detector 320 and data stream 325 may include diagonal readouts for latter diagonal reconstruction, and/or multi-channel readouts for color filter array detectors. Diagonal reconstruction is useful when performing processing on color filter arrays since many color interpolation algorithms operate on diagonal components in the image. Color-specific filter kernels and processing offer reduced cost and improved performance as opposed to processing all colors equally. Filter kernel 330 may be the same as filter kernel 230 of FIG. 2; though those skilled in the art appreciate that filter kernel 230 may include effects of color and directional (e.g., diagonal) convolution, such as described below.

Figure 4:
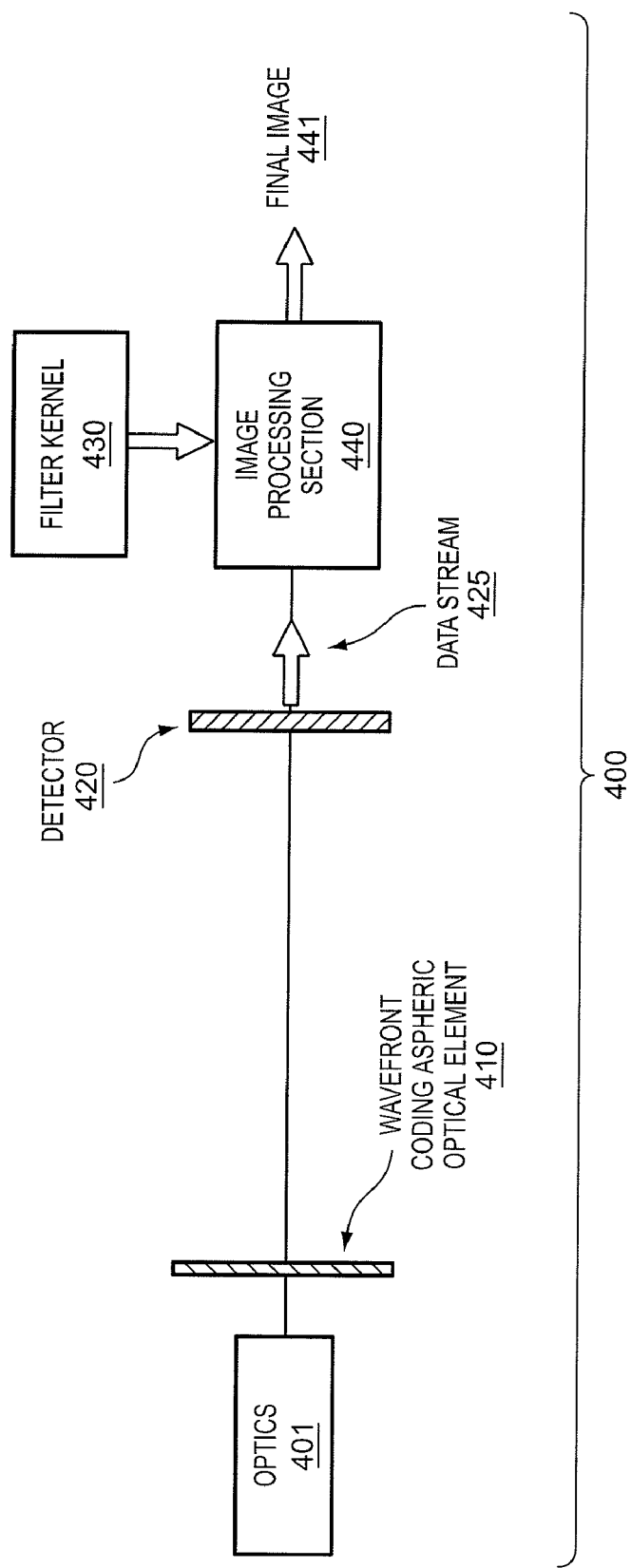
FIG. 4 shows one other wavefront coded optical imaging system with optimized image processing.

FIG. 4 shows another wavefront coded optical imaging system 400 with optimized image processing. System 400 includes optics 401 and a wavefront coded aspheric optical element 410 that cooperate to form an intermediate image at a detector 420. Element 410 operates to code the wavefront within system 400. A data stream 425 from detector 420 is processed by image processing section 440 to decode the wavefront and produce a final image 441. Image processing section 440 processes data stream 425 using a filter kernel 430. Image processing section 440 may be optimized such that final image 441 is substantially equivalent to final image 141, FIG. 1. Optics 401 and image processing section 440 are jointly optimized for alternative reconstruction algorithms, such as diagonal processing or processing with a reduced set of kernel values, that facilitate higher performance at lower cost, size, etc.

Figure 5:
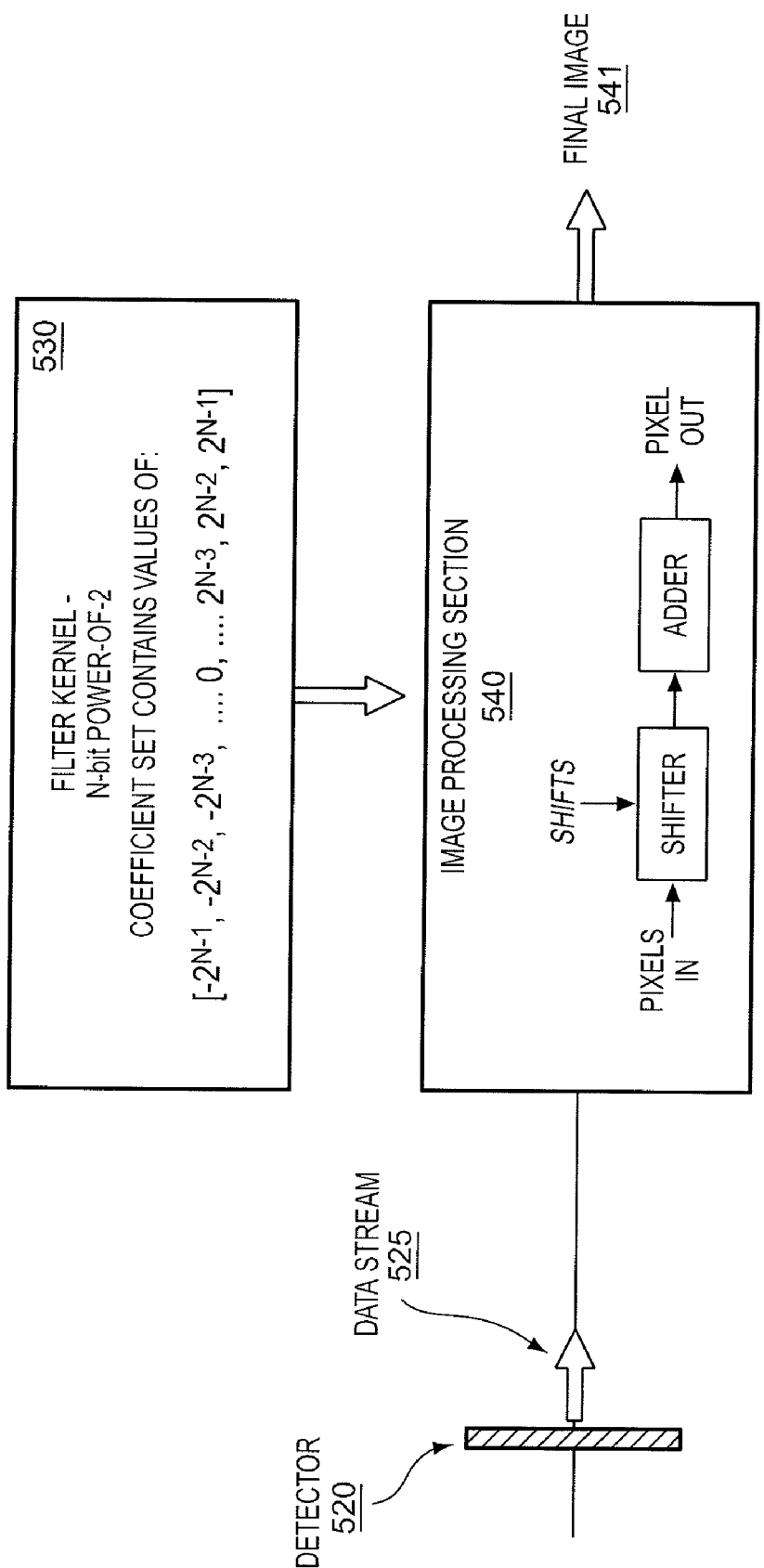
FIG. 5 schematically illustrates one filter kernel and associated image processing section.

FIG. 5 demonstrates one embodiment of a filter kernel 530 and an image processing section 540; kernel 530 and section 540 may for example be used within certain implementations of systems 200-400 above (e.g., to operate as filter kernel 430 and image processing section 440 of FIG. 4). As shown, a detector 520 captures an intermediate image of the optical system, similar to detector 220, 320, 420 above; data stream 525 is input to image processing section 540, similar to data stream 225, 325, 425 above. Filter kernel 530 is a reduced set filter kernel with values restricted to absolute values that are a power of two (including zero), such as $\{-2^N, \ldots, -4, -2, 1, 0, 1, 2, 4, \ldots, 2^N\}$ As described in more detail below, image processing section 540 implements the multiplication for filter kernel 530 through only shifting, as illustrated; only this operation is used since filter kernel 530 is limited to powers of two. In one embodiment, filter kernel 530 may be represented by the exponent or equivalently the shift for that coefficient.

More particularly, digital filtering is a sum of products for both linear and non-linear filtering. In the example of FIG. 5, filter kernel 530 is applied to the intermediate blurred image sampled by detector 520. Consider filter kernel 530 and the intermediate blurred image as separate two-dimensional objects, with filter kernel 530 centered on a particular image pixel output from detector 520. At every kernel overlapping with an image pixel, a product of the associated filter kernel value and image pixel is made; these products are then summed. For linear filtering, this sum is the final filtered image pixel. To complete the convolution, filter kernel 530 is then similarly centered over every other pixel in the entire image to produce a like value for each pixel. For linear filtering with an N×N two-dimensional filter kernel, therefore, each filtered image pixel has $N^2$ products and $N^2-1$ sums of these products. Wavefront coded optical imaging systems 200, 300, 400 may thus be optimized with respective optics and filter kernels matched to particular hardware implementations of the image processing section so as to reduce the number of multipliers, sums and related implementation costs. Note that a kernel value of 0 requires only storage, so controlling sparseness within a kernel also reduces implementation cost.

Figure 6A:
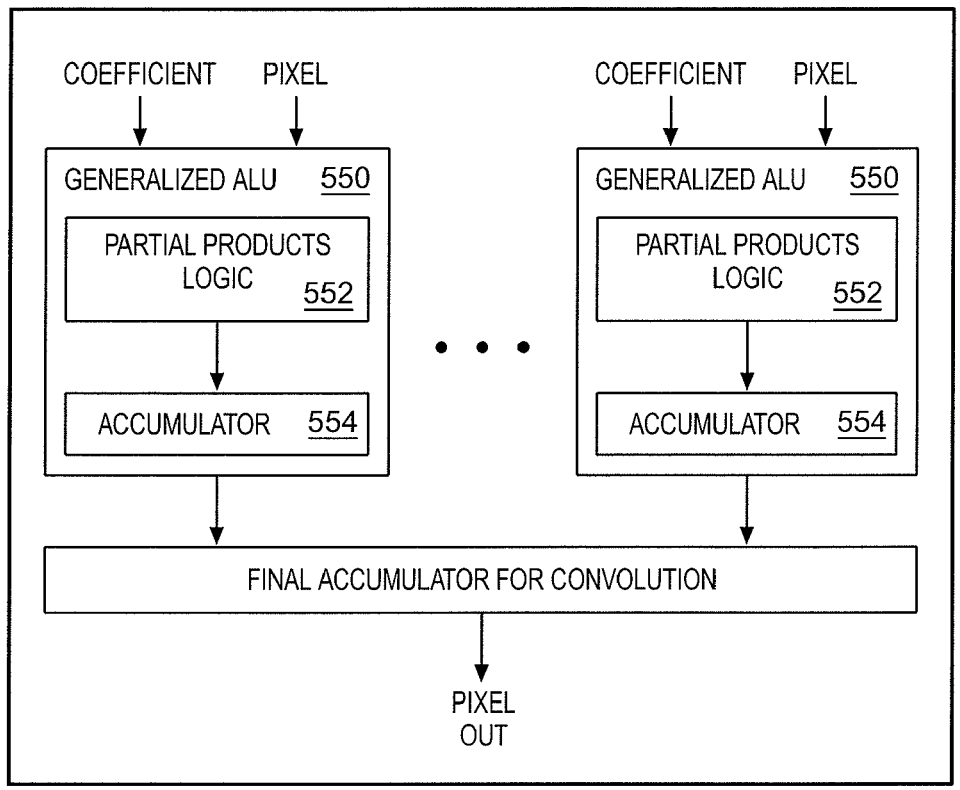
FIG. 6A shows a general set filter kernel and FIG. 6B shows one reduced set filter kernel.
Figure 6B:
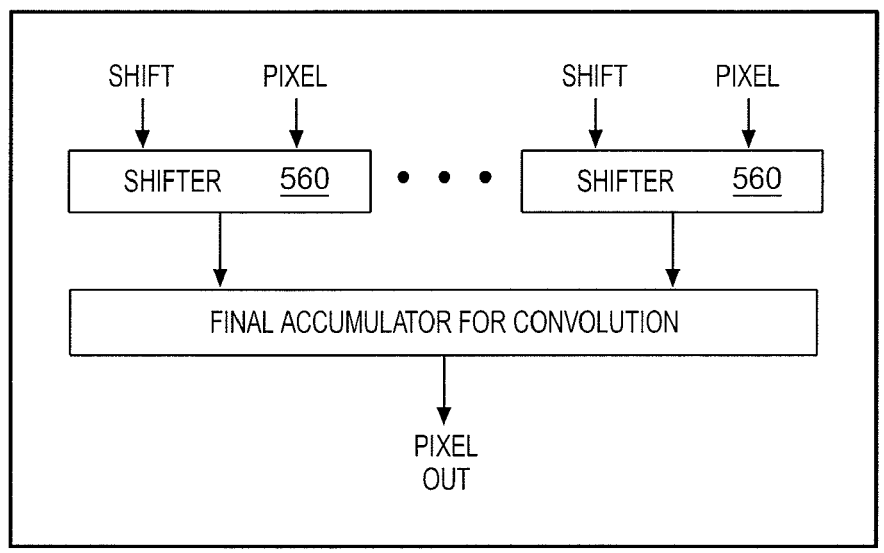

FIG. 6A and FIG. 6B show, respectively, a schematic diagram of a general set filter kernel and a schematic diagram of a reduced set filter kernel (based on power of two values). In FIG. 6A, the general set filter kernel is not limited to coefficients that are powers of two; it thus requires a generalized arithmetic logic unit ("ALU") 550 to perform the product of each filter coefficient (i.e., the kernel value) and the image pixel, as shown. The generalized ALU 550 performs an extended series of intermediate logic (known as partial products 552) and accumulations of the intermediate results (at accumulators 554) to form the final product (pixel out). In FIG. 6B, on the other hand, since the reduced set filter kernel is implemented with power of two kernel values, the arithmetic logic used to form the product may be a shifter 560. The amount of bits shifted for each image pixel is determined by the exponent of the power of two filter value. If for example the reduced set filter kernel consists of a sum of two power of two kernel values, then only two shifters and one adder are used in the arithmetic logic. Accumulations of all shifters 560 result in the final product (pixel out). The implementation of FIG. 6B is thus simplified as compared to the generalized ALU 550 of FIG. 6A since the shifting and adding logic is predefined as a shift-add sequence, and not as a generalized partial products summation.

Those skilled in the art appreciate that the arithmetic logic of FIG. 6B may favorably compare to other multiplication or generalized scaling implementations. One example is integer-based look-up-table (LUT) multiplication. Short bit-depth ALUs often implement scalar operands within the LUT to improve speed and simplify instruction sets since a series of partial product summations may consume more time and register space as compared to LUT resources. Like the general partial products accumulator multiplier, the LUT multiplier thus allocates resources for generalized scaling operations. The arithmetic logic of FIG. 6B, on the other hand, employs a reduced set of scaling operations through bit-shifting logic using power of two coefficients. The arithmetic logic of FIG. 6B is therefore many times smaller and faster than the generalized ALU 550 needed to process generalized filter kernel values.

Figure 7A:
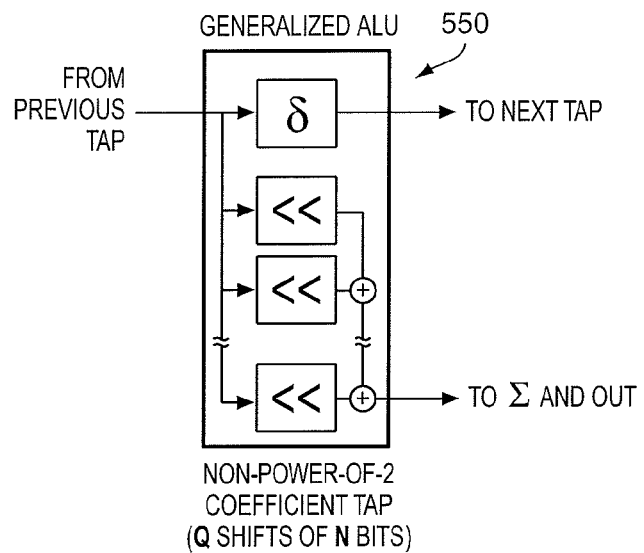
FIG. 7A shows one generalized logic ALU for a general set filter kernel.
Figure 7B:
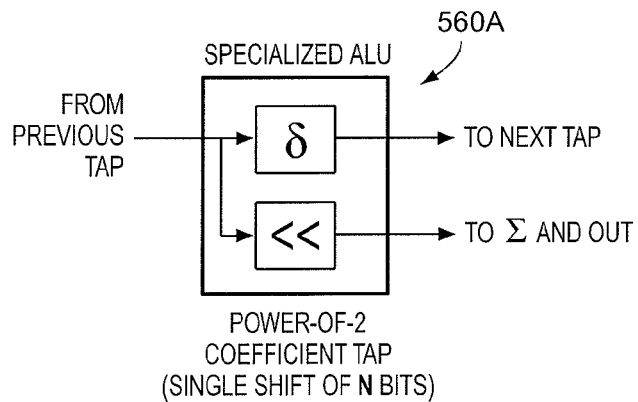
FIG. 7B and FIG. 7C show alternative specialized logic for a reduced set filter kernel.
Figure 7C:
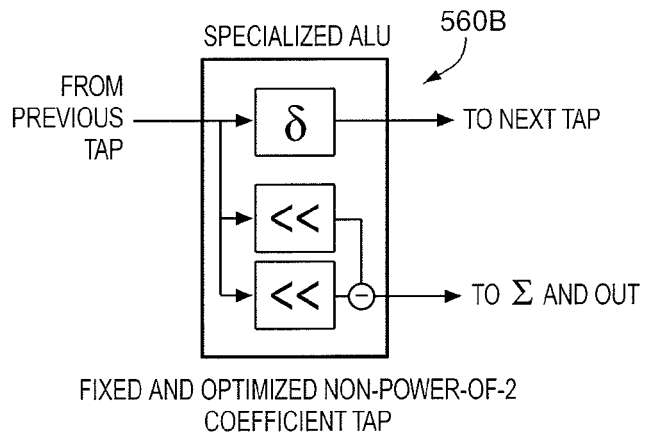

FIG. 7A, FIG. 7B and FIG. 7C show further detail of the arithmetic logic in FIG. 6A and FIG. 6B, to compare generalized and specialized arithmetic logical functions used at each tap in a linear filter. FIG. 7A schematically illustrates generalized ALU 550 and FIG. 7B and FIG. 7C schematically illustrate alternate configurations of specialized ALU 560. In this example, consider a generalized filter set kernel and a reduced set filter kernel that range over the positive integer values between 1 and 128. The generalized set filter kernel can have all values between 1 and 128. The reduced set filter kernel can only have the values in this range that are a power of two, i.e.: 1, 2, 4, 8, 16, 32, 64, and 128. Now consider the product of an image pixel p with a generalized set filter kernel with a value of 7. Using generalized ALU 550, a total of three shifts are required, (4+2+1)xp, or as in FIG. 7A, Q=3. These three shifts are needed to form partial products with factors 4 (shift of two), then 2 (shift of one), and then 1 (no shift). Implementation of a generalized set filter kernel with a value of 127 thus requires seven shifts and seven intermediate sums.

In comparison, using the reduced set filter kernel with power of two values, ALU 560A has just one shift. Even a more sophisticated implementation of generalized ALU 550, such as a vector machine or pipelined device, would likely require more resources than such a single shift.

Another specialized ALU 560B of FIG. 7C depicts a shift-subtract sequence for a known non-power of two coefficient. Continuing the previous example, if the coefficient is 127 for a pixel value p, then the sum of powers of two implementation of 127xp is: 64+32+16+8+4+2+1=127. In ALU 560B, therefore, the logic subtracts and enables the summation of negative powers of two to proceed as 128−1=127, requiring only shift and one subtraction to produce the final result (pixel out).

Figure 8:
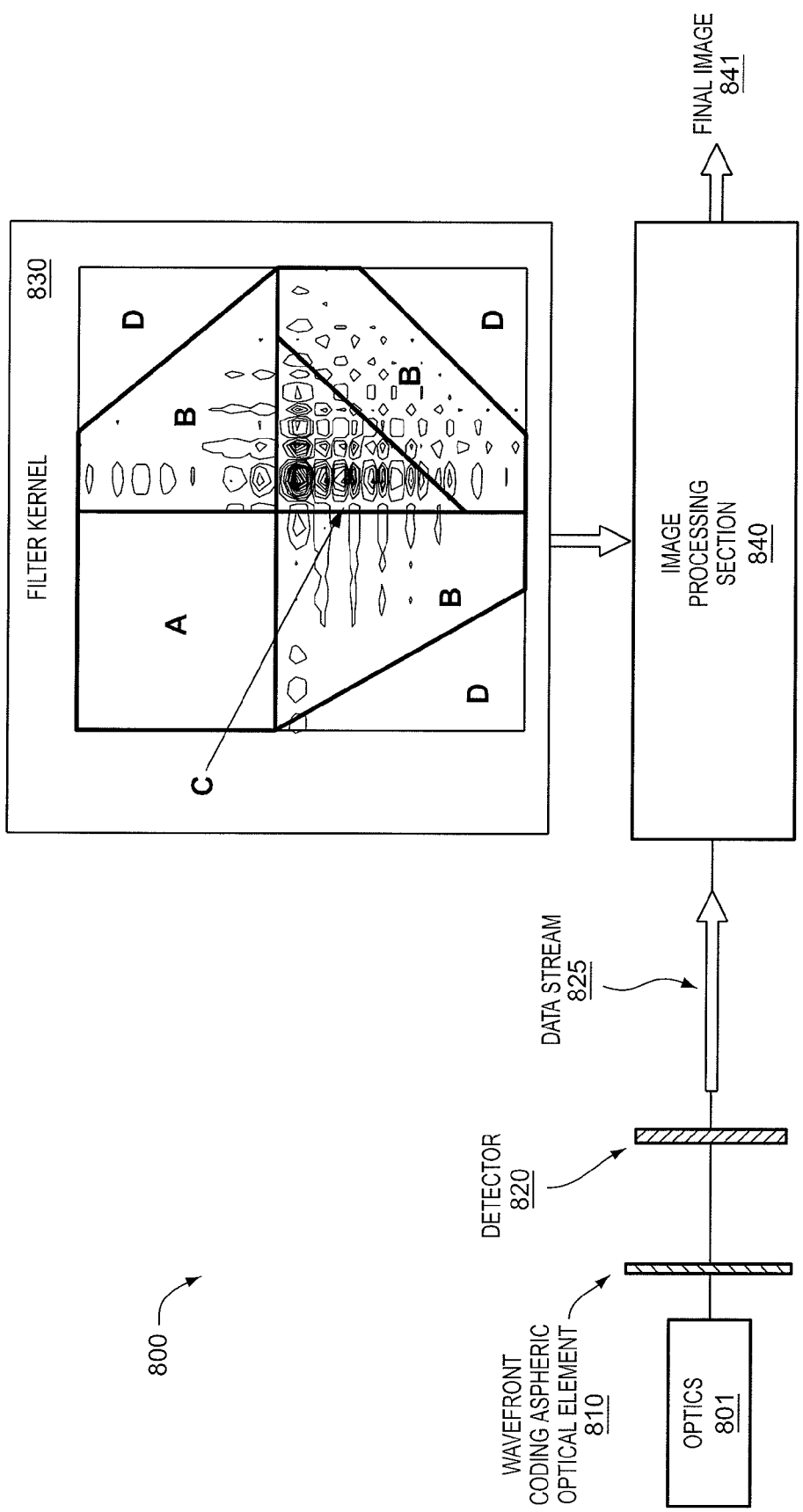
FIG. 8 shows one wavefront coded optical imaging system with an optimized filter kernel.

FIG. 8 describes one wavefront coded optical imaging system 800 in terms of one reduced set filter kernel. System 800 includes optics 801 and a wavefront coded aspheric optical element 810 that cooperate to form an intermediate image at a detector 820. Element 810 operates to code the wavefront within system 800. A data stream 825 from detector 820 is processed by image processing section 840 to decode the wavefront and produce a final image 841. Image processing section 840 processes data steam 825 using a filter kernel 830. By reducing the set of filter kernels in filter kernel 830, as a function of value and of spatial location, the hardware implementation of image processing section 840 may be optimized to optics 801, wavefront coding aspheric optical element 810 and detector 820. Regions A, B, C and D of filter kernel 830 illustrate the reduced geometric set. For this example, values of filter kernel 830 are restricted to zero value in regions A and D, to a moderate range of values (or dynamic range) in region B, and to a large range of values in region C. All particular kernel values within the prescribed ranges are efficiently implemented from power of two values, sums and differences of power of two values, etc.

Wavefront coded optical imaging system 800 is thus optimized to the reduced geometric set of filter kernels implemented in hardware (e.g., via filter kernel 830 and image processing section 840). Reduced geometric set kernels are particularly important in systems with specialized hardware processors and are used with a variety of different wavefront coded optics and detectors, or used with optics that change characteristics, like wavefront coded zoom optics. By way of example, optics 801 and optical element 810 adjust the depth of field and also adjust scaling within the kernel size. The prescribed dynamic range is therefore achieved by positioning the coefficient values of filter kernel 830 in appropriate spatial location. By designing optics 801 and optical element 810 such that the scaled kernel values lie within regions of adequate dynamic range, image processing section 840 is optimized for such optics 801 and element 810 given the constraints of the largest kernel. While different filter kernels have different values within the geometric regions A-D, the arrangement of values is optimized with respect to the capabilities of image processing section 840. By way of illustration, the rotation of optical element 810 (e.g., by 45 degrees) would dictate an equivalent rotation of the kernel; this would not be permitted since the B regions would then lie in a processing space with only near-zero coefficients rather than the moderate dynamic range of the B region coefficients. The rotation would only be permitted if the processing space and kernel space were both rotated.

Figure 9A:
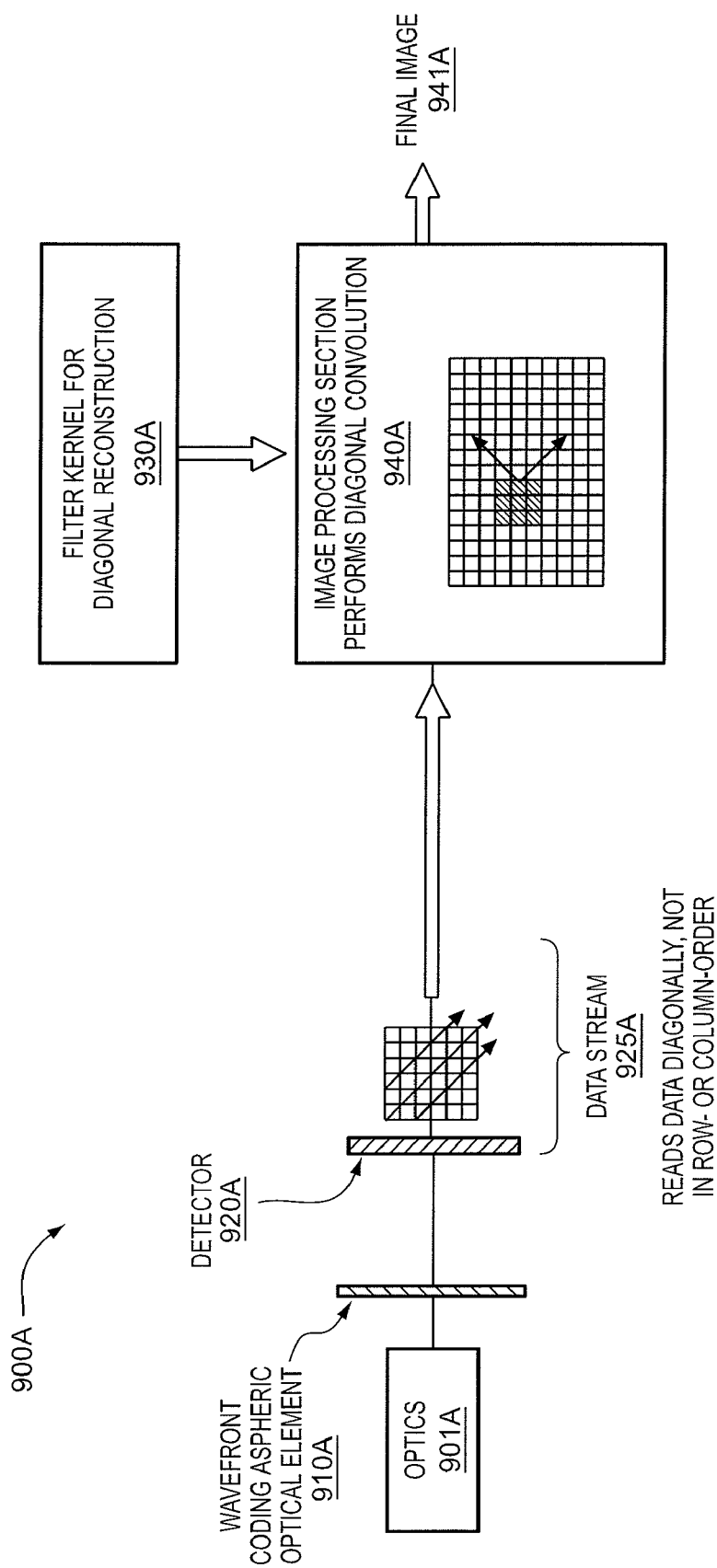
FIG. 9A shows one wavefront coded optical imaging system with optimized image processing and filter kernel using diagonal reconstruction.

FIG. 9A shows one wavefront coded optical imaging system 900A that is optimized for its detector and data stream readout. System 900A includes optics 901A and a wavefront coded aspheric optical element 910A that cooperate to form an intermediate image at a detector 920A. Element 910A operates to code the wavefront within system 900A. A data stream 925A from detector 920A is processed by image processing section 940A to decode the wavefront and produce a final image 941A. Image processing section 940A processes data stream 925A using filter kernel 930A. In this embodiment, detector 920A and data stream 925A are not read out in typical row and column format; rather, the output format is for example a diagonal readout. With such a diagonal readout format, image processing section 940A does not utilize rectilinear processing (e.g., rectangularly separable or rank-N processing) since the image format is not row and column based. If the data format is diagonal, optics 901A and wavefront coded aspheric optical element 910A are arranged such that the resulting image of a point object (or its point spread function) contains substantially all information along diagonals in a manner equivalent to the data stream diagonals. The corresponding filter kernel 930A and image processing section 940A then optimally act on image data 925A in a diagonal format, as shown, and either or both diagonals can be processed. In one embodiment, the diagonals are remapped to row-column order and operated on in a rectilinear fashion, and then remapped again in the diagonally ordered output sequence. In one implementation, optics 901A and optical element 910A are optimized with image processing section 940A to provide information in a geometrical orientation that reduces cost. One example is an optical element 910A that is rotated in a way that corresponds to the diagonal angle of data stream readout 925A.

Figure 9B:
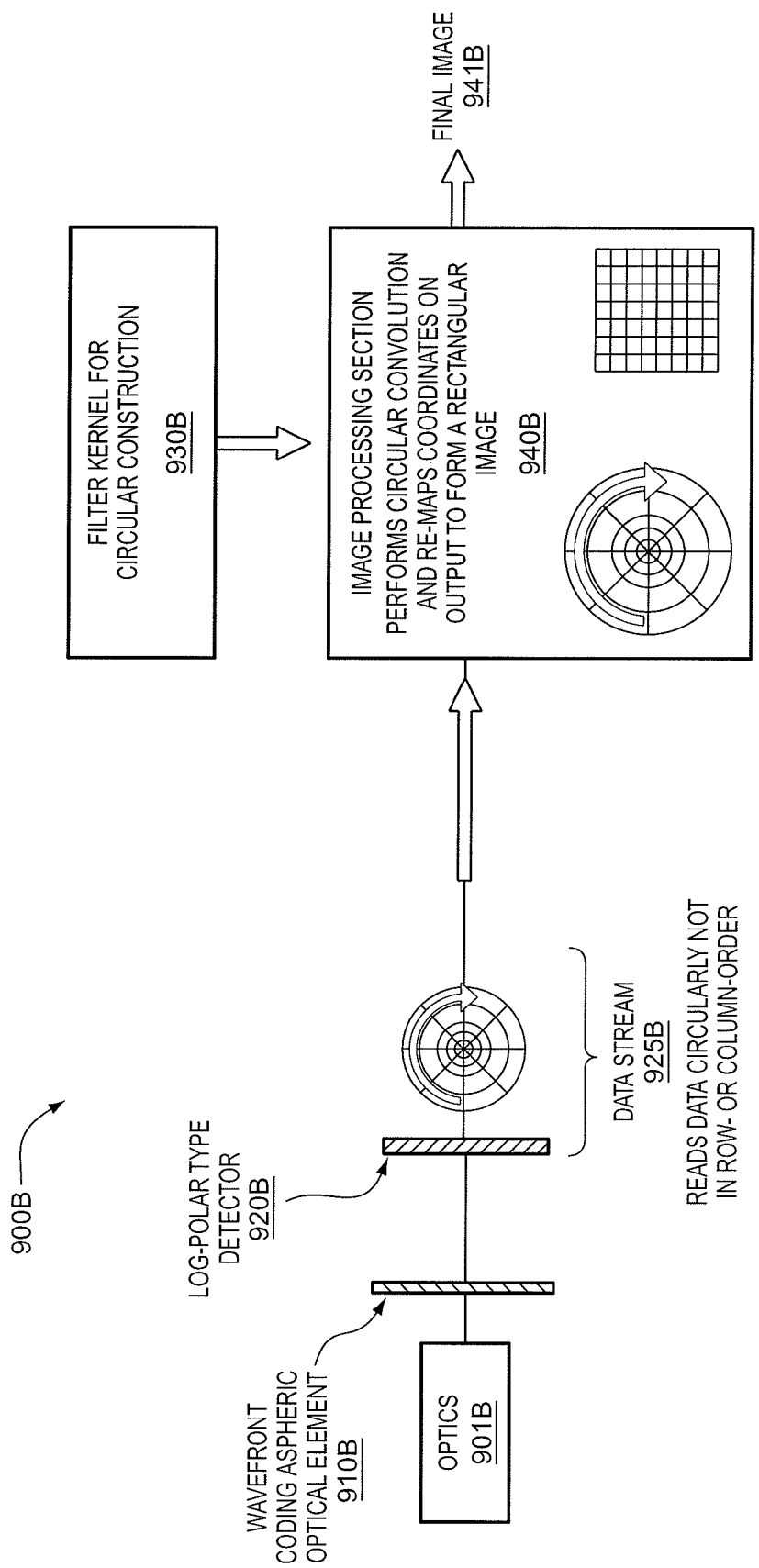
FIG. 9B shows one wavefront coded optical imaging system with optimized image processing and filter kernel using circular reconstruction.

FIG. 9B shows one wavefront coded optical imaging system 900B that is optimized for detector and data stream readout. System 900B includes optics 901B and a wavefront coded aspheric optical element 910B that cooperate to form an intermediate image at a detector 920B. Element 910B operates to code the wavefront within system 900B. A data stream 925B from detector 920B is processed by image processing section 940B to decode the wavefront and produce a final image 941B. Image processing section 940B processes data stream 925B utilizing a filter kernel 930B. Detector 920B and data stream 925B are not of typical rectilinear design and are not read out in typical row and column format. Rather, the output format is, for example, an annular or radial-based readout from a log-polar detector. With this readout format, image processing section 940B once again does not utilize rectilinear processing (e.g., rectangularly separable or rank-N processing) since the image format is not row and column based. If the data format is circular or annular, optics 901B and wavefront coded aspheric optical element 910B are arranged such that the resulting image of a point object (or its point spread function) contains substantially all information along annular or radial regions in a manner equivalent to data stream 925B. The corresponding filter kernel 930B and image processing section 940B then optimally act on image data 925B in a circular format, as shown. In one embodiment, the concentric rings are remapped to row-column order and operated on in a rectilinear fashion, and then remapped again in the circular ordered output sequence. In one embodiment, optics 901B and element 910B may be optimized with image processing section 940B to provide information in a geometrical orientation that reduces cost.

Figure 10:
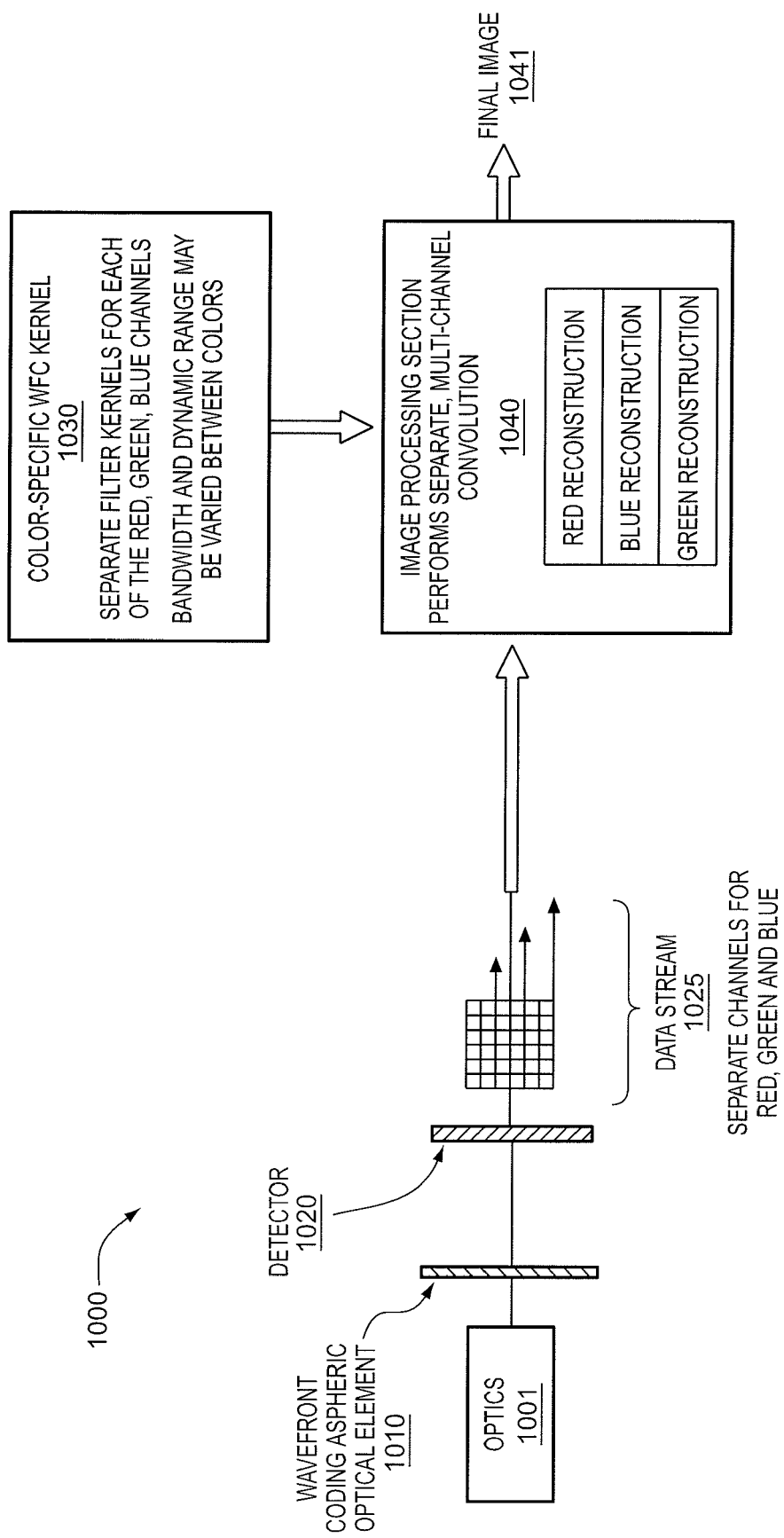
FIG. 10 shows one wavefront coded optical imaging system with color-optimized image processing and filter kernel.

FIG. 10 describes one wavefront coded optical imaging system 1000 optimized for color imaging. System 1000 includes optics 1001 and a wavefront coded aspheric optical element 1010 that cooperate to form an intermediate image at a detector 1020. Element 1010 operates to code the wavefront within system 1000. A data stream 1025 from detector 1020 is processed by image processing section 1040 to decode the wavefront and produce a final image 1041. Image processing section 1040 utilizes a color-specific filter kernel 1030 in processing data stream 1025. Optics 1001, aspheric optical element 1010, detector 1020, data stream 1025, filter kernel 1030 and image processing section 1040 cooperate such that each color channel has separate characteristics in producing final output image 1041. As a function of color, for example, wavefront coded optical imaging system 1000 takes advantage of the fact that a human eye "sees" each color differently. The human eye is most sensitive to green illumination and is least sensitive to blue illumination. Accordingly, the spatial resolution, spatial bandwidth, and dynamic range associated with filter kernel 1030 and image processing section 1040 in the blue channel can be much less than for the green channel—without degrading the perceived image 1041 as viewed by a human. By reducing the requirements as a function of color, the opto-mechanical and opto-electrical implementation of system 1000 is further optimized as compared to treating all color channels equivalently.

FIGS. 11A through 11D show related embodiments of a wavefront coded optical imaging system 1100 that is optimized with specialized filtering (i.e., within an image processing section 1140). Each system 1100A-1100D includes optics 1101 and a wavefront coded aspheric optical element 1110 that cooperate to form an intermediate image at a detector 1120. Element 1110 operates to code the wavefront within system 1100. A data stream 1125 from detector 1120 is processed by image processing section 1140 to decode the wavefront and produce a final image 1141. Image processing section 1140 processes data stream 1125 with a filter kernel 1130. Optics 1101, aspheric optical element 1110, detector 1120 and data stream 1125 cooperate such that a filter kernel 1130 utilizes specialized filtering and image processing section 1140 utilizes specialized taps 1145, providing desired cost savings and/or design characteristics.

More particularly, the optical systems of FIG. 11A-11D illustrate four separate optimizations that may take into account any given coefficient, or sub-group of coefficients, to best implement a particular configuration. Any combination or combinations of the embodiments in FIG. 11A through 11D can be implemented with an efficient image processing section.

Figure 11A:
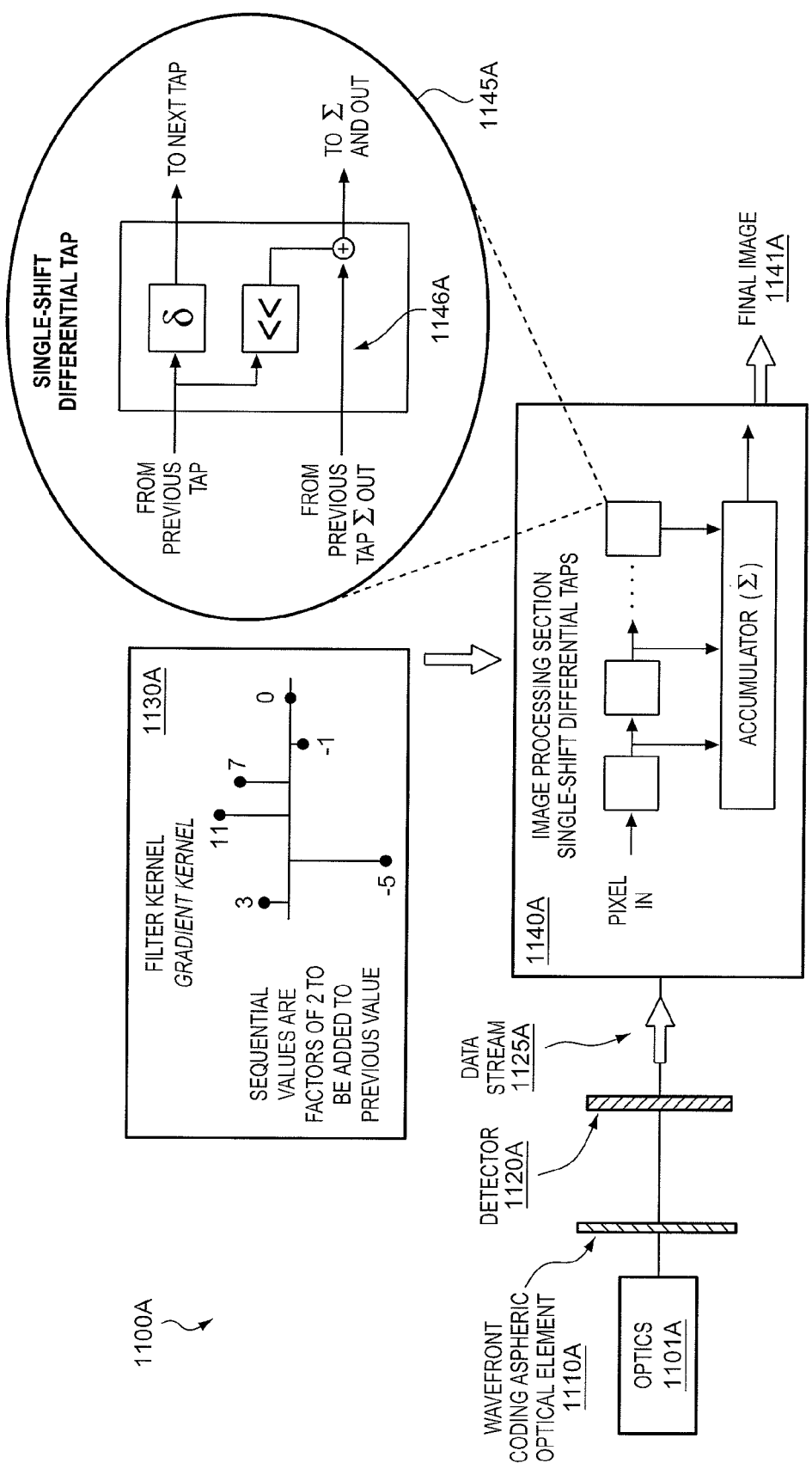
FIG. 11A shows one wavefront coded optical imaging system with optimized image processing with single-shift differential taps and a gradient filter kernel.

FIG. 11A specifically shows one embodiment of a gradient filtering operation. Optics 1101A, aspheric optical element 1110A, detector 1120A and data stream 1125A cooperate such that a filter kernel 1130A utilizes gradient filtering and image processing section 1140A utilizes specialized differential taps 1145A. The reduced set filter kernel of filter kernel 1130A is such that the difference between adjacent coefficients supports efficient implementation. For example, filter kernel 1130A and image processing section 1140A may be configured such that the difference between the first and second tap, between the second and third tap, between the third and faith fourth tap, and so on, are all powers of two (or another efficiently implemented value or set of values). If each absolute value difference of the filter kernel 1130A is a reduced set of power of two values, then the geometry of each implemented filter tap is a differential tap 1145A. Differential filter tap 1145A is an efficient implementation because only a single summation is required for any coefficient value in kernel 1130A. In prior art linear filtering, such as employed by FIR tap delay lines, only the original image pixel value is propagated to the next tap while the previous scaled value is not available to the next stage. Recovery of a previously scaled value or prior result 1146A in the differential tap 1145A allows a single addition or subtraction to generate the next value. Since the prior result 1146A is propagated to the next tap, a savings is further realized in the size and cost of the hardware implementation of image processor section 1140A. Other combinations of additions and subtractions can be combined in a differential tap 1145A; a differential tap 1145A is not limited to a single addition (or subtraction), rather those skilled in the art can recognize that any combination of additions and subtractions can be used in conjunction with carrying forward the prior result 1146A—it is the carrying-forward action that provides the ability to create an optimal solution, as opposed to the particular chosen design of the differential tap.

Numerical values provide an even clearer example for a single-adder differential tap. Consider the coefficient sequence [3, −5, 11, 7, −1, 0]. If the input pixel value is p, then the first tap generates 3p. The next tap generates −5p, or alternatively using 3p from the previous step, generates −8p and adds the two values to obtain 3p−8p=−5p. The coefficient II is similarly obtained from the previous −5p by adding 16p. Note that in this case a single shift (p to 16p) and a single addition achieve a scaling factor of 11×, whereas traditional implementation of 11× based on partial products requires 8+2+1, or two shifts and two summations. The example continues with 7p=(11p−4p) and −1p=(7p−8p). In some cases, the difference may be zero, in which case the gradient kernel falls to the detail of the scaling kernel which is described in FIG. 11B.

Figure 11B:
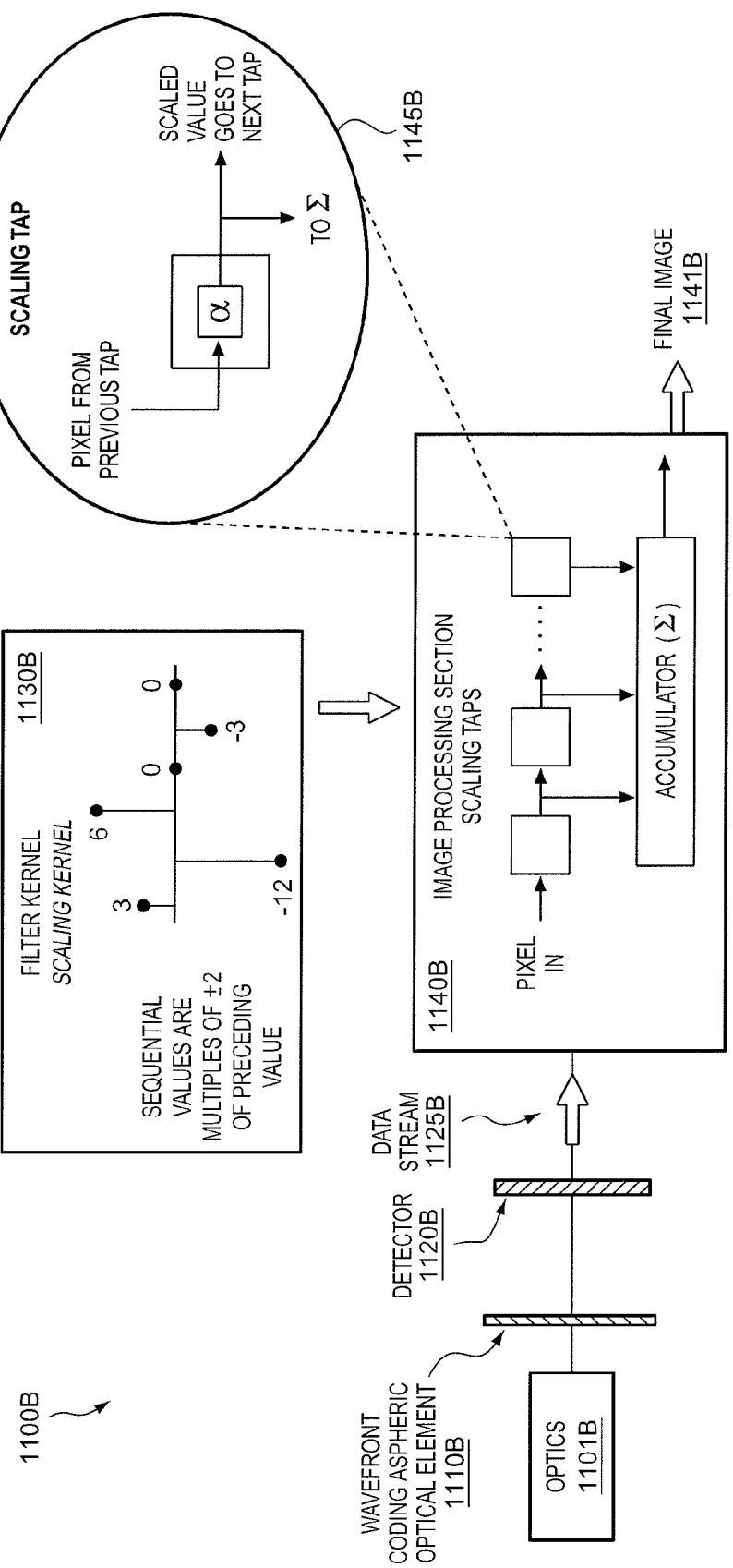
FIG. 11B shows one wavefront coded optical imaging system with optimized image processing with scaling taps and a scaling filter kernel.

FIG. 11B shows an embodiment of a scale-filtering operation. Optics 1101B, aspheric optical element 1110B, detector 1120B and data stream 1125B cooperate such that a filter kernel 1130B utilizes scaled filtering and image processing section 1140B utilizes specialized scaling taps 1145B. The reduced set filter kernel of filter kernel 1130B is such that the scale factor between adjacent coefficients supports efficient implementation. For example, filter kernel 1130B and image processing section 1140B may be configured such that the scale factor between the first and second tap, between the second and third tap, between the third and forth tap, and so on, are all factors of powers of two (or another efficiently implemented value or set of values). If each scale factor of the adjacent filter kernel coefficient is a reduced set of power of two values, for example, then the geometry of each implemented filter tap is a scaling tap 1145B and can be implemented with a simple shift on a binary computer (other scale factors may be efficiently implemented by other devices in a more efficient manner than powers of 2). Regardless of the scale factor chosen, scaling filter tap 1145B is an efficient implementation because only the scaled value of an image pixel at any one tap is passed to both the next tap and the kernel accumulator. In prior art linear filtering, such as employed by FIR tap delay lines, the original image pixel value has to propagate to the next tap while the scaled value is also propagated to the accumulator. Storage of two values (the delayed pixel value plus the scaled pixel value) requires two registers. In FIG. 11B, only one register is needed to store the scaled pixel value (scaled from the previous tap) because of scaled filtering of filter kernel 1130B. Since the original image pixel information is not propagated to all subsequent taps, a savings is further realized in the size and/or cost of hardware implementation of image processor section 1140B. An example of a filter kernel where the scalings between adjacent pixels are factors of powers of plus or minus two is [3, −12, 6, 0, −3, 0].

Figure 11C:
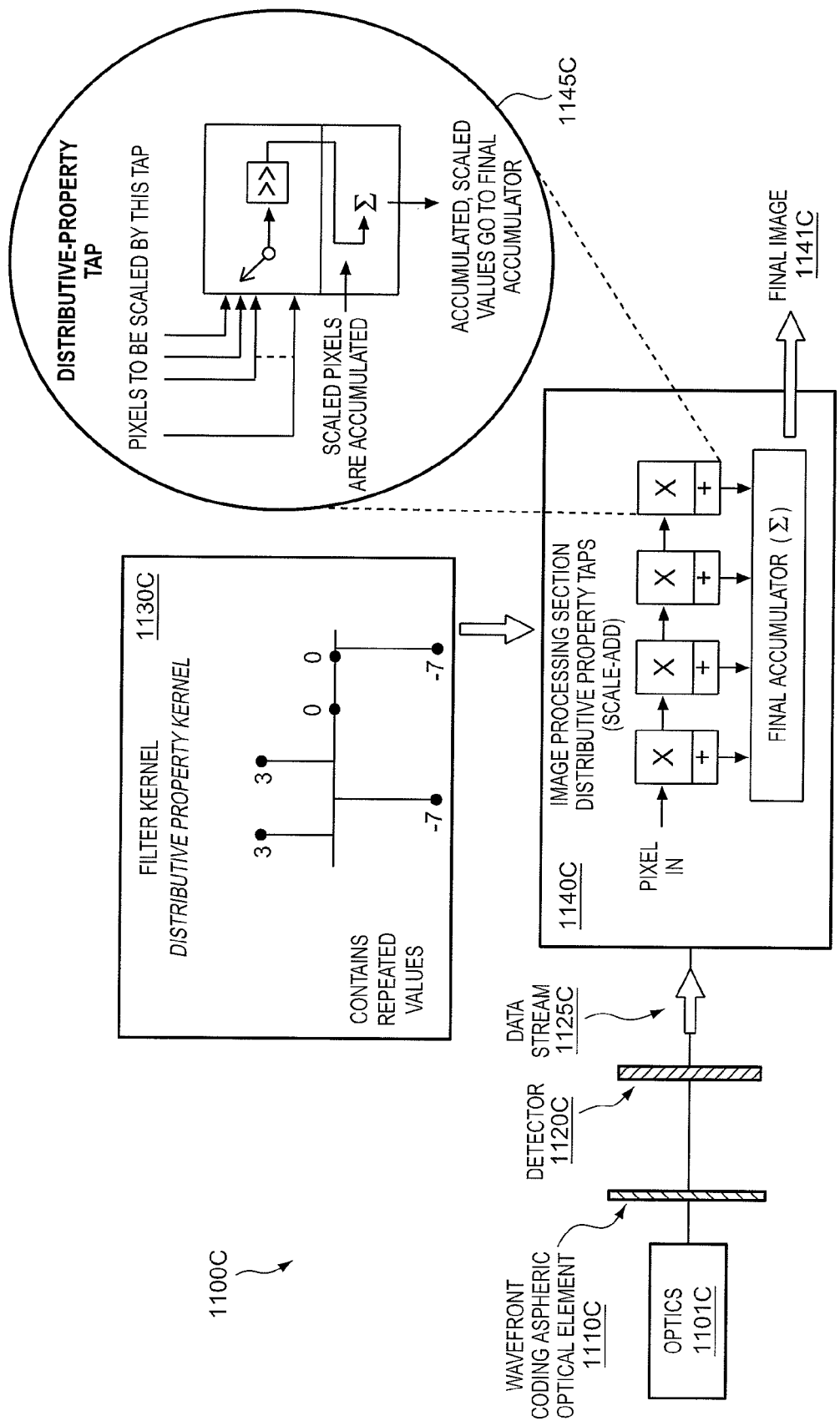
FIG. 11C shows one wavefront coded optical imaging system with optimized image processing with scaling-accumulating taps and a distributive-property filter kernel.

FIG. 11C shows an embodiment of a distributive-arithmetic property filtering operation. Optics 1101C, aspheric optical element 1110C, detector 1120C and data stream 1125C cooperate such that a filter kernel 1130C utilizes a distributive property of arithmetic filtering and image processing section 1140C utilizes specialized distributive-arithmetic taps 1145C. The tap 1145C performs accumulation of scaled values. The reduced set filter kernel of filter kernel 1130C is such that the distribution of all coefficients supports efficient implementation. For example, filter kernel 1130C and image processing section 1140C may be configured such that there are only two scale factors or multipliers that are implemented, providing five distinct coefficients available for reconstruction (5 by considering positive and negative values of the two coefficients, plus the zero coefficient). Scaling filter tap 1145C supports efficient implementation because a single tap can be "overclocked" to service many pixels. Certain implementations may prefer to overclock a multiplier as in 1145C, or some may to prefer to overclock an accumulator as in 1145D, FIG. 11D. In prior art linear filtering, such as employed by FIR tap delay lines, a separate and distinct operator was required for each pixel and coefficient.

Figure 11D:
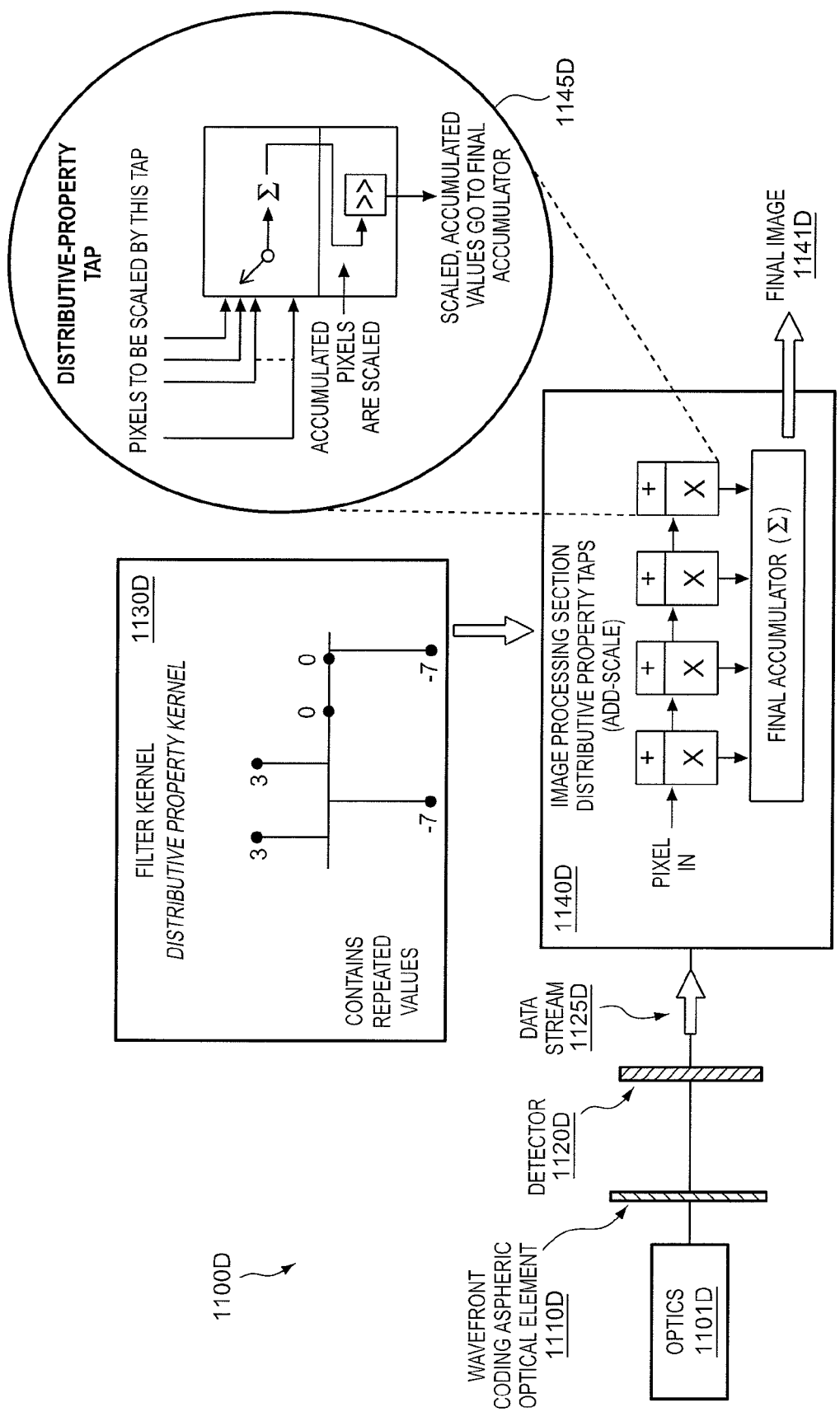
FIG. 11D shows one wavefront coded optical imaging system with optimized image processing with accumulating-scaling taps and a distributive-property filter kernel.

FIG. 11D shows an embodiment of a distributive-arithmetic property filtering operation. Optics 1101D, aspheric optical element 1110D, detector 1120D and data stream 1125D cooperate such that a filter kernel 1130D utilizes distributive-arithmetic filtering and image processing section 1140D utilizes specialized distributive-arithmetic taps 1145D. The tap 1145D performs scaling of accumulated values. The reduced set filter kernel of filter kernel 1130D is such that the distribution of all coefficients supports efficient implementation. For example, filter kernel 1130D and image processing section 1140D may be configured such that there are only two scale factors or multipliers that are implemented, providing 5 distinct coefficients available for reconstruction (5 by considering positive and negative values of the two coefficients, plus the zero coefficient). As in FIG. 11C, scaling filter tap 1145D supports efficient implementation because a single tap can be "overclocked" to service many pixels. Certain implementations may to prefer to overclock an accumulator as in 1145D. In prior art linear filtering, such as employed by FIR tap delay lines, a separate and distinct operator was required for each pixel and coefficient.

One method of designing certain of the wavefront coded aspheric optical elements (e.g., distinct elements 1110 of FIG. 11A-D) and certain of the filter kernels (e.g., distinct kernels 1130 of FIG. 11A-D) utilizes a plurality of weight matrices that target image processing. Other system design goals, such as image quality, sensitivity to aberrations, etc., may also have associated weight matrices. As part of the design and optimization process, the weight matrices may be optimally joined to achieve the selected goals. Since the optics and the signal processing can be jointly optimized, many types of solutions are reachable that are otherwise difficult or impossible to recognize if, for example, only one of the optics or signal processing is optimized.

By way of example, one weight matrix for a generalized integer filter (e.g., utilized by logic of FIG. 6A) has values of zero for all possible integer values. In contrast, a weight matrix for a power of two reduced set filter kernel (e.g., utilized by logic of FIG. 6B) has values of zero only for integers that are a power of two. The integer zero has a zero weight value since this value is trivial to implement. Other integers have higher weight values. When weight values are for integers that are not a power of two, but are above zero, the optimization between optics, filter kernel, image processing, and final image may occur to trade cost to performance by setting appropriate weight values above zero.

In one example, in a reduced set filter kernel utilizing sums of powers of two, the weight matrix may have zero value for integers that are a power of two, a larger value for integers that are constructed from the sum or difference of two power of two values (such as 6=4+2 or 7=8−1), and still larger values for integers that are constructed from three power of two values (such as 11=8+2+1, or 11=8+4−1). When both positive and negative values of power of two are used, the weight for integers such as seven are reduced, since 7=8−1. By way of contrast, the general implementation (e.g., FIG. 6A) requires three summations, i.e., 7=4+2+1.

The weight matrix can also be used to optimize a gradient filter (e.g., filter 1130A, FIG. 11A), a scaling filter (e.g., filter 1130B, FIG. 11B), and distributive property kernels. Adjacent integer values may be given a weight based on their difference or gradient, or scale factor. In one example, every pair of integer values is assigned a zero value if their difference or scale is a power of two or otherwise a large value. The pairing of coefficients also depends on the readout of pixels since the readout mode determines the adjacency rules for neighboring pixels and since both the readout and kernel orientation are included in the weight matrix. Those skilled in the art appreciate that other gradient kernel filters may assign small values when the difference of the integers is a sum of powers of two, and so on.

Figure 1:
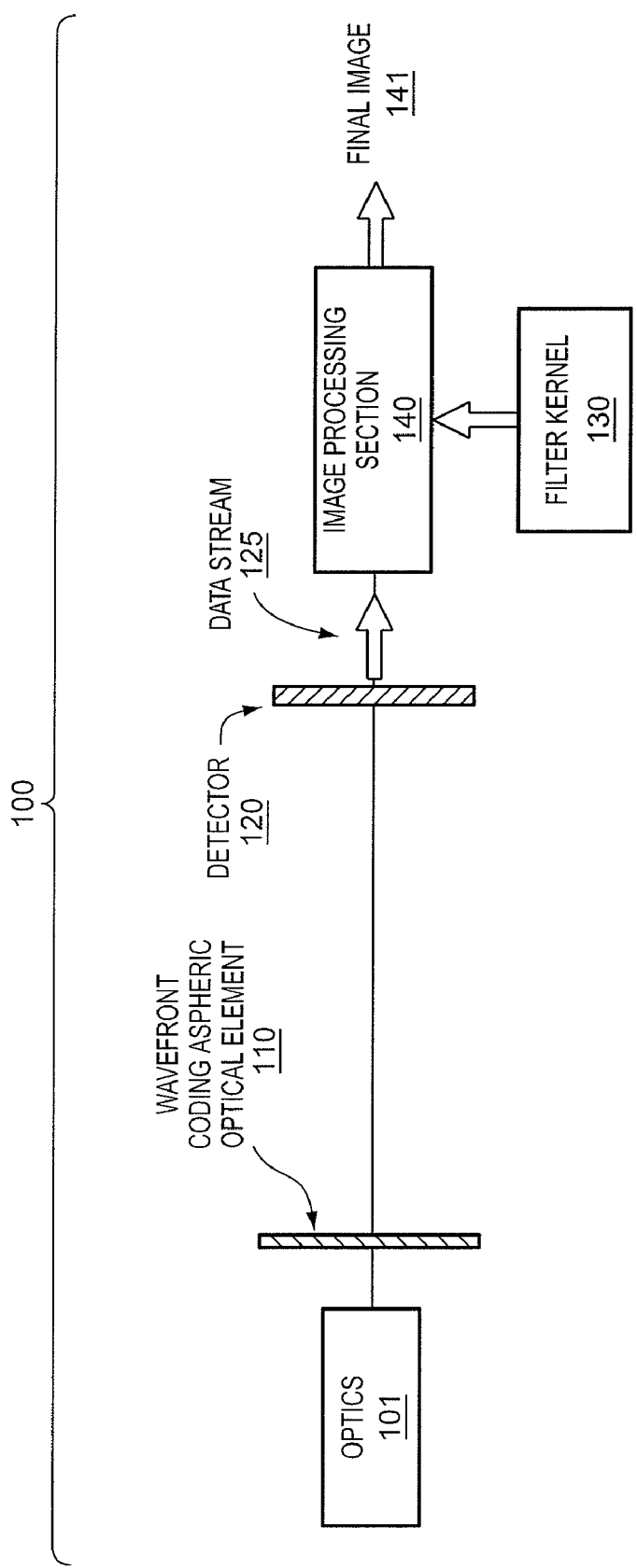
FIG. 1 shows a prior art wavefront coded optical imaging system.
Figure 12:
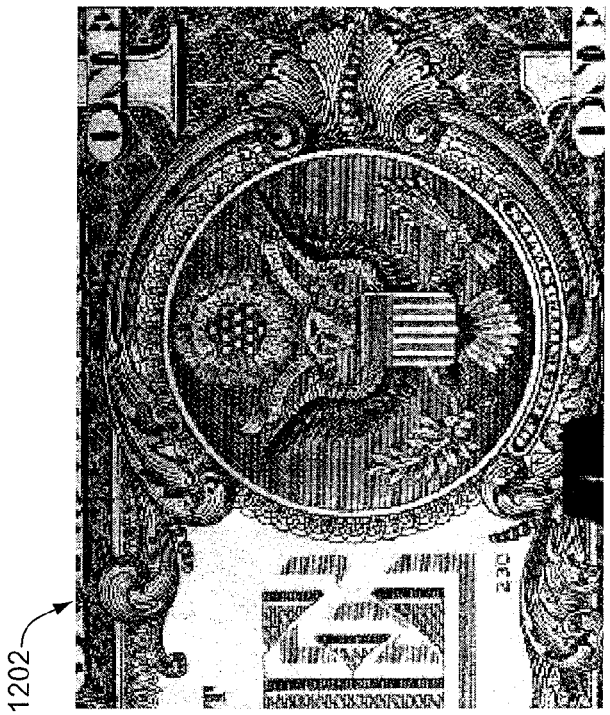
FIG. 12 illustratively shows a final image processed by the system of FIG. 1 and a final image processed by the system of FIG. 2.
Figure 12:
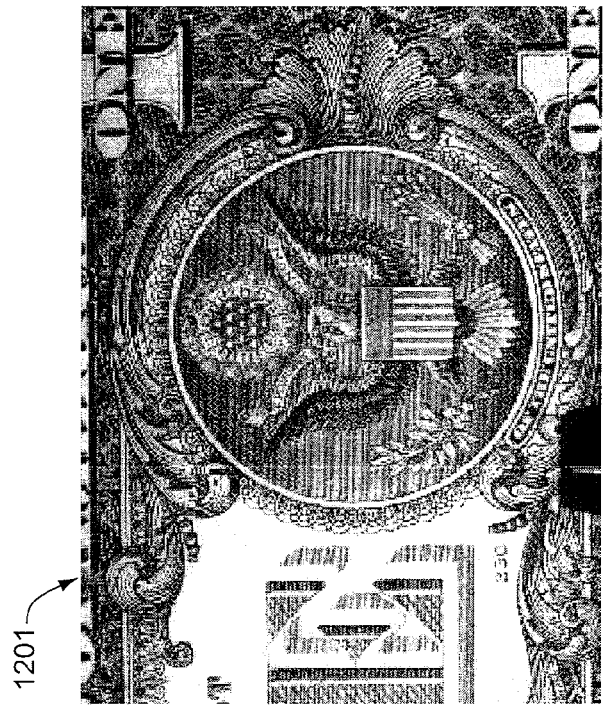

FIG. 12 illustratively shows a final image 1201 processed by system 100 of FIG. 1 and a final image 1202 processed by system 200 of FIG. 2. In this example, both systems 100, 200 have the same optics 101, 201 and detector 120, 220, respectively, but have different filter kernels and image processing sections (implementing respective one dimensional kernel filters within rectangularly separable processing). Image 1201 was formed with a filter kernel 130 that is a generalized integer filter. Image 1202 was formed with a filter kernel 230 that is a reduced set filter kernal utilizing power of two values. Both images 1201, 1202 are similar, but image 1202 has improved contrast, as shown. Moreover, in comparison, reduced set filter kernel 230 has a smaller and less costly implementation then the generalized integer filter of filter kernel 130.

Figure 13:
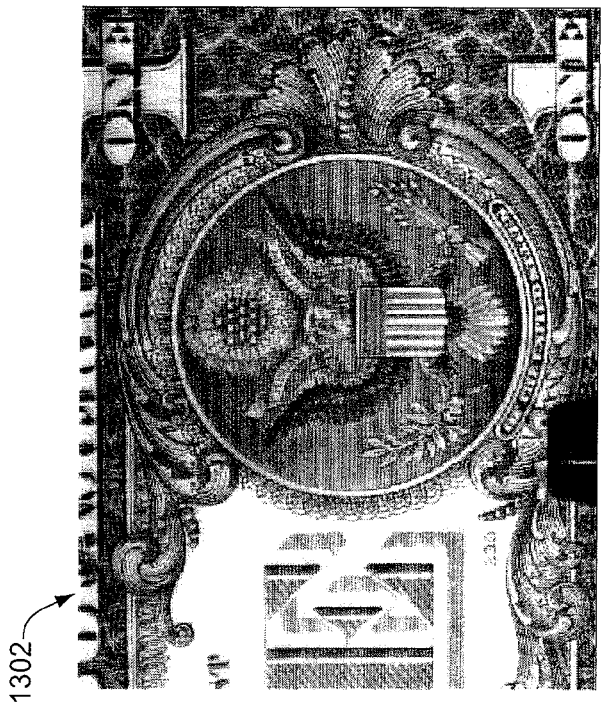
FIG. 13 illustratively shows a final image processed by the system of FIG. 1 and a final image processed by the system of FIG. 2 employing a filter as in FIG. 1.
Figure 13:
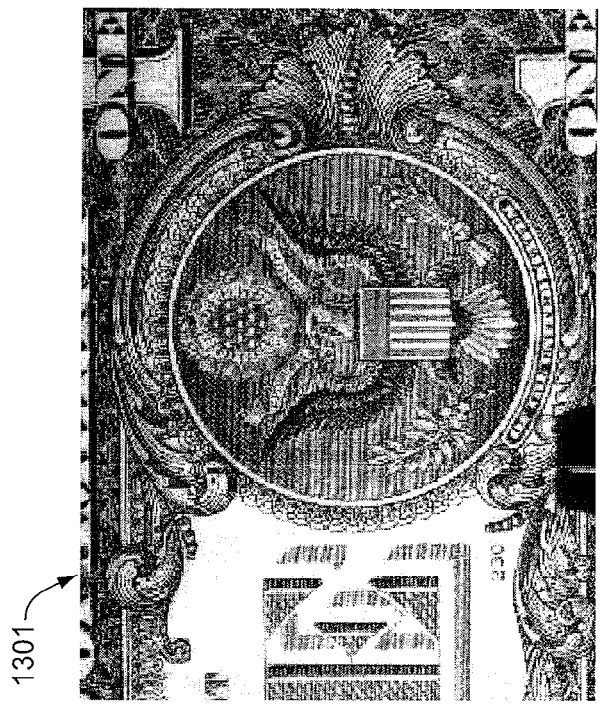

FIG. 13 illustratively shows a final image 1301 processed by system 100 of FIG. 1 and a final image 1302 processed by system 200 of FIG. 2. As in FIG. 12, both systems 100, 200 have equivalent optics and detectors 101, 201 and 120, 220, respectively, but have different filter kernels and image processing sections (implementing respective one dimensional filter kernels within rectangularly separable processing). System 200 employs a filter kernel 1130A, FIG. 11A, as filter kernel 230, FIG. 2. System 100 employs a generalized integer filter as filter kernel 130; thus image 1301 was formed with the generalized integer filter. Both images 1301, 1302 are similar, except that image 1302 has lower contrast. Since contrast is also one possible imaging goal, the reduced contrast can be set to meet this goal. Moreover, the reduced set gradient filter kernel used to process image 1302 can be smaller and less costly to implement then the generalized integer filter.

Figure 14:
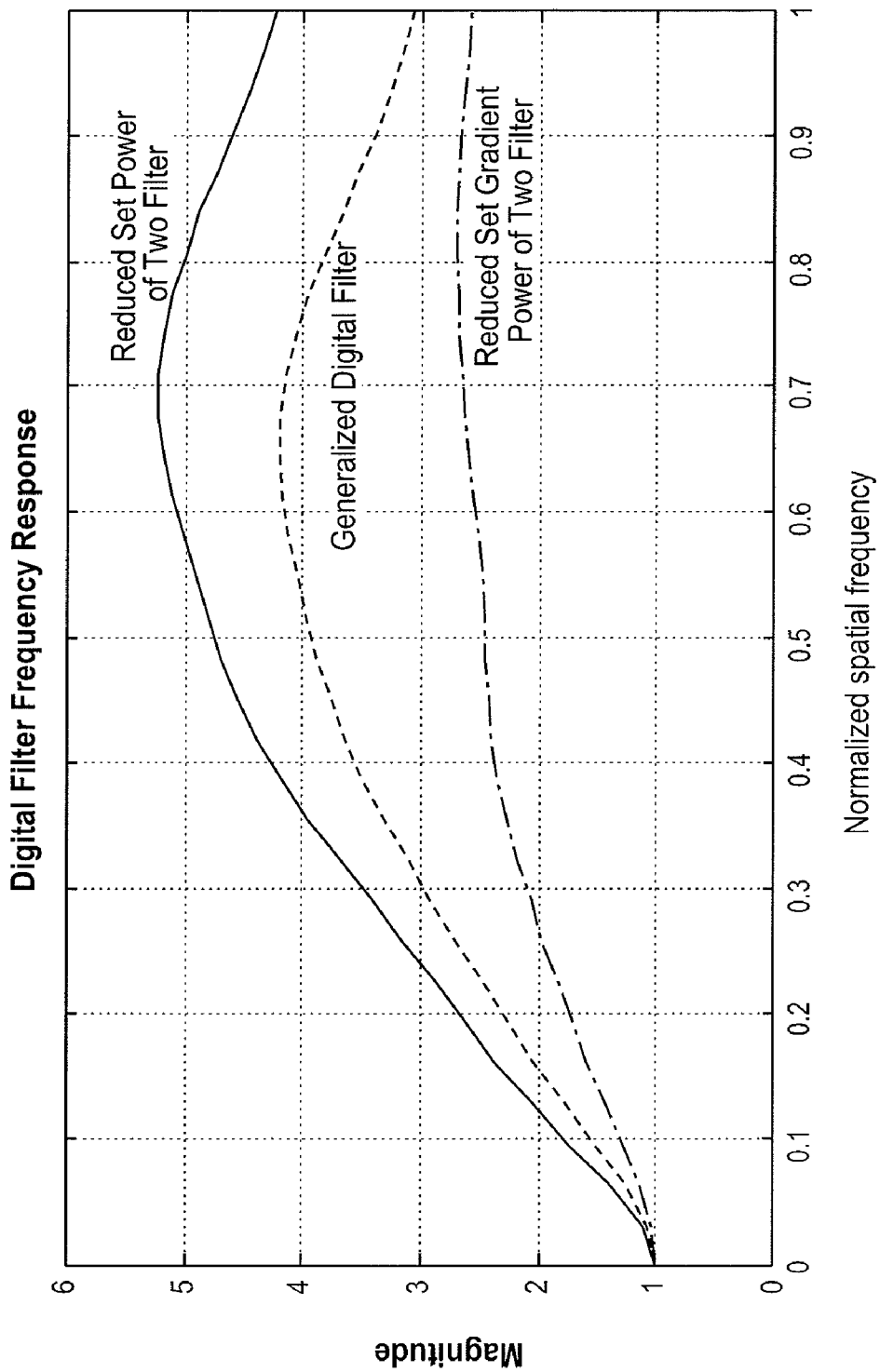
FIG. 14 shows frequency response curves for the filter kernels used in FIG. 12 and FIG. 13.

FIG. 14 shows the frequency response for the three digital filters used in FIG. 12 and FIG. 13. Each filter has a slightly different frequency response and a different implementation. Certain imaging applications prefer one frequency response while another may prefer a different frequency response. The particular reduced set power of two frequency response (e.g., employed in filter kernel 230, FIG. 2) has the highest contrast. The generalized integer frequency response has the next highest contrast, and the reduced set gradient power of two filter kernel 1130 has the lowest frequency response in this example. This need not be the general case. Accordingly, depending on the application, the appropriate response is chosen; if the filter kernal also employs a reduced set of filter kernel values, then the implementation may also be made with reduced cost and complexity.

Figure 15:
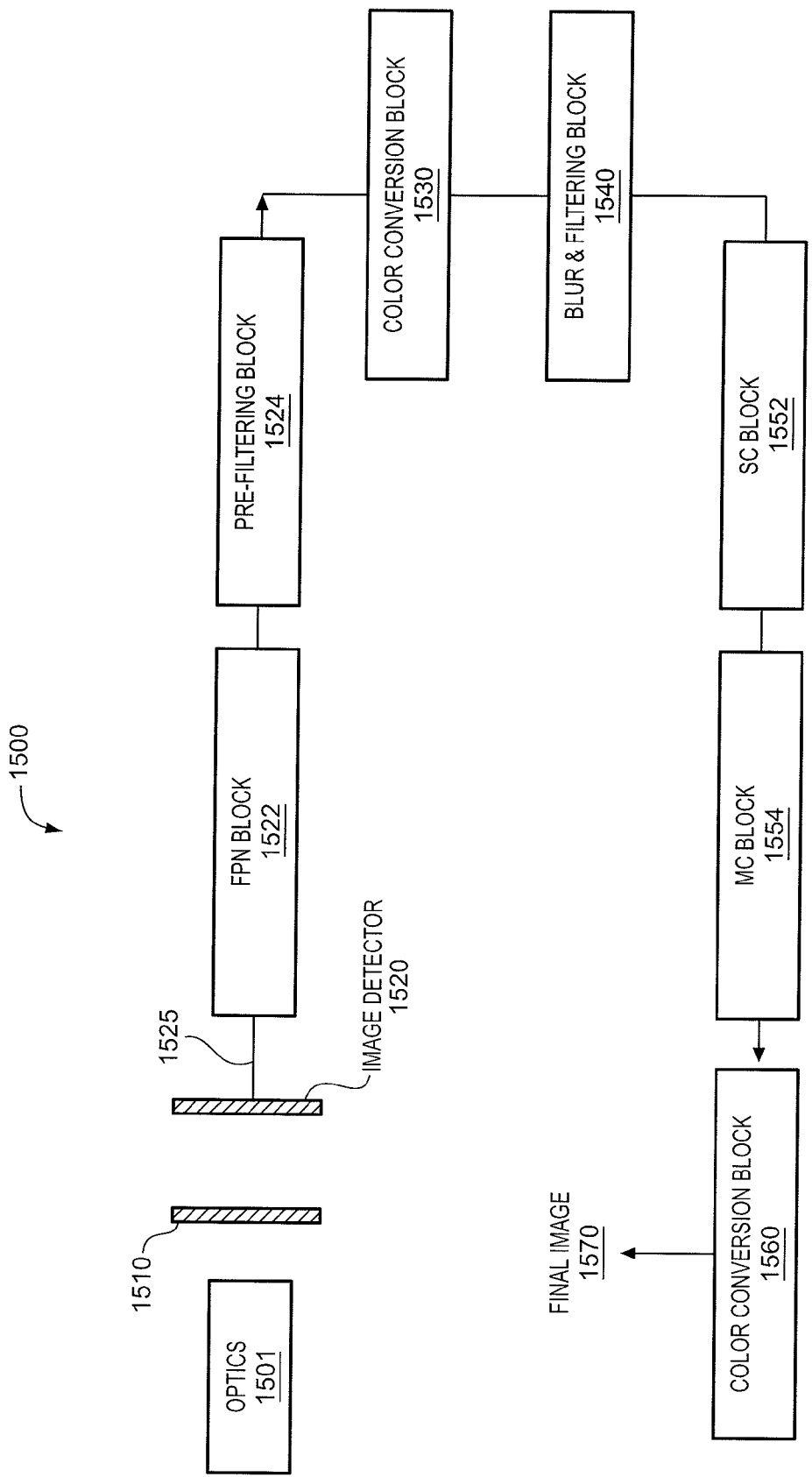
FIG. 15 shows one optical imaging system with optimized color image processing.

With further regard to FIG. 10, optimizing image processing for color may have certain advantages. FIG. 15 thus illustrates one other optical imaging system with optimized color image processing. System 1500 includes optics 1501 and a wavefront coded aspheric optical element 1510 that cooperate to form an intermediate-image at a detector 1520. Element 1510 operates to code the wavefront within system 1500. A data stream 1525 from detector 1520 is then processed by a series of processing blocks 1522, 1524, 1530, 1540, 1552, 1554, 1560 to decode the wavefront and produce a final image 1570. Block 1522 and block 1524 operate to preprocess data stream 1525 for noise reduction. In particular, FPN block 1522 corrects for fixed pattern noise (e.g., pixel gain and bias, and nonlinearity in response) of detector 1510; pre-filtering block 1524 utilizes knowledge of wavefront coded optical element 1510 to further reduce noise from data stream 1525. Color conversion block 1530 converts RGB color components (from data stream 1525) to a new colorspace. Blur & filtering block 1540 removes blur from the new colorspace images by filtering one or more of the new colorspace channels. Block 1552 and block 1554 operate to post-process data from block 1540, for further noise reduction. In particular, SC Block 1552 filters noise within each single channel of data using knowledge of digital filtering within block 1540; MC Block 1554 filters noise from multiple channels of data using knowledge of digital filtering within block 1540. Prior to image 1570, another color conversion block 1560 converts the colorspace image components back to RGB color components.

Figure 16A:
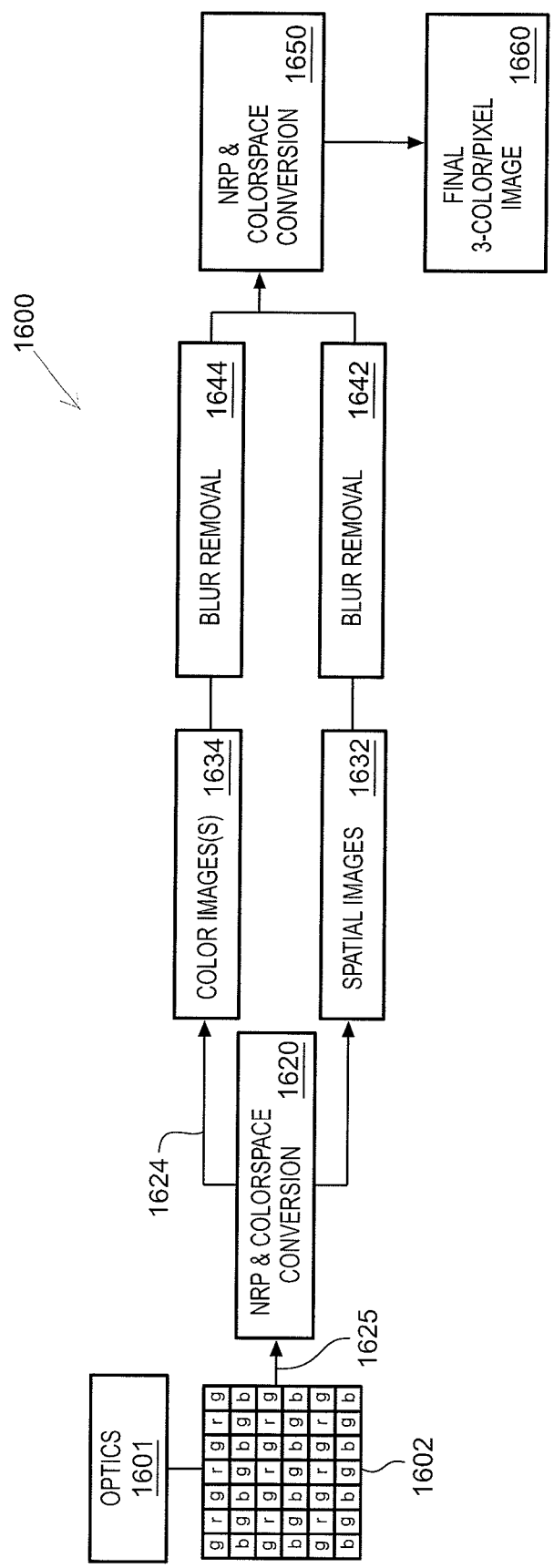
FIG. 16A shows one optical imaging system with optimized color image processing.

FIG. 16A schematically illustrates one color processing system 1600 that produces a final three-color image 1660 from a color filter array detector 1602. System 1600 employs optics 1601 (with one or more wavefront coded optical elements or surfaces) to code the wavefront of system 1600 and to produce an intermediate optical image at detector 1602. Wavefront coding of optics 1601 thus forms a blurred image on detector 1602. This intermediate image is then processed by NRP and colorspace conversion block 1620. The noise reduction processing (NRP) of block 1620 for example functions to remove detector non-linearity and additive noise; while the colorspace conversion of block 1620 functions to remove spatial correlation between composite images to reduce the amount of silicon and/or memory required for blur removal processing (in blocks 1642, 1644). Data from block 1620 is also split into two channels: a spatial image channel 1632 and one or more color channels 1634. Spatial image channel 1632 has more spatial detail than color channels 1634. Accordingly, the dominant spatial channel 1632 has the majority of blur removal within process block 1642. The color channels have substantially less blur removal processing within process block 1644. After blur removal processes, channels 1632 and 1634 are again combined and are processed within noise reduction processing and colorspace conversion block 1650. This further removes image noise accentuated by blur removal; and colorspace conversion transforms image into RGB for final image 1660.

Figure 17:
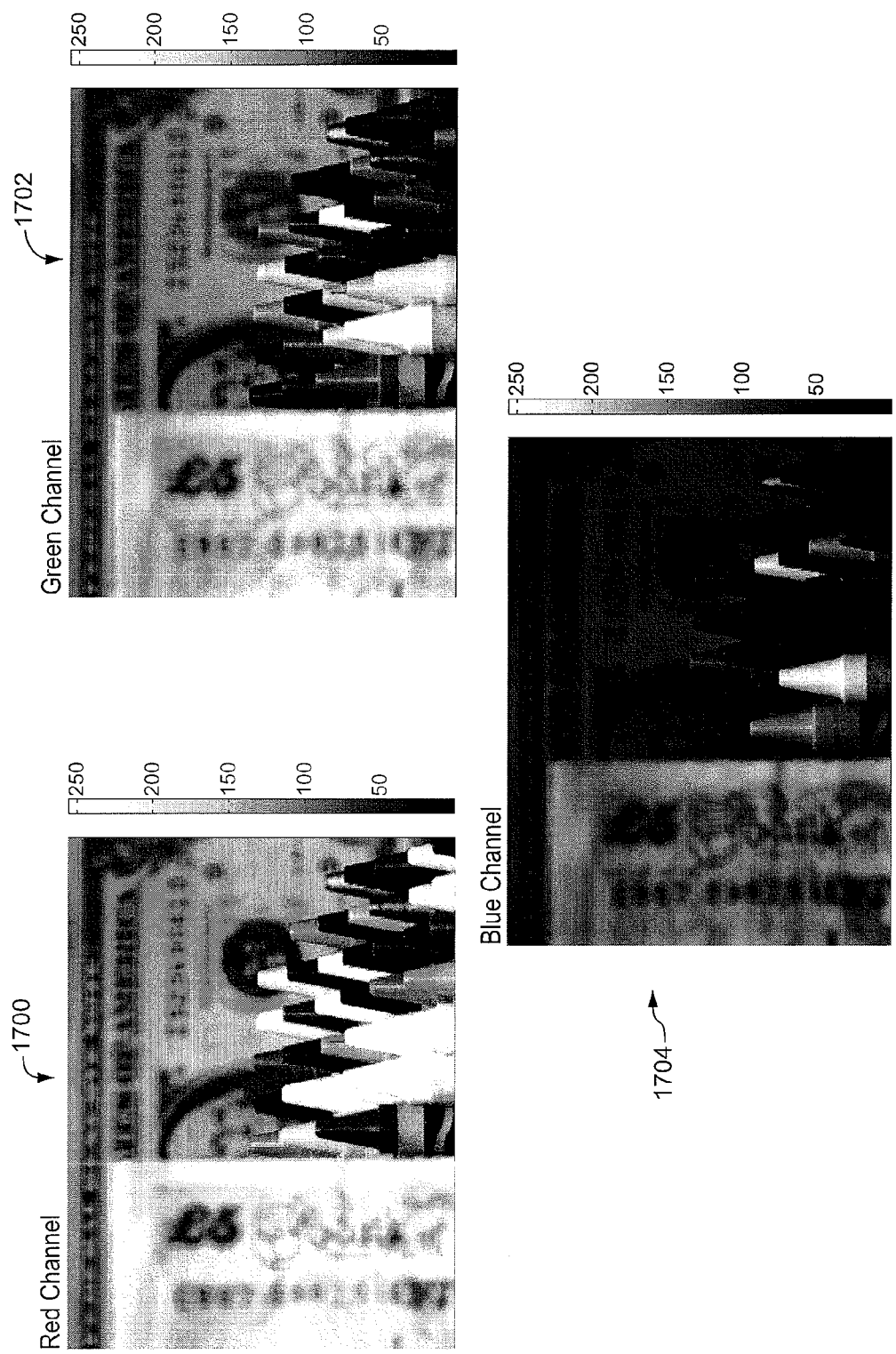
FIG. 17-FIG. 23 demonstrate image components through various stages of processing within FIG. 16A.

FIG. 17 through FIG. 23 further illustrate colorspace conversion and blur removal processes for a particular embodiment of system 1600. Detector 1602 is a detector with a Bayer color filter array. FIG. 17 shows red, green and blue component images 1700, 1702 and 1704, respectively, of an actual object imaged through system 1600 but without wavefront coding in optics 1601 (i.e., the wavefront coded optics are not present with optics 1601). In images 1700, 1702, 1704, it is apparent that each color image has a high degree of spatial similarity to each other image, and that many parts of the image are blurred. The blurred images are not correctable without wavefront coding, as described below.

Figure 18:
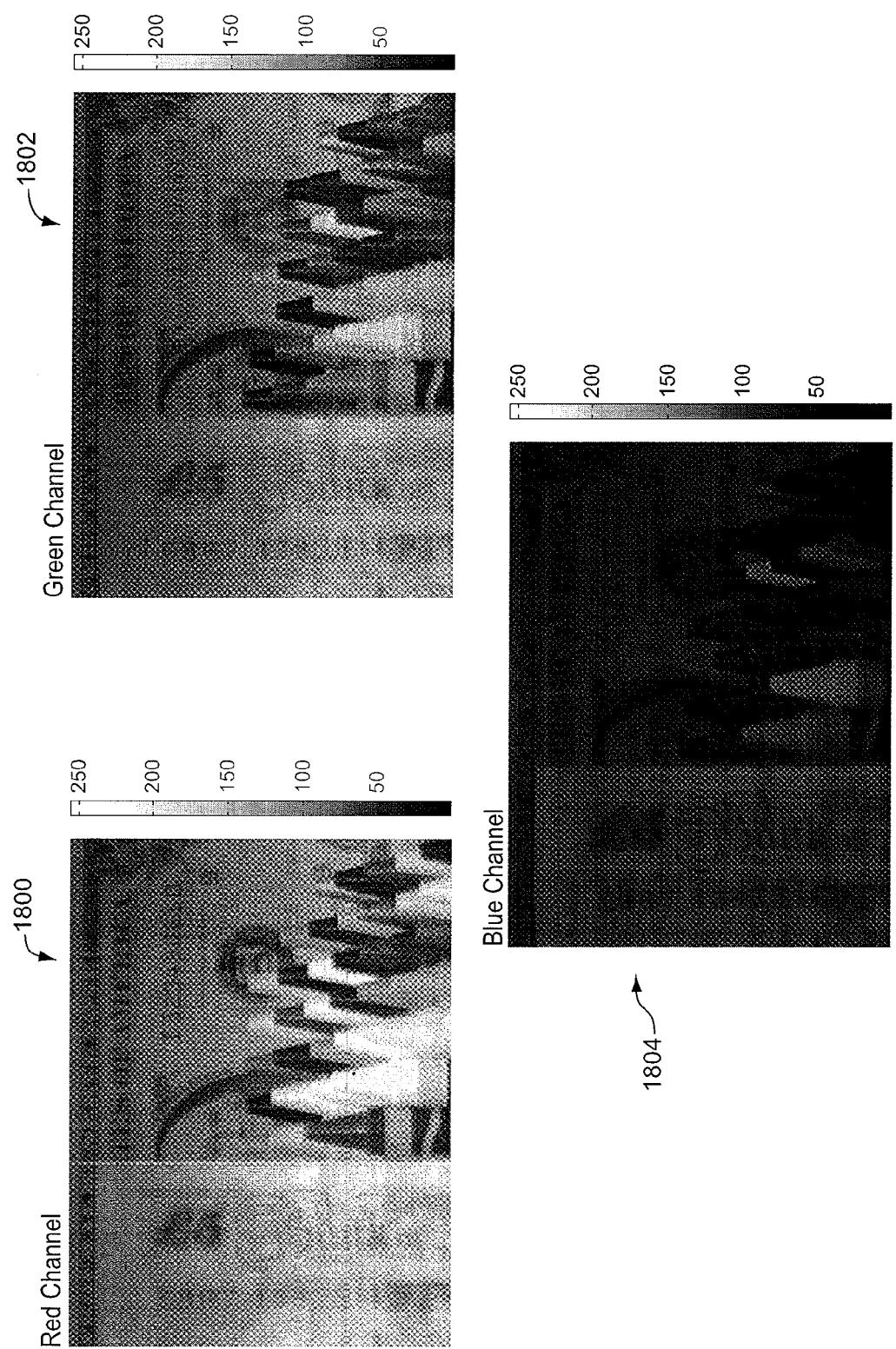

FIG. 18 shows raw red, green and blue component images 1800, 1802 and 1804, respectively, of the same object imaged through system 1600 with wavefront coded optics 1601. Images 1800, 1802 and 1804 represent images derived from data stream 1625 and prior to processing by block 1620. Each component image 1800, 1802, 1804 is again fairly similar to each other image; and each image is blurred due to aspheric optics 1601.

Figure 19:
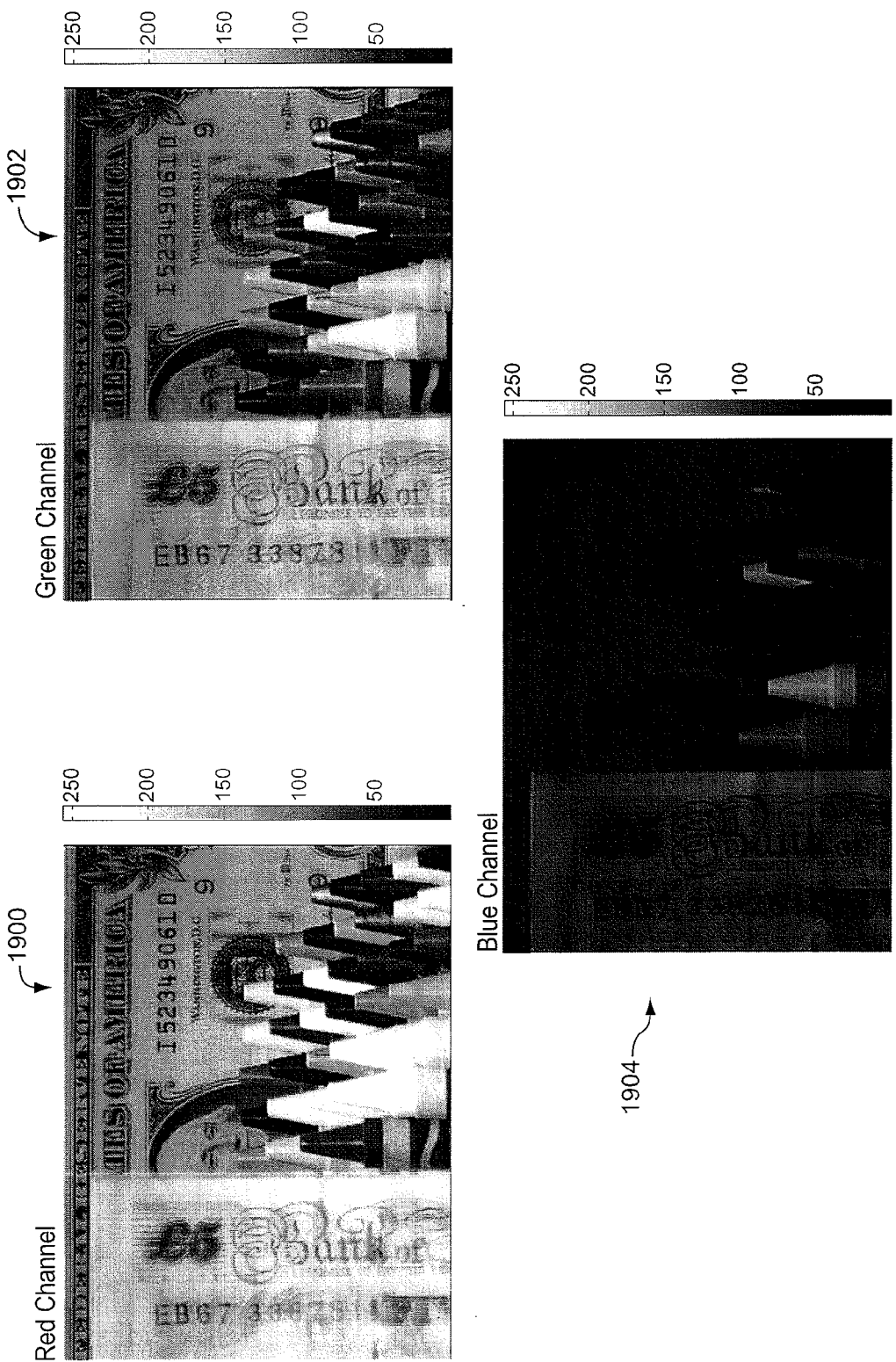

FIG. 19 shows the color component images of FIG. 18 after blur removal processing of block 1642; image 1900 is image 1800 after block 1642; image 1902 is image 1802 after block 1644; and image 1904 is image 1804 after block 1644. For this example, processing block 1644 performed no processing. Again, processing blocks 1620 and 1650 were not used. Each component image 1900, 1902 and 1904 is sharp and clear; and the combination of all three component images results in a sharp and clear three color image.

Figure 20:
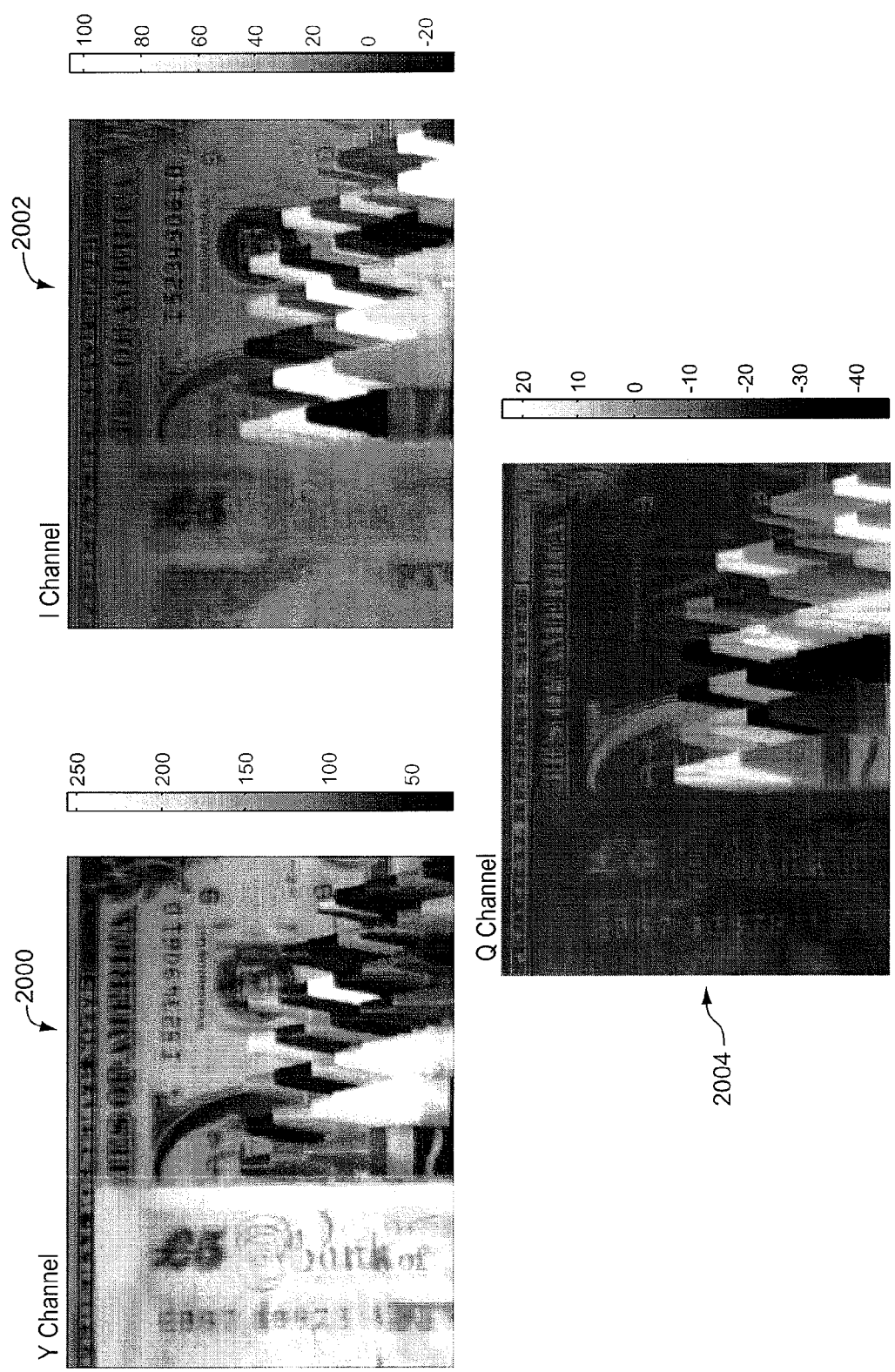

FIG. 20 shows component images 2000, 2002, 2004 after colorspace conversion (block 1620) from RGB to YIQ colorspace, before processing of spatial and color channels 1632 and 1634. Component images 2000, 2002, 2004 thus represent component images of FIG. 18 after processing by block 1620, on channel 1632 and channel 1634. Notice that Y channel image 2000 is similar to the red and green images 1800, 1802 of FIG. 18. The I and Q channel images 2002, 2004 are however much different from all channels of FIG. 18. The YIQ colorspace conversion (block 1620) resulted in the Y channel component image 2000 containing the majority of the spatial information. The I channel component image 2002 contains much less spatial information than does the Y channel, although some spatial information is visible. Notice the differences in the intensity scales to the right of each image. The Q channel component image 2004 has very little spatial information at the intensity scale shown for these images.

Figure 21:
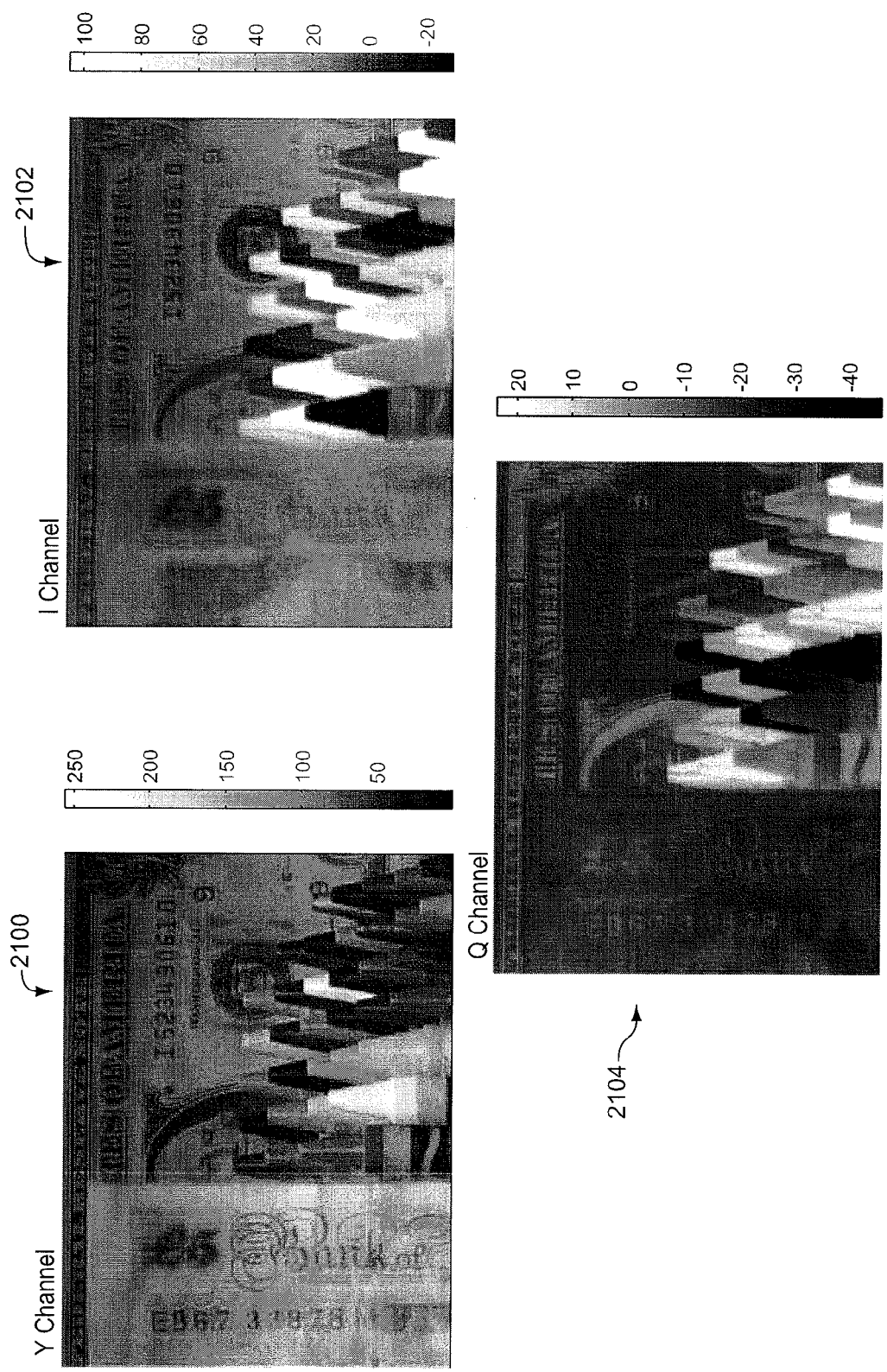

FIG. 21 shows the component YIQ wavefront coded images 2100, 2102, 2104 after blur removal process 1642 of the spatial channel 1632. The I and Q channel images 2002, 2004 were not filtered in block 1644, thereby saving processing and memory space; accordingly, images 2102, 2104 are identical to images 2002, 2004. Those skilled in the art appreciate that images 2002, 2004 could be filtered in block 1644 with low resolution and small bit depth filters. After the filtered YIQ image of FIG. 21 is transformed back into RGB space (block 1650), the final three color image 1660 is sharp and clear with much less processing then required to produce the final image based on FIG. 19.

The YIQ colorspace is one of many linear and non-linear colorspace conversions available. One method for performing colorspace conversion is to select a single space to represent the entire image. Wavefront coded optics and processors can cooperate such that an optimal, dynamic, colorspace conversion can be achieved that reduces the amount of signal processing and improves image quality. In FIG. 16A, for example, wavefront coded system 1600 may employ a colorspace process block 1620 that varies spatially across the entire image. Such spatial variation may be denoted as Dynamic Color Space (DCS). This spatially-varying colorspace conversion 1620 performs a single transformation on a region, where the region is dynamic and not constrained or enclosed. For example, an image with blue sky in the upper half and sandy beach in the lower half is well suited to the following split colorspace: a "blue-spatial-information-preserving" colorspace conversion for the upper half of the image and a "speckle-brown-information-preserving" colorspace transformation for the lower half. Such spatially varying regions can be defined as an ordered set of rectilinear blocks, or as randomly assigned pixels, or as dynamically allocated contours that are defined in an optimal fashion as each scene changes. Dynamic block allocation methods in conversion process 1620 can be sensitive to the total computational power and desired throughput and accuracy tradeoffs desired in the imaging system, and can be guided or limited by knowledge of the spatial correlating effects of optics 1601.

In general, DCS can provide combined noise reduction, color-plane array interpolation, and reduced-cost image deblurring. The DCS algorithm is appropriate for a variety of processing approaches within software and hardware based systems. One version of DCS implements dynamic linear colorspace conversion. Other versions of DCS implement dynamic non-linear colorspaces. DCS may be combined or preceded by non-linear colorspace conversions or other transformations, such as HSV, depending on processing system resources and application goal.

Figure 16B:
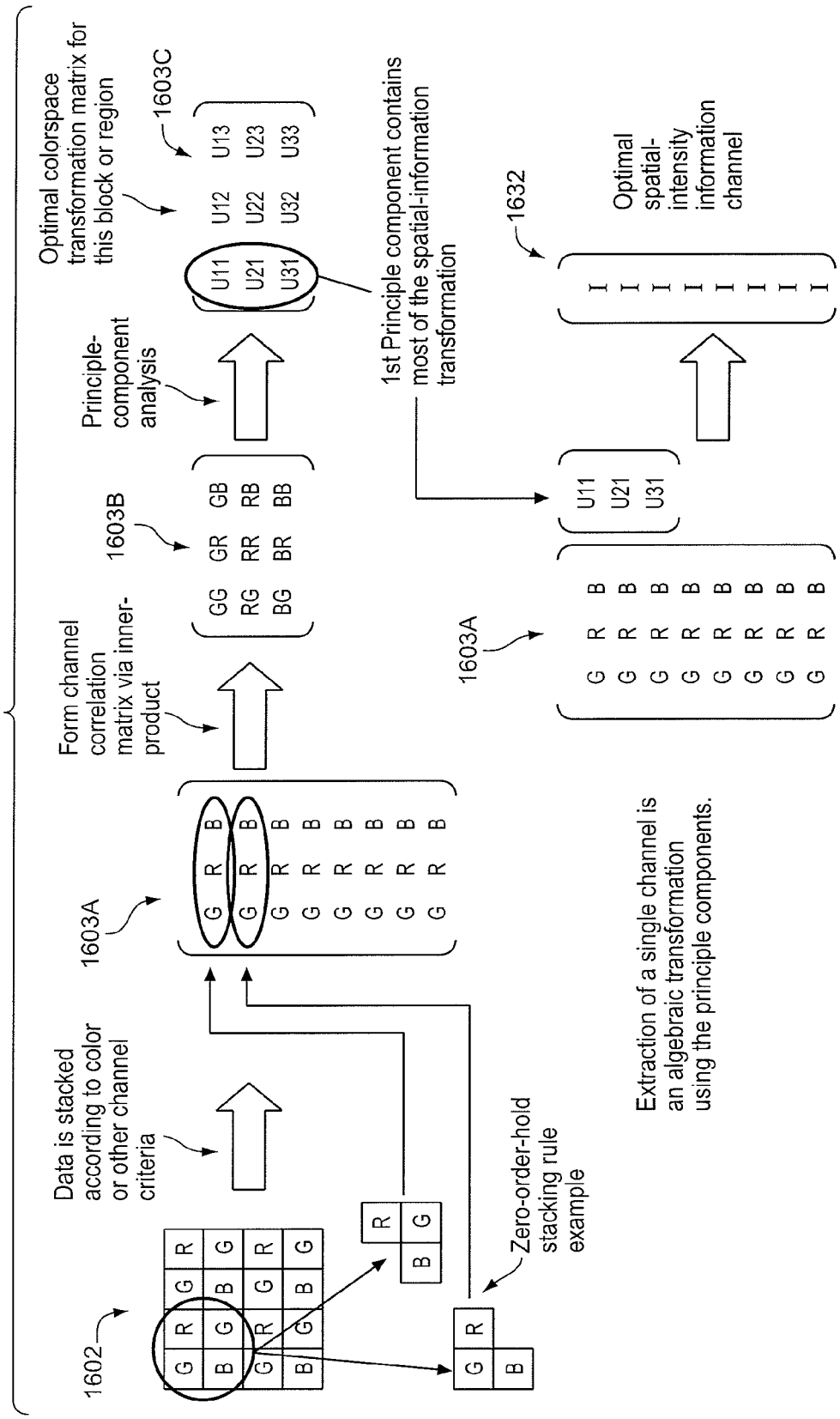
FIG. 16B illustrates one correlation and color component analysis associated with FIG. 16A.

The general DCS algorithm can be understood through correlation and principal component analysis of FIG. 16B. FIG. 16B fits entirely within the block 1620 in FIG. 16A. The Bayer sensor 1602 and the output image 1632 are numbered identically to FIG. 16A to highlight the connection. Since DCS can be a reversible transform, those skilled in the art recognize that an inverse, either exact or approximate, DCS process occurs entirely within block 1650 of FIG. 16A. The determination of the principal components (or principal color or colors) from the estimated correlation of colors in multi-channel images of an arbitrary region of pixels with an arbitrary number of color channels (more than one) determines the optimal (in the least-squares sense) colorspace transformation for that particular region. In other words, DCS allows blocks 1620 (and 1650 via the inverse DCS transformation) in FIG. 16A to be optimized jointly with all other wavefront coding system parameters. In the Bayer detector case with detector 1602 in FIG. 16B, a color channel matrix is formed by collecting the sampled color channels into columns of a matrix 1603A. Various schemes can be used to provide estimates of image color channels at each desired location. Not all pixel locations need to be estimated for the entire region. As an example, FIG. 16B shows a zero-order hold method that essentially copies nearby red and blue pixel values to every green pixel location, and generates 8 rows of data in the 8×3 matrix, from 16 pixels in the 4×4 region. A principal component decomposition of the correlation estimate 1603B of the color channel matrix 1603A provides the colorspace transformation 1603C. This is only one such example stacking of values to form a color channel matrix for multi-channel color systems; those skilled in the art appreciate that other arrangements are possible without departing from the scope hereof.

An estimate of the principal components 1603C of the correlation matrix 1603B forms the optimal colorspace transformation matrix for this particular region and channel selection. Obtaining the spatial intensity image 1632 in FIG. 16A is achieved by applying the first principal component to the color channel matrix 1603A in FIG. 16B, forming the transformed spatial image 1632 in FIG. 16A. The deblurring function 1642 in FIG. 16A then operates on the spatial image 1632, providing image reconstruction and simultaneous Bayer-pattern interpolation. Returning to the original colorspace then occurs in block 1650 by re-transforming the reconstructed spatial and color channels using a form of an inverse of the color channel transformation matrices 1603C determined for each region, producing the final image 1660. Color channel images 1634 may also be extracted from DCS by using the secondary and tertiary principal components in this example.

Upon DCS transformation, it is not however guaranteed that only the spatial channel 1632 is to be processed by the spatial channel blur removal function 1642. Each block or region that was transformed contains its own unique mapping matrix but all regions share a common spatial image. In many cases, the optimal transformation for a given region does not achieve complete transformation of all spatial information to the spatial image. In such a case, deblurring of the color channels may be made by blur removal process block 1644. Final image assembly is then performed by "coloring" the dynamic regions using respective matrices of colorspace inversion 1650.

Figure 22:
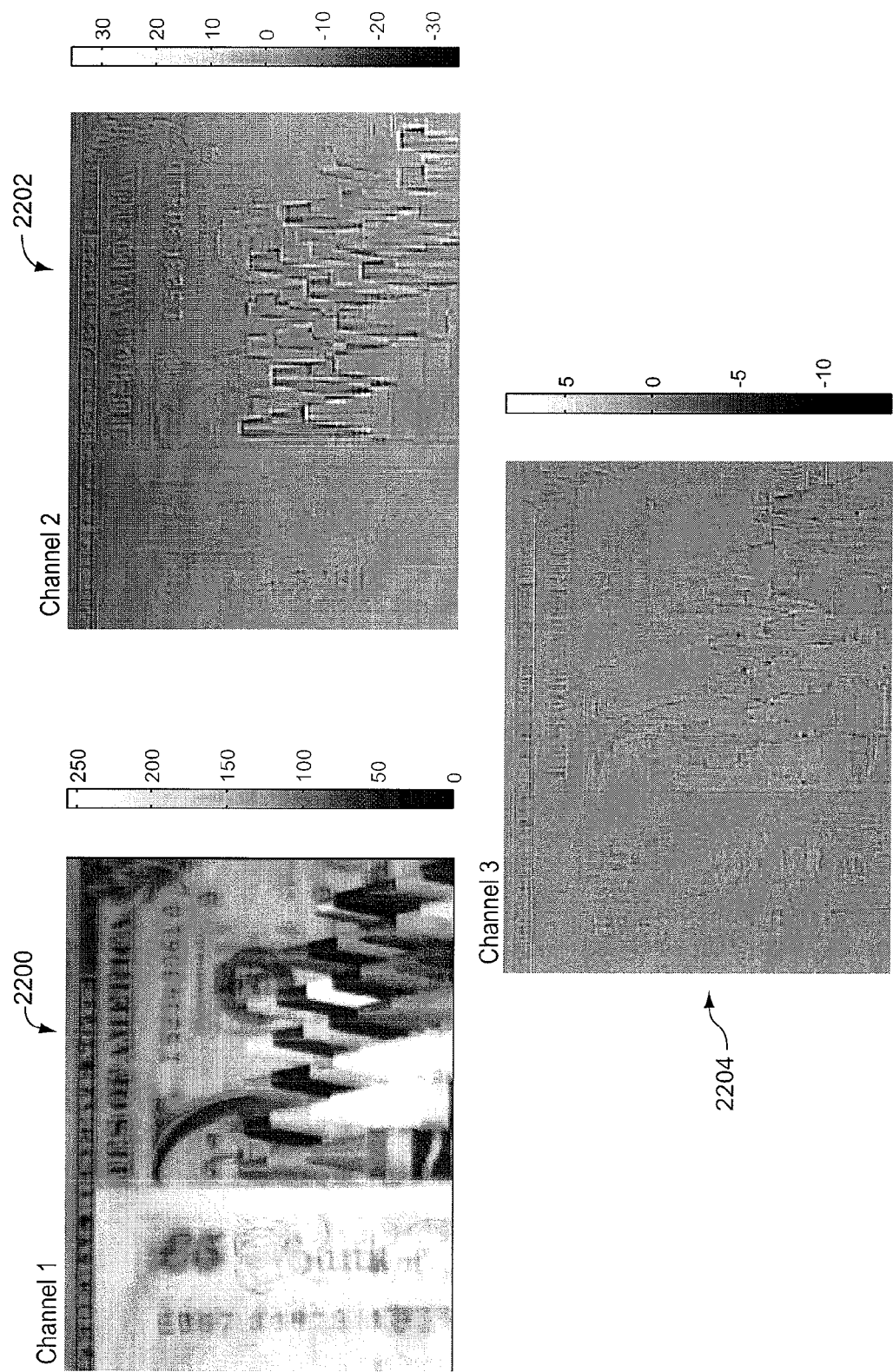
Figure 23:
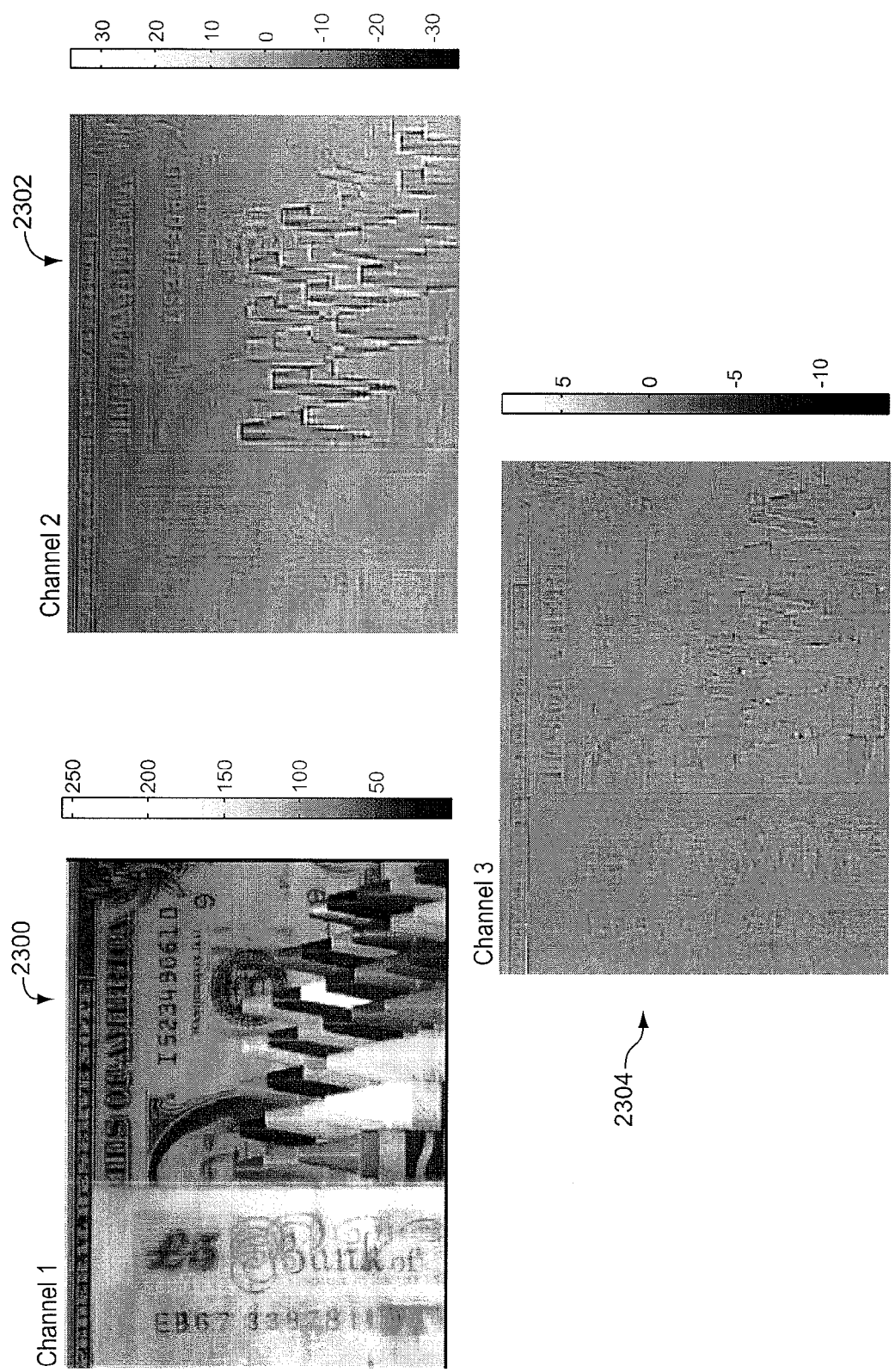

FIG. 22 shows the component images of FIG. 18 after colorspace conversion with the DCS algorithm. After conversion with the dynamically changing colorspace, essentially all spatial information is contained in channel 1 (2200). The other two color channels 2 (2202) and 3 (2204) have essentially no spatial information relative to the shown intensity scale, such that they may be removed from the final image for noise reduction. FIG. 23 shows these component images after filtering to remove image blur. Only channel 1 (2300) was filtered in this example, again due to low resolution in channels 2 (2302) and 3 (2303). After conversion from DCS to RGB (process block 1650), the final image is again sharp and clear, and with fewer color artifacts as compared to the final image of FIG. 21 (and with less stringent processing and memory requirements).

Figure 24:
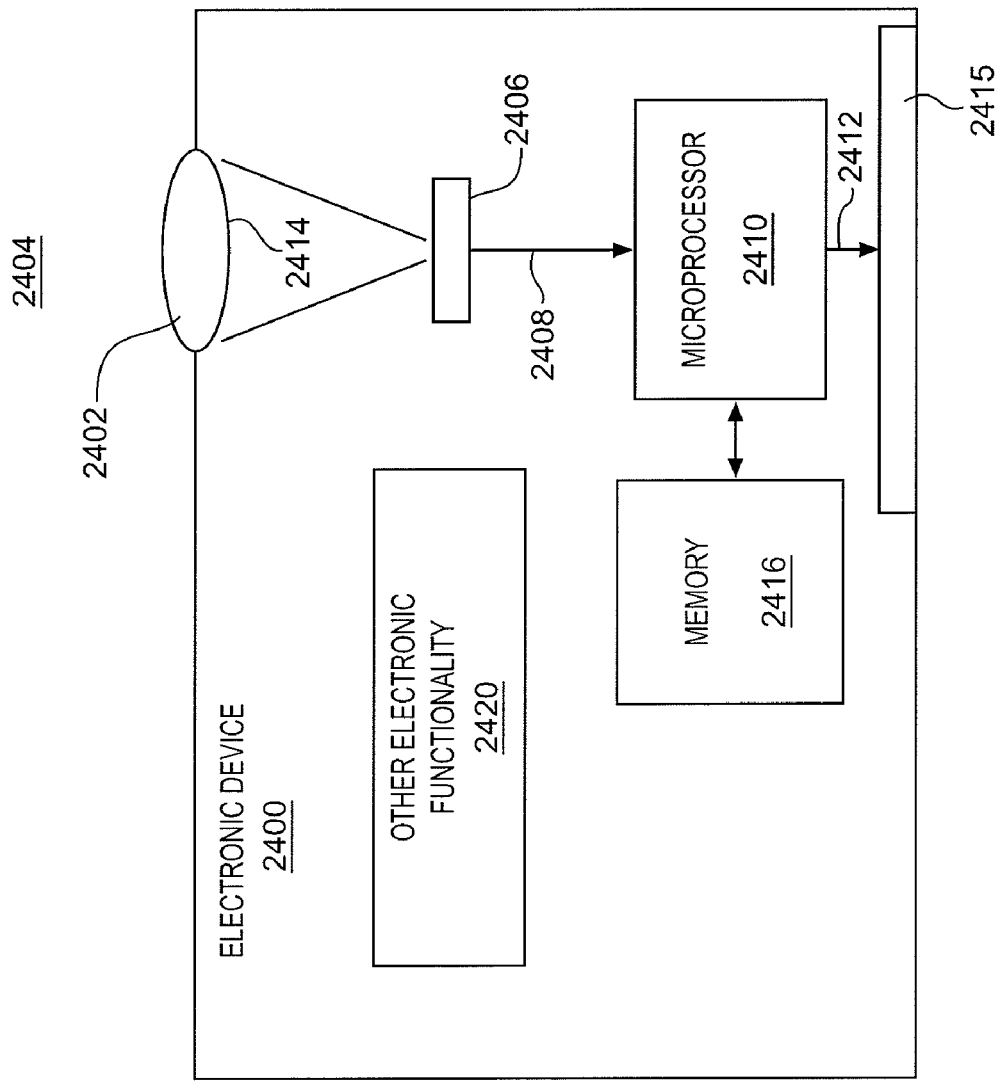
FIG. 24 shows a block diagram of one electronic device employing characteristics of certain wavefront coded imaging systems.

The wavefront coded imaging systems discussed herein may have certain advantages when used within electronic devices such as cell phones, video conferencing apparatus and miniature cameras. FIG. 24 shows one such electronic device 2400 to illustrate such advantages. Device 2400 has an optical lens 2402 that forms an image from object space 2404 onto a digital detector 2406 (e.g., a 3-color CMOS array), as shown. Detector 2406 converts the image into a data stream 2408. A microprocessor 2410 processes data stream 2408 to generate a final image 2412.

Optical lens 2402 is also wavefront coded; one surface 2414 of lens 2402 is for example a wavefront coded aspheric optical element. Accordingly, optical lens 2402 and element 2404 may function as the optics and wavefront coded elements discussed hereinabove (e.g., optics 201, element 210 of FIG. 2). Microprocessor 2410 is for example a processing section discussed hereinabove (e.g., image processing section 240, FIG. 2). Microprocessor 2410 employs a filter kernel in processing data stream 2408, thereby decoding the wavefront due to phase manipulation by lens 2402 and generating a crisp image 2412. Image 2412 may for example be displayed on an LCD display 2415 or other display screen.

The effects of wavefront coding of optical lens 2402 and post-processing by microprocessor 2410 are for example constructed and arranged to reduce misfocus-related aberrations such as defocus, field curvature, or manufacturing and assembly related misfocus. Accordingly, electronic device 2400 may employ a single (plastic) optical element 2402 without the need for other complex optical elements.

Moreover, by selecting the appropriate filter kernel (e.g., a reduced set filter kernel with power of two kernel values) and the corresponding phase mask (i.e., surface wavefront coded element 2414), microprocessor 2410 may operate with reduced processor load and memory requirement. In one example, microprocessor 2410 employs image processing section 540 and kernel 530, FIG. 5, to reduce processor load and memory requirement. In another example, microprocessor 2410 employs logic architectures of FIG. 6B and/or FIG. 7 to reduce processor load and memory requirement. Likewise, microprocessor 2410 may employ image processing section 840 and kernel 830 to achieve certain other advantages, as discussed in FIG. 8. Depending upon design considerations, including color processing goals, microprocessor 2410 may for example employ processing techniques disclosed in connection with FIG. 10, FIG. 16A and/or FIG. 16B. In another example, electronic device 2400 may employ opto-electronic components that implement imaging architectures of FIG. 9A or FIG. 9B, or one of FIGS. 11A-11D. By reducing processing requirements, electronic device 2400 may be constructed with a less expensive processor or with less memory. Those skilled in the art appreciate that memory savings may similarly translate to other memory devices or cards 2416, resulting in further savings.

As those in the art appreciate, electronic device 2400 may further include other electronics 2420 to incorporate other desired operation and functionality, for example cell phone functionality.

Figure 25:
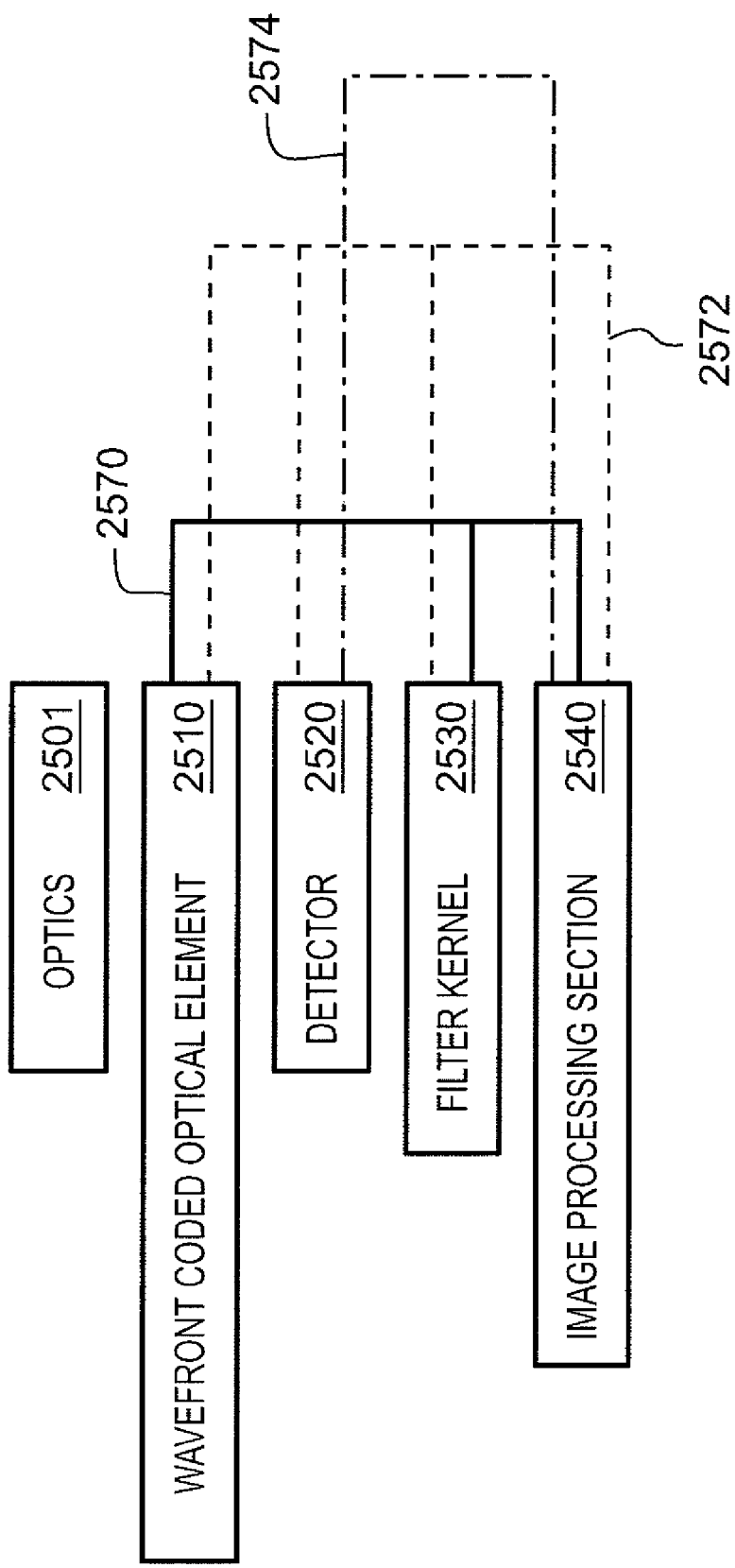
FIG. 25 illustrates select optimization trade-offs in a schematic diagram, between system components that are jointly optimized in a design phase to construct the optical imaging system.

It is therefore apparent that certain trade-offs or "optimizations" may be made within the above described wavefront coded optical imaging systems, to achieve image characteristic goals and/or cost goals, for example. By way of example, consider FIG. 25, illustrating components in a wavefront coded imaging system. Component optics 2501 is for example optics 201, FIG. 2. Wavefront coded optical element 2510 is for example wavefront coded aspheric optical element 210, FIG. 2. Detector component 2520 is for example detector 220, FIG. 2, while filter kernel 2530 is for example filter kernel 230, FIG. 2. Image processing section 2540 is for example section 240, FIG. 2.

FIG. 25 illustrates one three-component optimization 2570 utilizing a reduced set filter kernel 2530 (e.g., filter kernel 830, FIG. 8); optimization 2570 thus ties together (in design) wavefront coded optics 2510, filter kernel 2530 and image processing section 2540. A standard detector 2520 and optics 2501 are not necessarily optimized with optimization 2570, if desired. In another example, one four-component optimization 2572 utilizes a detector 2520 with a particular readout format (e.g., as in FIG. 9A, 9B). In optimization 2572, therefore, wavefront coded optics 2510, filter kernel 2530 and image processing section 2540 are also tied together (in design). In an example optimizing color images (e.g., as in FIG. 10), one two-component optimization 2574 can include a color-specific detector 2520 tied together (in design) with image processing section 2540. As those in the art appreciate, optics 2501 may be optimized with any of optimizations 2570, 2572, 2574 to achieve imaging characteristics that support other optimizations, for example.

In certain embodiments herein, the form of optics and optical elements used in the above-described imaging systems are also optimized. Such form is for example to provide low variability to misfocus-like aberrations, high MTFs, and low noise gain values. As described in more detail below, these optics and optical elements may make up, or be part of, imaging systems such as microscopes, endoscopes, telescopes, machine vision systems, miniature cameras, cell phone cameras, video cameras, digital cameras, barcode scanners, biometrics systems, etc. In two easy to describe examples, optical forms of wavefront coded optics suitable for system optimization herein may include weighted sums of separable powers, $p(x,y)=\text{Sum } a_i\ [\text{sign}(x)|x|^{bi}+\text{sign}(y)|y|^{bi}]$ and the cosinusoidal forms $p(r,\theta)=\text{Sum } a_i\ r^{bi}*\cos(c_i*\theta+\phi_{ii})$. As described in more detail below, the optics also may include specialized contour surfaces (sometimes denoted herein as "constant profile path optics") that provide phase variation within the wavefront coded optical element (e.g., element 210, FIG. 2). Again, the wavefront coded optical element and optics (e.g., element 210 and optics 201, respectively) may be combined as a single optical element or system (e.g., utilizing lenses and/or mirrors). In one example, the optics produce an MTF within the optical imaging system with a frequency domain that is complementary to the kernel filter; for example, high power within the MTF implies low power in filter kernel. The MTF and filter kernel may provide a degree of spatial correlation (e.g., between the filter kernel and wavefront coded aspheric optical element) such as described herein.

As noted above, these wavefront coded imaging systems have non-traditional aspheric optics and image processing.

One possible goal for such systems is to produce a final image that is substantially insensitive to misfocus-like aberrations. This insensitivity supports (a) a large depth of field or depth of focus, (b) tolerance to fabrication and/or assembly errors that for example create misfocus-like aberrations, and/or (c) optically-generated misfocus-like aberrations (e.g., spherical aberrations, astigmatism, petzval curvature, chromatic aberration, temperature-related misfocus). Internal optics within such imaging systems form images with specialized blur that may also be insensitive to these misfocus-like aberrations. Moreover, the effects of coma can also be reduced within such wavefront coded optical imaging systems. After capture by a detector (e.g., a digital detector 220 capturing the intermediate image to generate a digital data stream 225, FIG. 2), image processing may operate to remove the blur associated with the intermediate image to produce a final image that is sharp and clear, and with a high signal to noise ratio (SNR).

The design process to enable such wavefront coded imaging systems may be such that the optical system is insensitive to misfocus-like aberrations, the size and shape of the point spread function (PSF) is compact and constant as a function wavelength, field angle, object position, etc, and the resulting MTF has high values. The following constant profile path optics provide efficient designs for use in such systems.

Certain constant profile path optics are based on parametrically efficient descriptions (e.g., low number of parameters) of optical form; such form may for example support high performance optical imaging systems with selected imaging and/or cost characteristics. In general, these parametrically efficient forms are not required. That is, the surface height of each part of the aspheric surface can be designated as an independent variable used in design and optimization; however, the number of variables to optimize this general case is extremely large and impractical. Constant profile path optics thus facilitate a powerful and general optical form for use in design and optimization.

In one embodiment, constant profile path optics include aspheric optical elements where the surface height is defined along paths and where the functional form, or profile, of the surface is the same along normalized version of the paths. The actual surface height varies from path to path, but the functional form or profile along each path does not. Such surface profiles on an optical element operate to modify phase of a wavefront within the optical system; image effects caused by these phase changes are then reversed in image processing, e.g., through operation of the filter kernel. By way of example, when certain constant profile path optics have modified wavefront phase within the optical imaging system, the resulting MTF at the intermediate image (captured by a detector) correlates to the functional and spatial characteristics of the filter kernel used in image processing. The constant profile path optics and the filter kernel may therefore be complementary to one another to provide the desired imaging characteristics.

Figure 26:
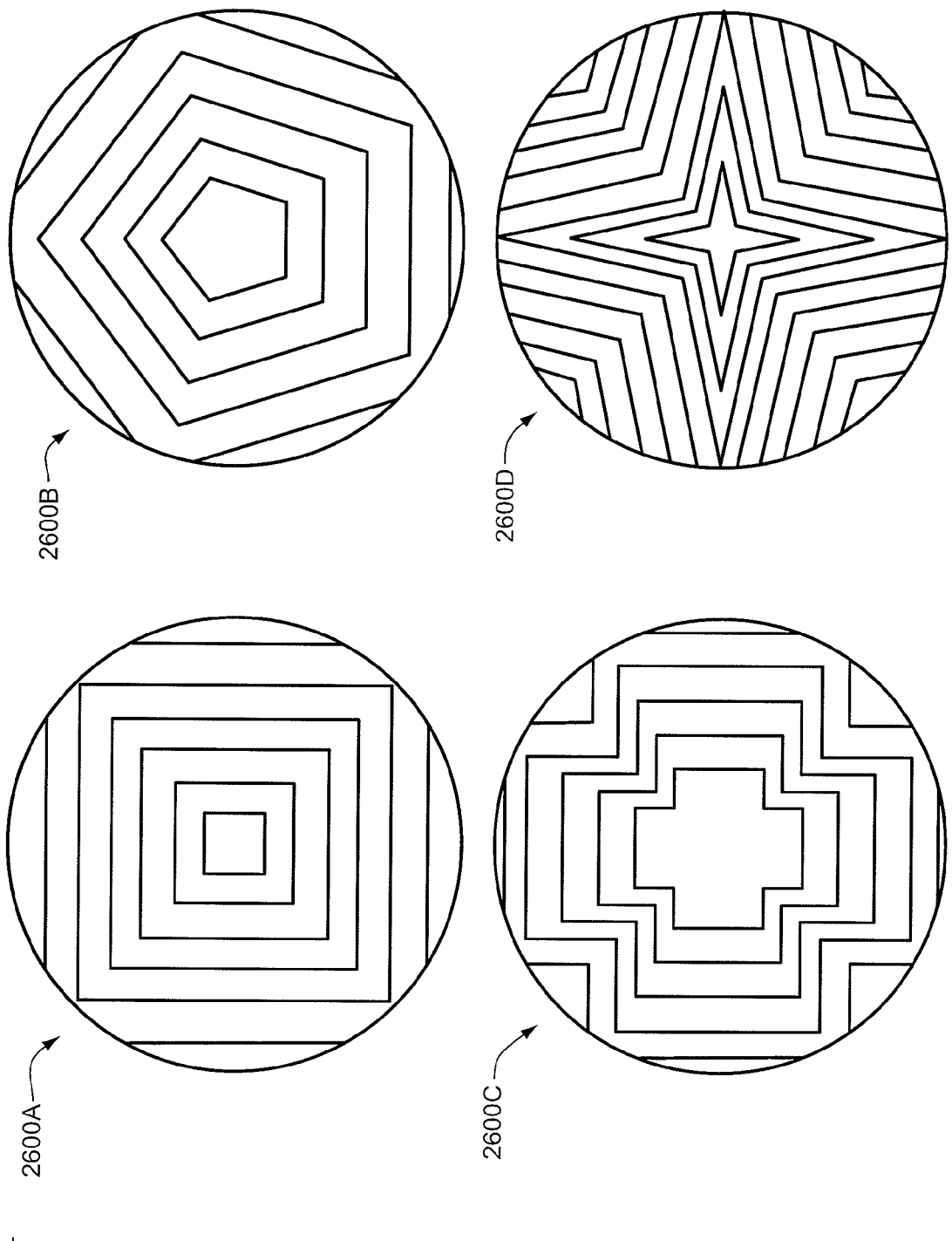
FIG. 26 illustrates select profiles for constant profile path optics.

Four examples 2600A-2600D of constant profile path optics are shown in FIG. 26. Consider for example the paths within profile 2600A. These paths are along square contours of the optics; for this optic form, the normalized surface height is the same over normalized versions of the square contours. The paths of profile 2600B are pentagon-shaped; the functional form of the surface height along a normalized version of each pentagon is the same. The paths of profiles 2600C and 2600D are cross- and star-shaped, respectively. Similar to profiles 2600A, 2600B, such functional forms have common normalized surface heights along common paths.

Figure 27:
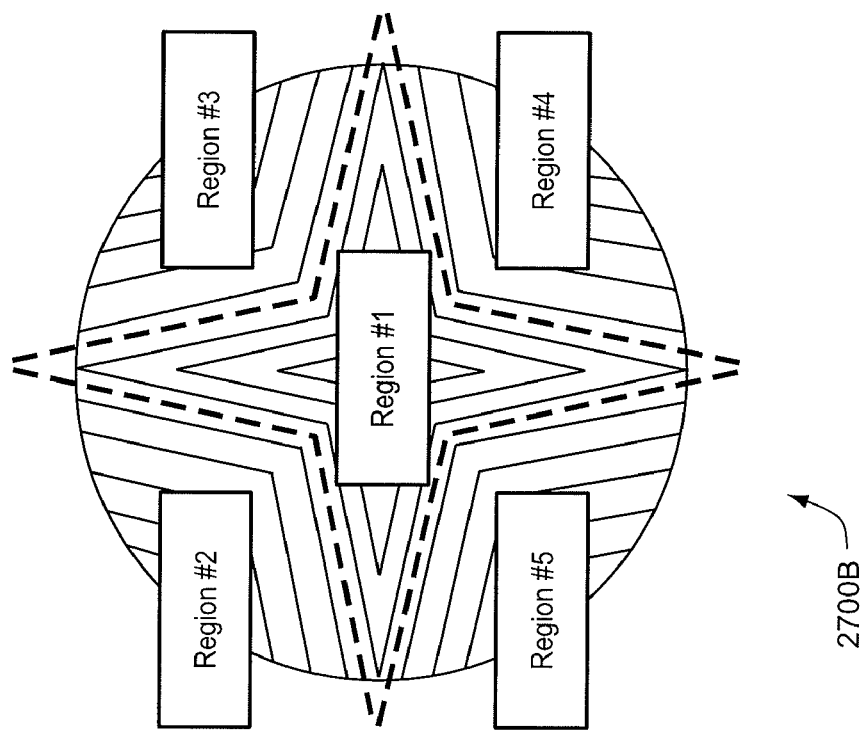
FIG. 27 illustrates select profiles for constant profile path optics.
Figure 27:
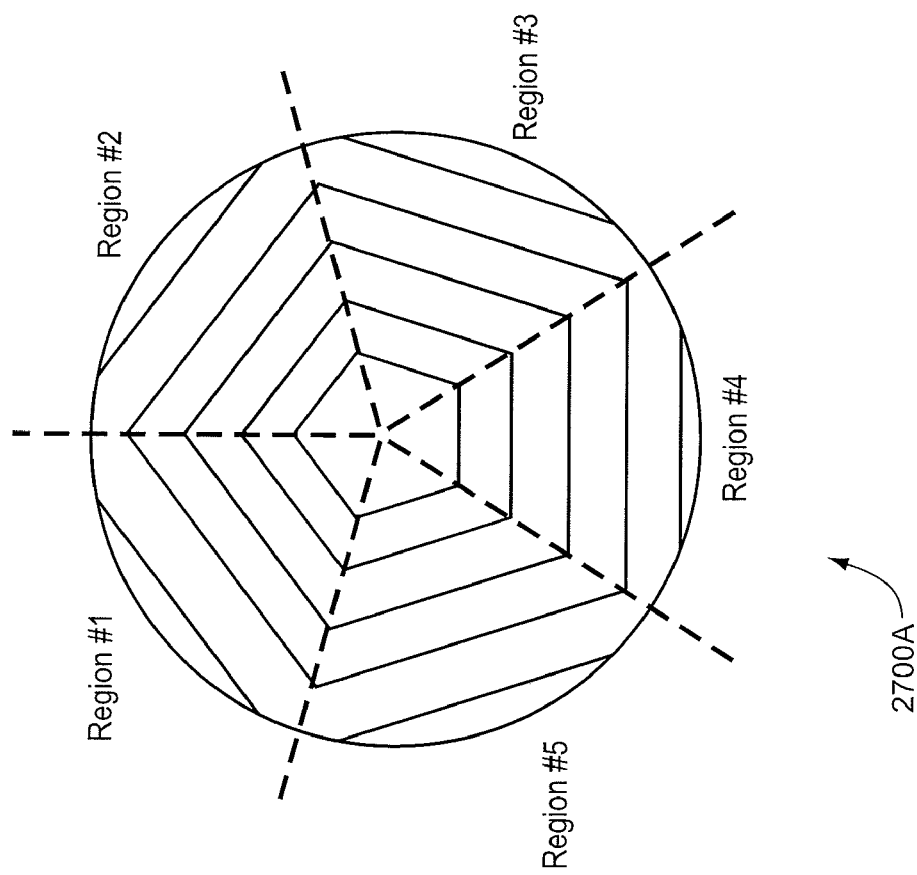

FIG. 27 shows other variations 2700A, 2700B in constant profile path optics. Profile 2700B represents wavefront coded optics where the paths traces can have closed contours, such as shown by region #1. The paths in profile 2700A on the other hand trace open contours. In both profiles, region #1 contains a set of related paths. The functional form of the surface height along a normalized version of each path in region #1 is the same. The same is true for regions 2, 3, 4 and 5. The actual surface height along each path within each region can be different. The functional forms over different regions can be related or not. The optics of profile 2700B shows a combination of paths that are open and closed; the paths of region #1 trace closed contours while the paths of the other four regions trace open contours. Accordingly, the functional form of the surface height along each path may be the same for each region, yet the actual surface height can change within the region.

As those skilled in the art will appreciate, one of several variations of the path profiles shown in FIG. 26 and FIG. 27 may include non-straight line paths. That is, straight line paths such as shown in profiles of FIG. 26 and FIG. 27 may take other forms wherein the paths are composed of curved segments. For example, the pentagon shaped form of profile 2700A split into straight line regions may instead be of circular form with separate regions defining arcs as the paths.

Figure 28:
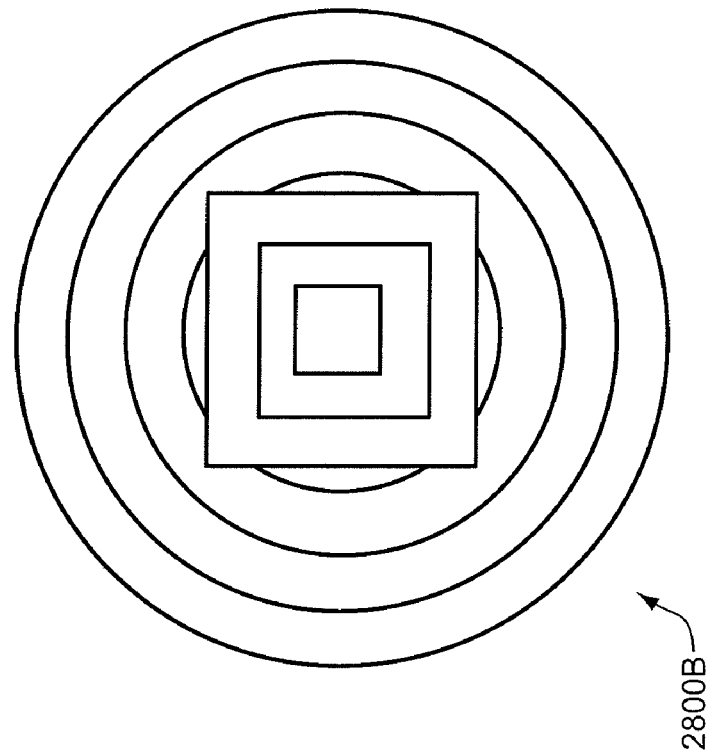
FIG. 28 illustrates select profiles for constant profile path optics.
Figure 28:
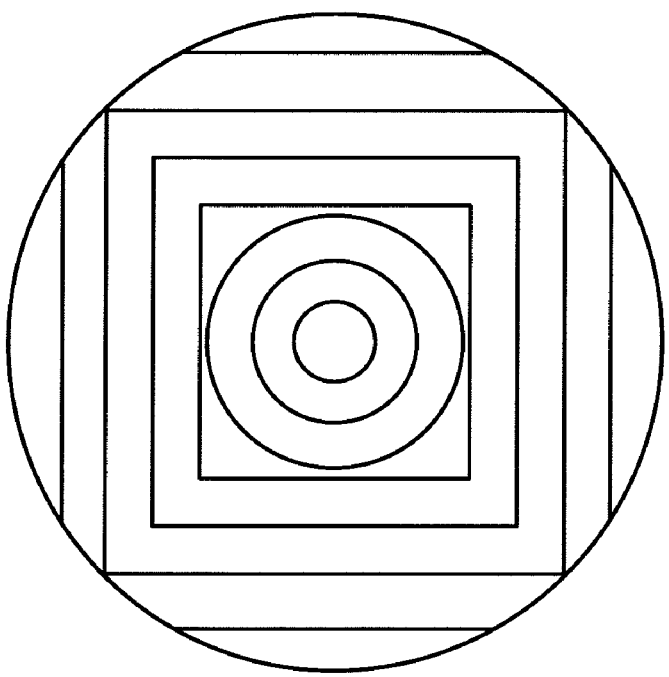

The type of path traced in constant profile path optics can also change over different regions, as in FIG. 28. The paths in the outer region of profile 2800A trace closed square contours, while its inner region paths trace closed circular contours. These inner and outer regions can be reversed, as shown by profile 2800B. Only some of the paths in the outer region can be closed, as shown in 2800B.

Figure 29:
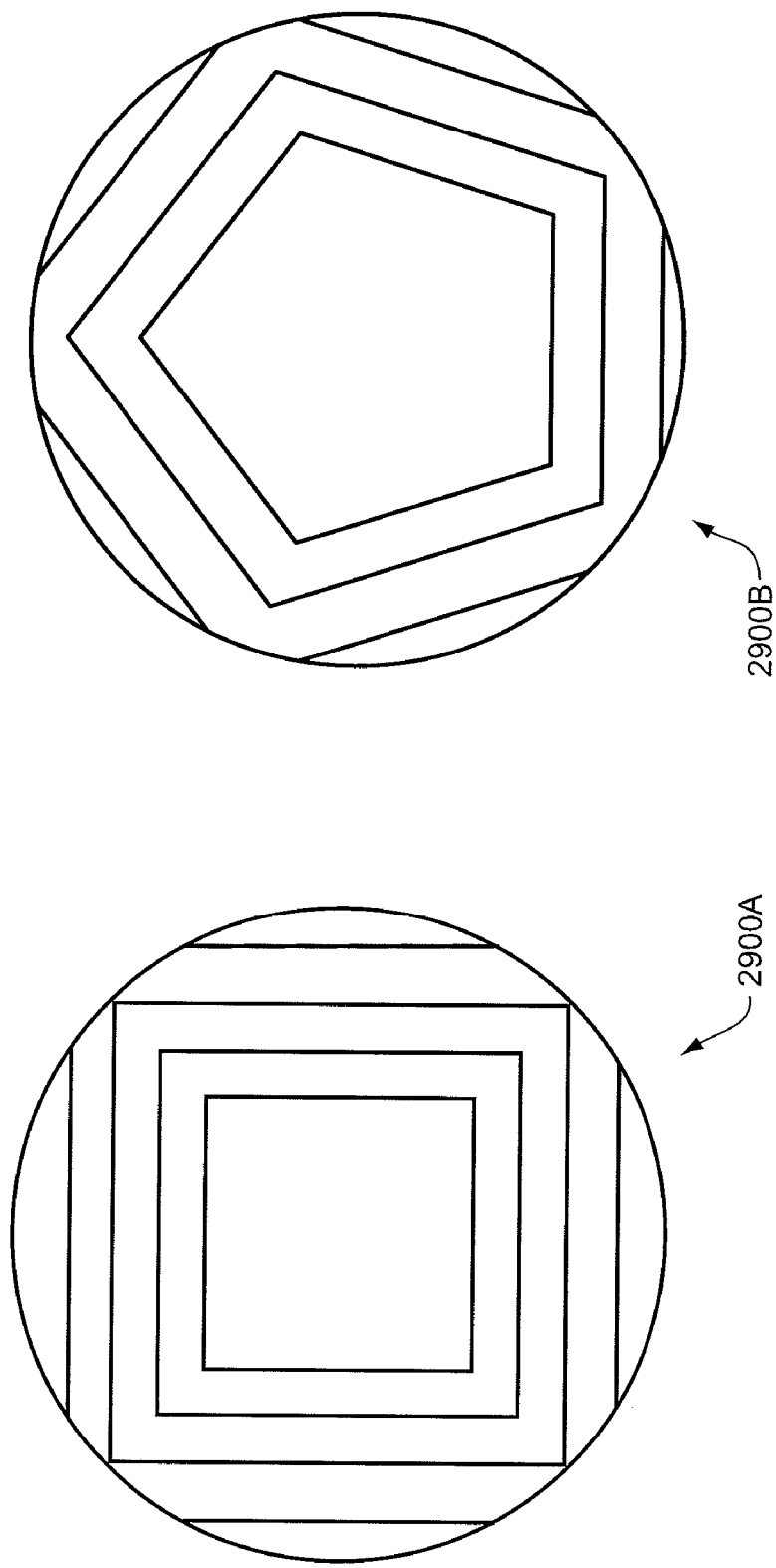
FIG. 29 illustrates select profiles for constant profile path optics.

FIG. 29 shows two profiles 2900A, 2900B where at least one region of the optics is not altered with constant profile path optics. In profiles 2900A, 2900B, the paths form contours only in the outer region of the optics; the inner region has no paths and thus has no specialized surface shape. The optics of profiles 2900A, 2900B may be thought of as the optics associated with profiles 2600A, 2600B, respectively, but with an amplitude of zero applied to the paths in the inner region.

The parameters that describe the specialized surfaces of FIG. 26-FIG. 29 may be considered as a composition of two components: 1) the parameters that describe the profile of the optical surface height along the paths of the particular optic and 2) the parameters that describe the surface height across the paths. The second set of components may for example describe an amplitude change for each path, and between each path, in a given region. If the amplitude of the set of paths in a region is set to zero, then optics as in FIG. 29 may result.

In one embodiment, the mathematical description of a surface of one region of a constant profile path optic is described as:

$$S(R,theta,\underline{a},\underline{b})=C(\underline{a})D(\underline{b})$$

where the optical surface along each path in the region is parameterized by C(a), and evaluated at D(b) for the particular path in the region. Parameters 'a' and 'b' define the characteristics of the particular surface. The contributions from C(a) are constant over all paths in a region. The contributions from D(b) change for each path in a region. Parameters C(a) may define the surface along each path and the overall surface modulated between or across the paths in a region of D(b). The optical surface of a constant profile path optics may also be separable in terms along the paths and across the paths for the particular optic.

Consider the optical surface of 2600A, where the paths define open sides of square contours. This leads to four regions, the left side, right side, top side, and bottom side. One example of a mathematical description of the surface profile along the paths of the four regions is:

$$C(\underline{a}) = a0 + a1x + a2x2 + \ldots \quad |x| < 1$$

Thus a set of parameters ai form a polynomial description of the surface height along each normalized path of the four regions of the optics. In this case, the length of each path in the regions is normalized to unity so that a "stretching" of the fundamental surface profile C(a) is applied to each path. The path length does not have to be considered a normalized length, although it may be useful to do so.

Each path can be modified by a gain or constant term without altering the functional form of the surface along each path. One example of the gain applied across the paths in a region can be mathematically described as $$D(\underline{b}) = b0 + b1(PathNumber) + b2(PathNumber)2 + b3(PathNumber)3 + \ldots$$

PathNumber=0,1,2,3,...

where the PathNumber parameter is a sequence of values that describes the set of paths in a region. The number of paths in a region may be large forming an essentially continuous surface. For example, the path of region #1 (profile 2700A) closest to the optical center can be assigned PathNumber=0, the adjacent path slightly farther from the optical center can be assigned PathNumber=1, the next adjacent path can be assigned PathNumber=2, and so on. The overall surface is then mathematically composed of the product of the "along the paths" surface description and the "across the paths" surface description. Mathematically, the surface description in one region may be given by:

$$S(R, theta, \underline{a}, \underline{b}) = C(\underline{a})D(\underline{b}), \text{ where the optical surface is now parameterized by the parameter vectors } \underline{a} \text{ and } \underline{b}.$$

If the functional form of the surface along the paths is a polynomial of second order, or less, then the second derivative along the normalized paths is a constant. In this special case, the constant profile path optics may for example be denoted as "constant power path optics." Constant power path optics are particularly effective forms for the wavefront coded optics. In terms of optical parameters, a second order polynomial C(a) can be described as:

$$C(\underline{a}) = \text{thickness} + \text{tilt} + \text{optical power},$$

where the zeroth order term $a_0$ describes the amount of thickness, the first order term $a_1 x$ describes the amount of tilt, and the second order term $a_2 x^2$ describes the amount of optical power. If higher order terms are used, then the amount of optical power, or second derivative, can change along the contour. Higher order terms can also more accurately model optical power since a second order polynomial is an approximation to a sphere.

For certain optical imaging systems, such higher order terms can be important. If the tilt parameter is non-zero, then optical surfaces with discontinuities may be described. Given the high degree of accuracy that free-form surfaces can be fabricated today, surfaces with discontinuities need not be avoided. For certain optical systems, the across-the-paths term D is chosen so that the central region of the optical surface is flat (or nearly flat). Often the slope of D can become quite large near the edge of the surface. The central region may also process optical imaging rays that need not change in order to control misfocus aberrations, as rays outside of the central region typically cause the misfocus effects within imaging systems.

Since central rays contribute less to misfocus effects then the outer rays, the shape of the contours can change for the central and outer regions to affect these rays differently. This allows shaping of the in- and out-of-focus PSFs, high MTFs, and customization of the power spectrum for digital filtering. The power spectrum of the digital filter modifies the power spectrum of the additive noise after filtering. Noise reduction techniques after filtering are thus increasingly effective by jointly designing the optics and digital processing for noise reduction and imaging, such as described above.

Examples of Constant Profile Path Optics

Figure 30:
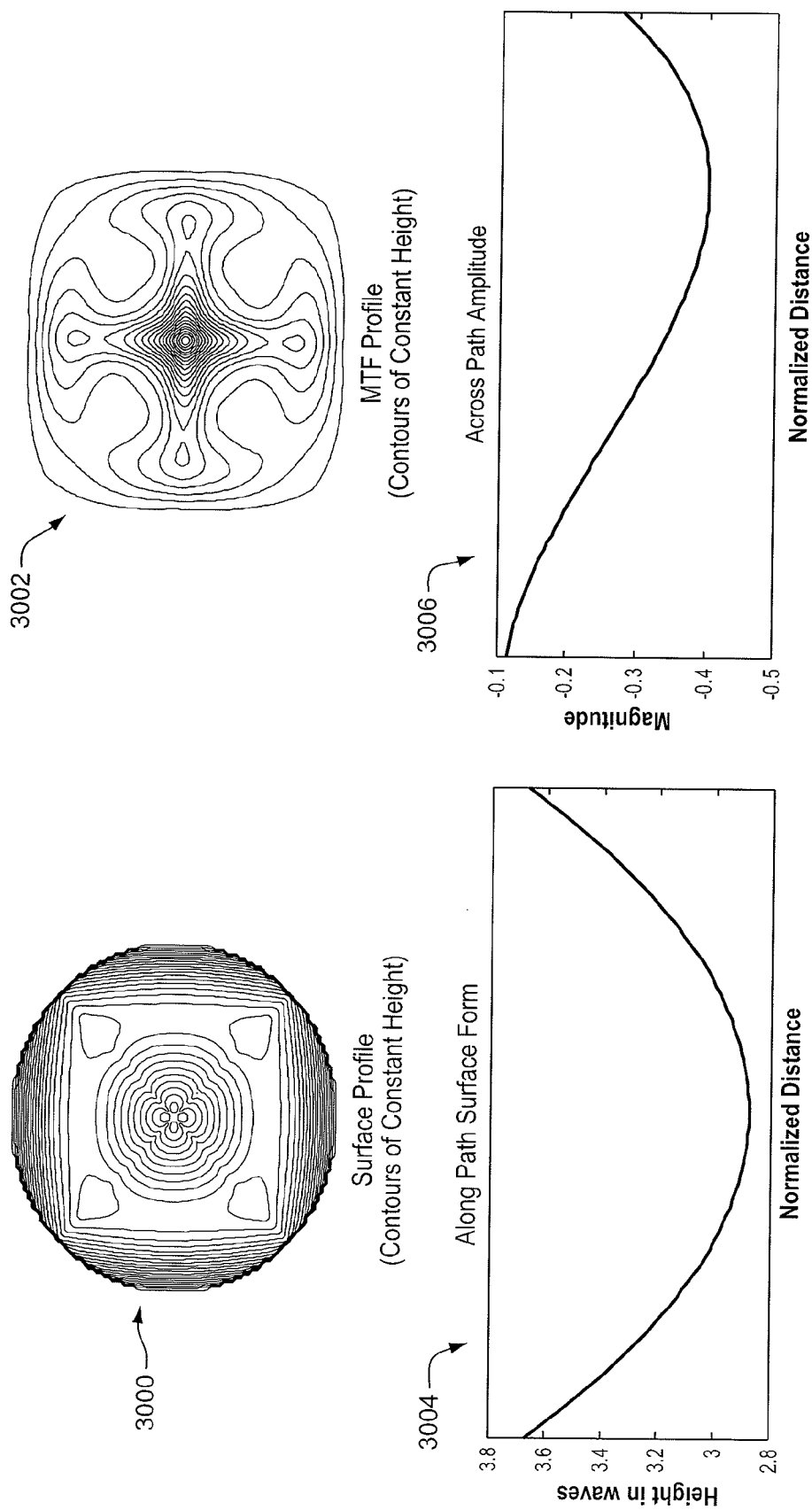
FIG. 30 shows a surface profile, resulting MTF, along and cross path surface forms for one profile of FIG. 16.

Certain constant profile path optics examples described below follow the form S(R,theta,a,b)=C(a)D(b) where the particular paths used are those of profile 2600A, with each side of the square contour defining one of four regions. FIG. 30 shows one surface profile 3000, its in-focus MTF 3002, and along the path surface form C(a) 3004 and across the path amplitude D(b) 3006. A third order polynomial has been used for across the path amplitude 3006 and a second order polynomial has been used for the along the path surface form 3004. This type of optics has an approximately constant amount of optical power along the normalized square path contours. The surface profile 3000 and in-focus MTF 3002 have been drawn via contours of constant surface and MTF height. Notice that the constant height contours vary from roughly circular to rectangular along the diameter of the surface. The resulting in-focus MTF has non-circular contours that roughly follow a "+" shape. The functional form in waves along the paths and across the path amplitude is shown in the bottom graphs 3004, 3006. About one wave of optical power is used along the sides of the paths (as shown by the minimum of 2.8 and a max of 3.8 waves) with an amplitude variation between −0.1 and −0.4 across the paths.

Figure 31:
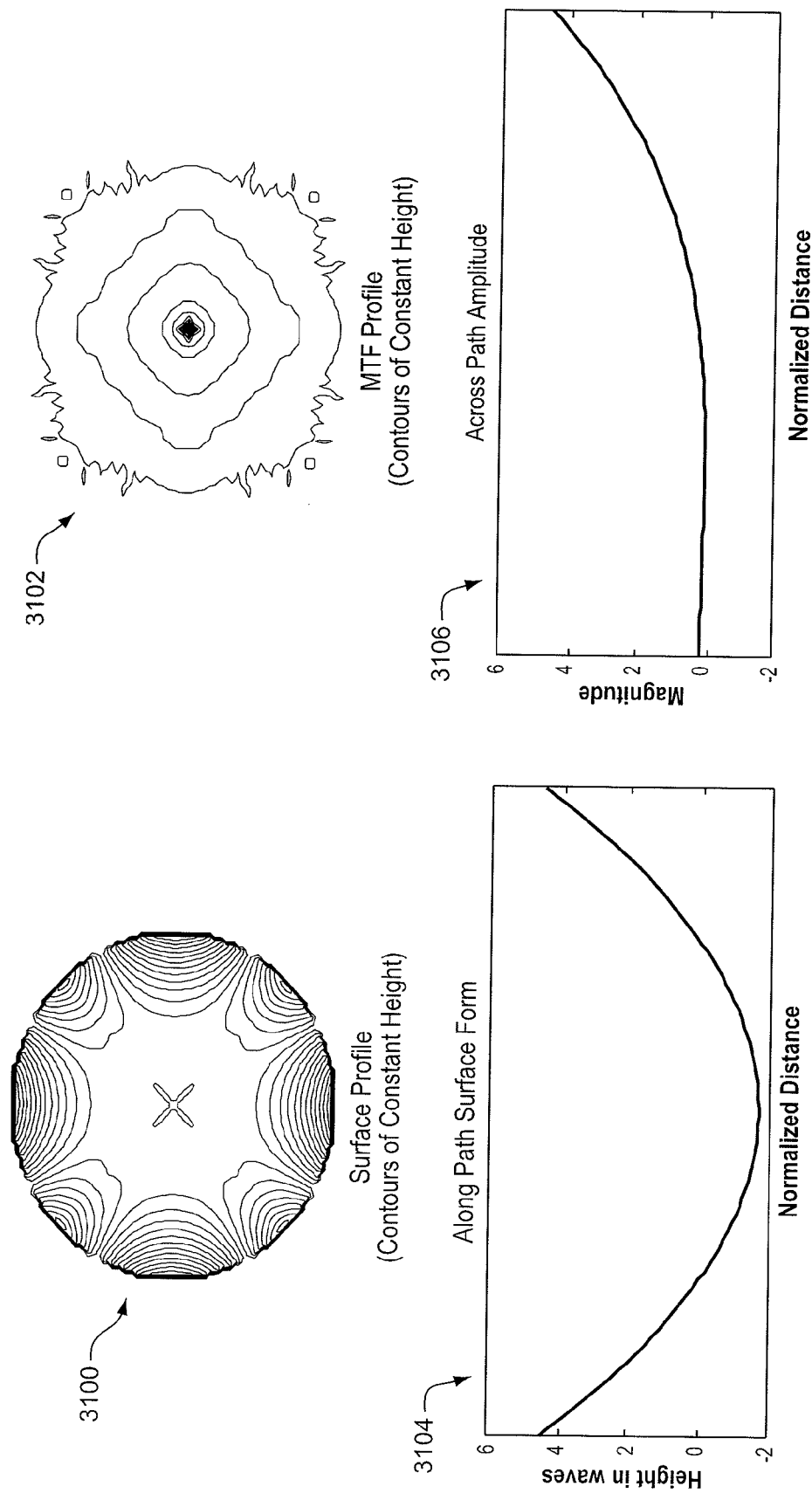
FIG. 31 shows one other surface profile, MTF, and along and cross path surface forms.

Another example of constant profile path optics is shown in FIG. 31. The polynomial form S(R,theta,a,b)=C(a)D(b) is used, with C(a) being a second order constant optical power polynomial and D(b) being a third order polynomial. Notice that the surface profile 3100 and MTF 3102 are very different from those of FIG. 30. The MTF 3102 for this example is more compact then MTF 3002 of FIG. 30, with asymmetry also less pronounced. About six waves of optical power are used along the sides of the path contours as shown in 3104, with an increasing amplitude used across the paths having a maximum value of about 4.

Figure 32:
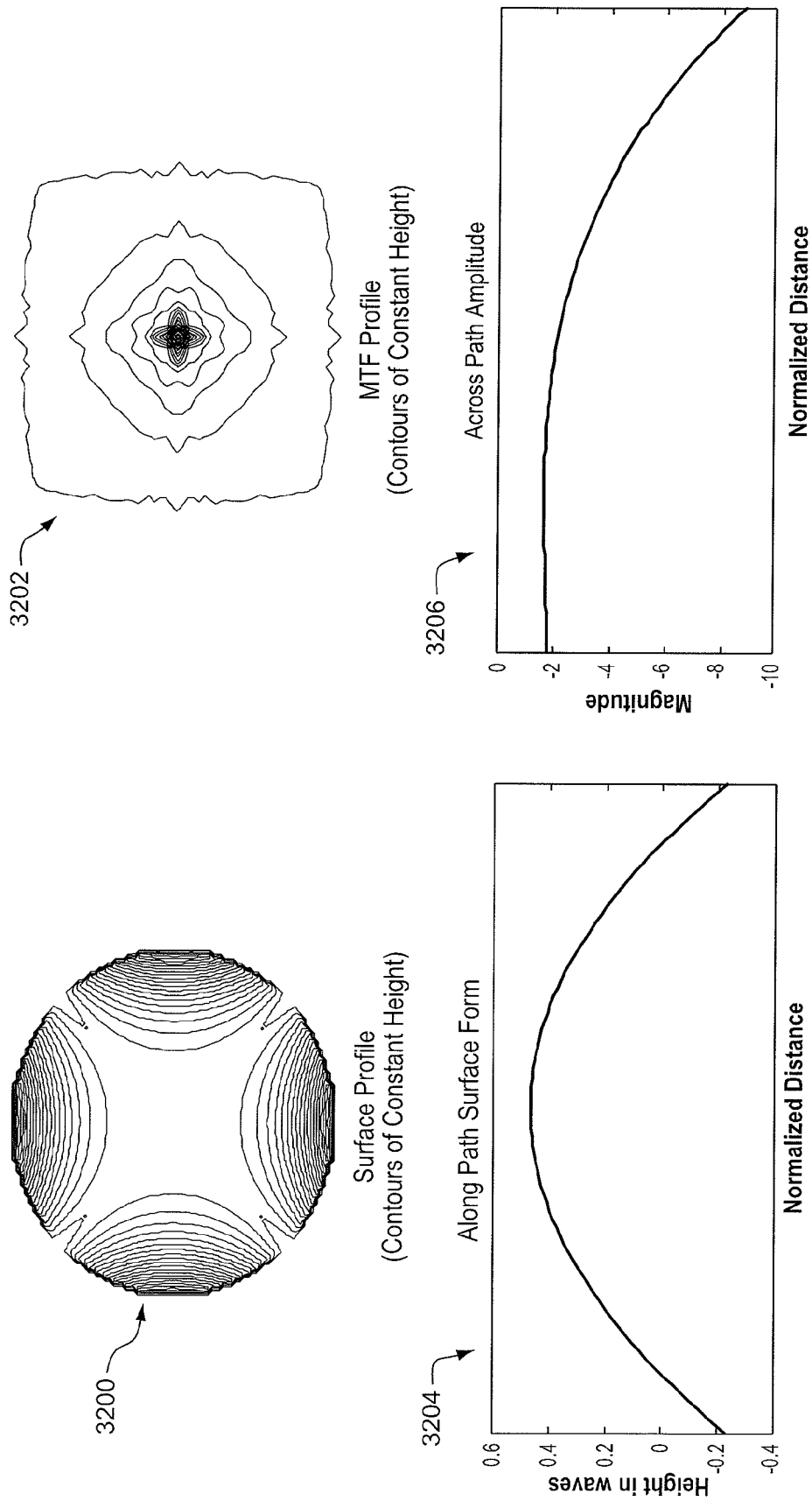
FIG. 32 shows one other surface profile, MTF, and along and cross path surface forms.

FIG. 32 shows another example that follows the form of FIG. 30 and FIG. 31 with a second order constant optical power polynomial describing the functional form along the paths and a third order polynomial describing the across the path amplitude; except the form of the amplitude function changes to allow a flat center region. The surface profile 3200 has a four-sided nature with a flat center, while its resulting MTF 3202 is roughly a four sided pyramid. Such an MTF shape 3200 is suitable for non-uniform sampling, such as found on the green channel of three color Bayer color filter array detectors (see FIG. 16-23). Less then one wave of optical power is used along the paths 3204 with an amplitude variation from 0 to −9 used across the paths 3206.

Figure 33:
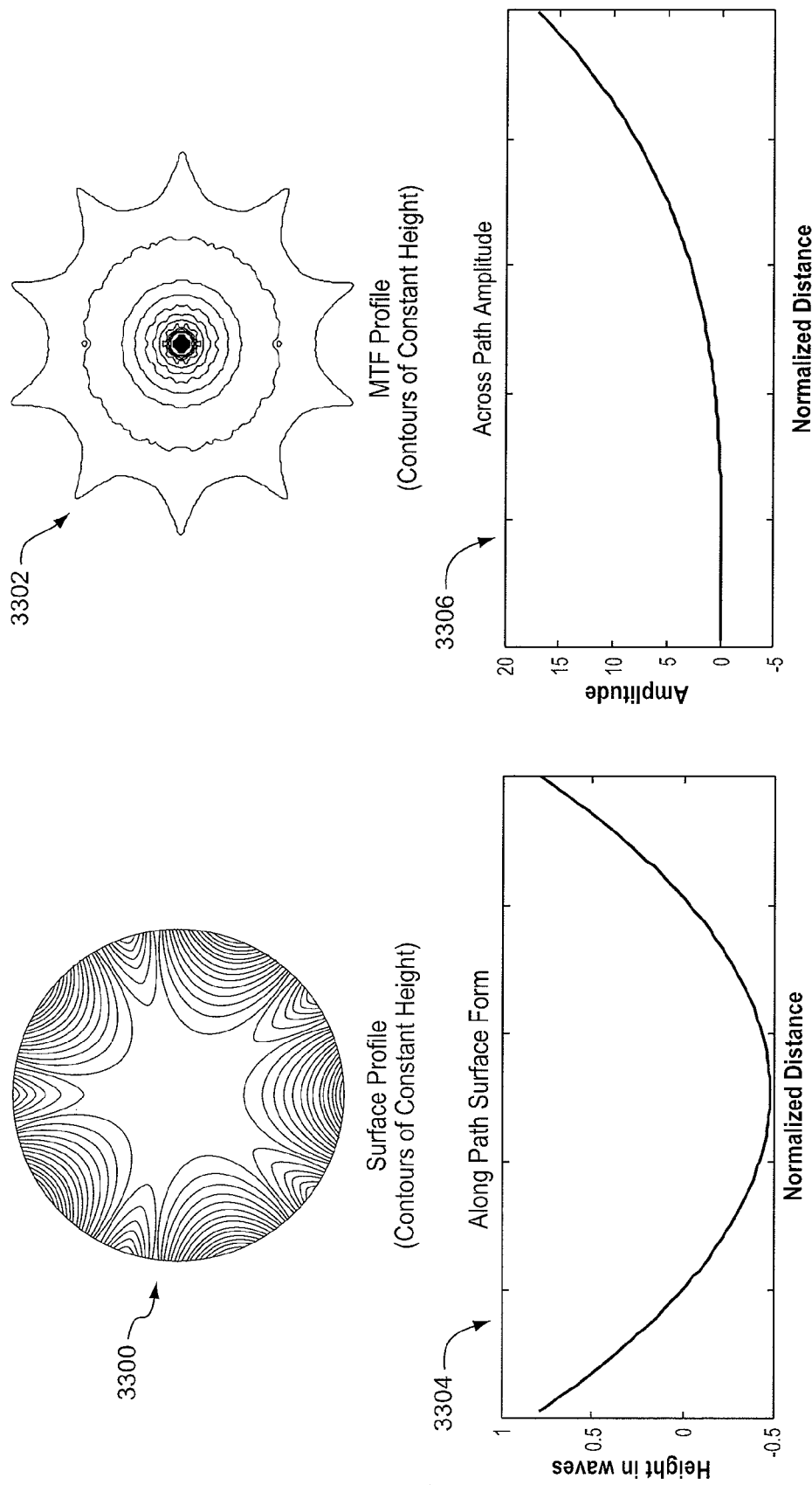
FIG. 33 shows one other surface profile, MTF, and along and cross path surface forms relating to one profile of FIG. 26.

FIG. 33 shows one example of a constant profile path optics with pentagon-shaped paths as in profile 2700A, FIG. 27. For this example, the functional form of the surface is the same for each straight line segment within the five open pentagon path regions. A second order polynomial describes the surface along the paths (3304) while a third order polynomial describes the amplitude across the paths (3306). The optical surface (profile 3300) has ten unequally shaped lobes and a fairly flat central region. The corresponding MTF 3302 has near-circular form about the center of the 2D MTF plane.

About 1.5 waves of optical power is used along the paths 3304 with an amplitude of zero to 18 used across the paths 3306.

Figure 34:
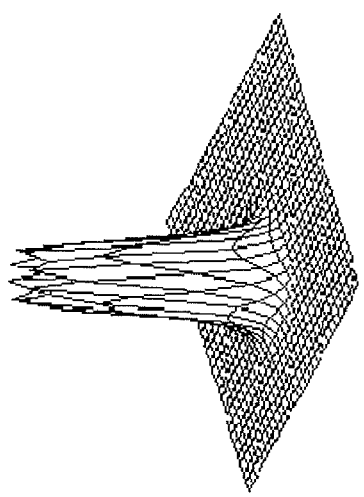
FIG. 34 shows sampled PSFs from the example of FIG. 32 and without wavefront coding.
Figure 34:
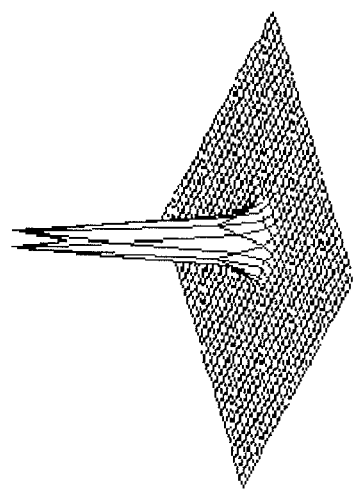
Figure 34:
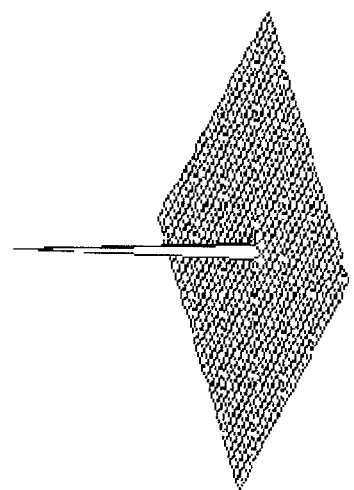

FIG. 34 shows the sampled PSFs from the example of FIG. 32 without wavefront coding, and for a range of defocus values. The small squares in each mesh drawing of each PSF represent individual pixel samples (output from the detector). The physical parameters used to generate these PSFs are: 10 micron illumination wavelength; grayscale pixels with 25.4 micron centers and 100% fill factor; working F-number of the optics is 1.24; misfocus aberration coefficient $W_{20}$ varies from 0 to 2 waves. Accordingly, it is apparent that without wavefront coding, the sampled PSFs have an unavoidable large change in size due to misfocus effects.

Figure 35:
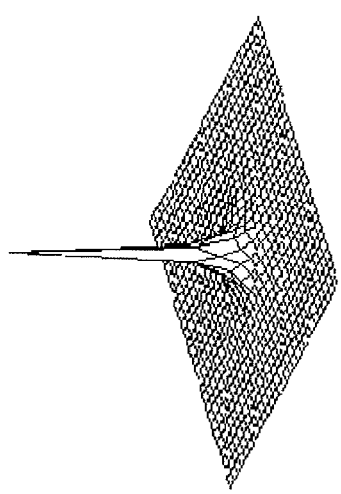
FIG. 35 shows sampled PSFs from the example of FIG. 32 and with wavefront coding.
Figure 35:
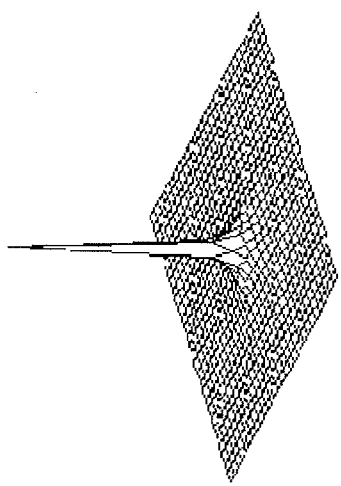
Figure 35:
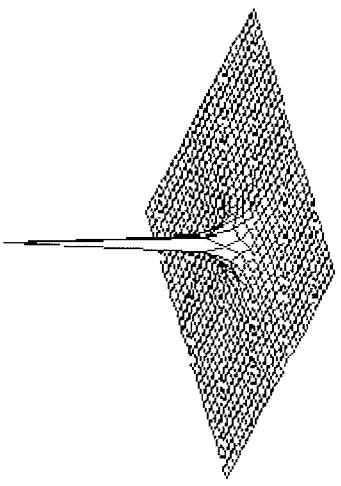

FIG. 35 similarly shows the sampled PSFs from the example of FIG. 32 but with wavefront coding. Notice that the sampled PSFs (for the range of defocus values) have a sharp spike and a broad pedestal that decreases with the distance from the sharp spike. Each of the PSFs is similar and essentially independent of misfocus. The small squares in the mesh drawing again represent individual pixels.

Figure 36:
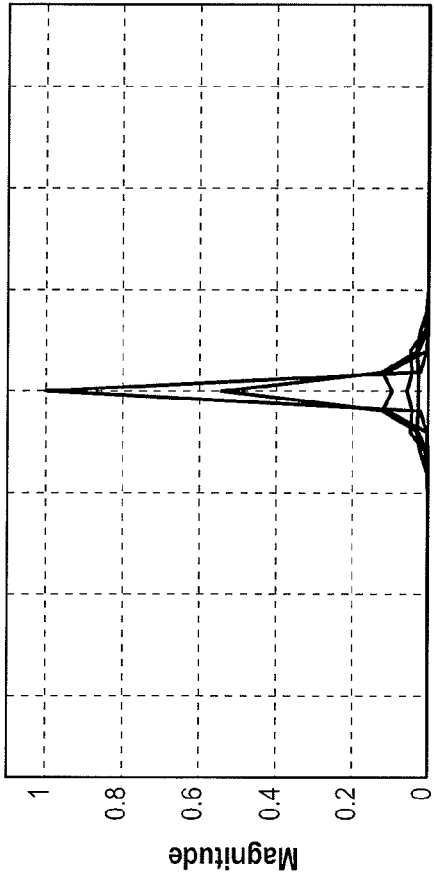
FIG. 36 and FIG. 37 show and compare cross sections through sampled PSFs from FIG. 34 and FIG. 35.
Figure 36:
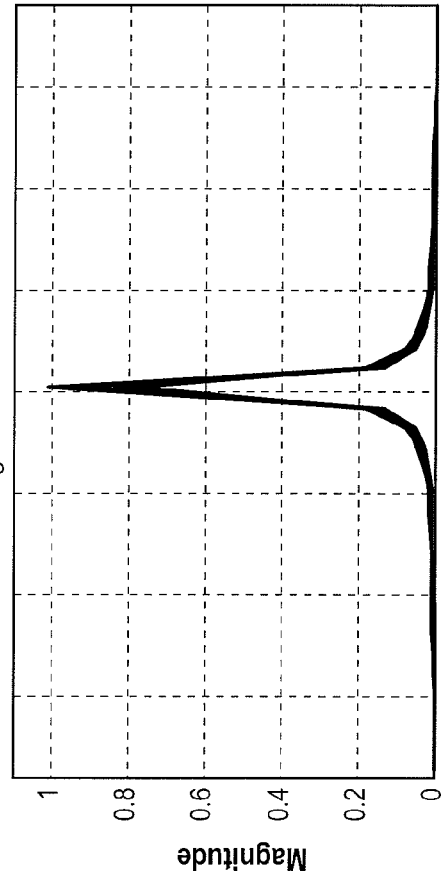
Figure 37:
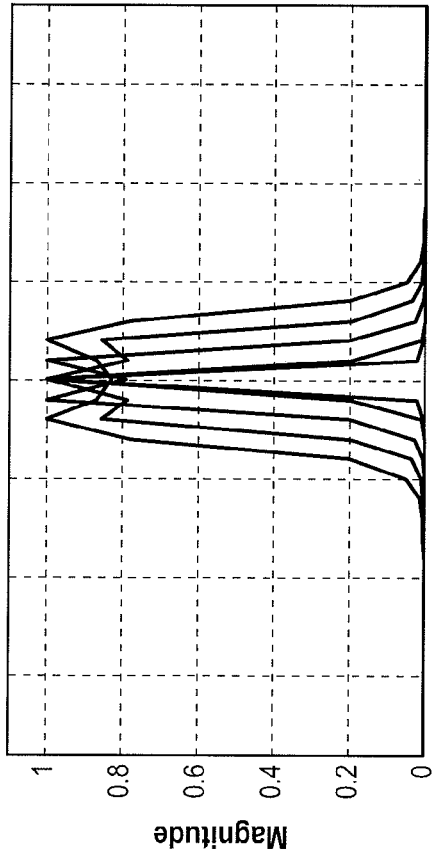
Figure 37:
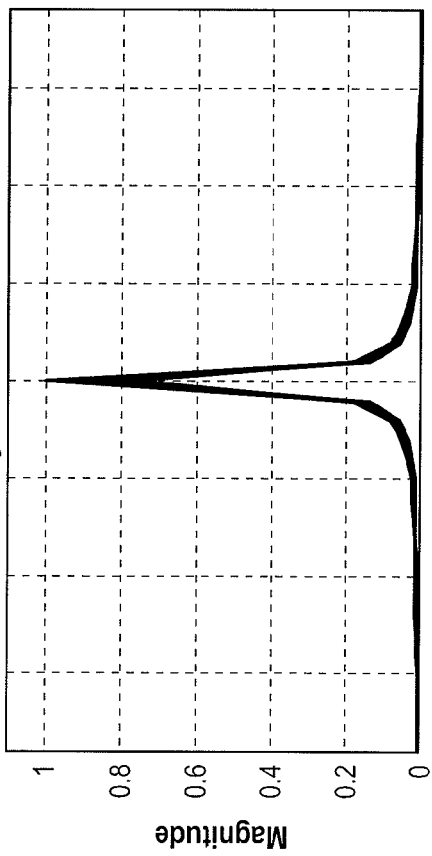

FIG. 36 and FIG. 37 show and compare cross sections through sampled PSFs from FIG. 34 and FIG. 35. The PSFs of FIG. 36 and FIG. 37 are shown with five misfocus values evenly spaced between 0 and 2 waves. The sampled PSFs in FIG. 36 are normalized to constant volume, while the PSFs in FIG. 37 are normalized for a constant peak value. FIGS. 36 and 37 thus illustrate changes in the sampled PSFs of the system without wavefront coding and the lack of change in the sampled PSFs with wavefront coding.

Figure 38:
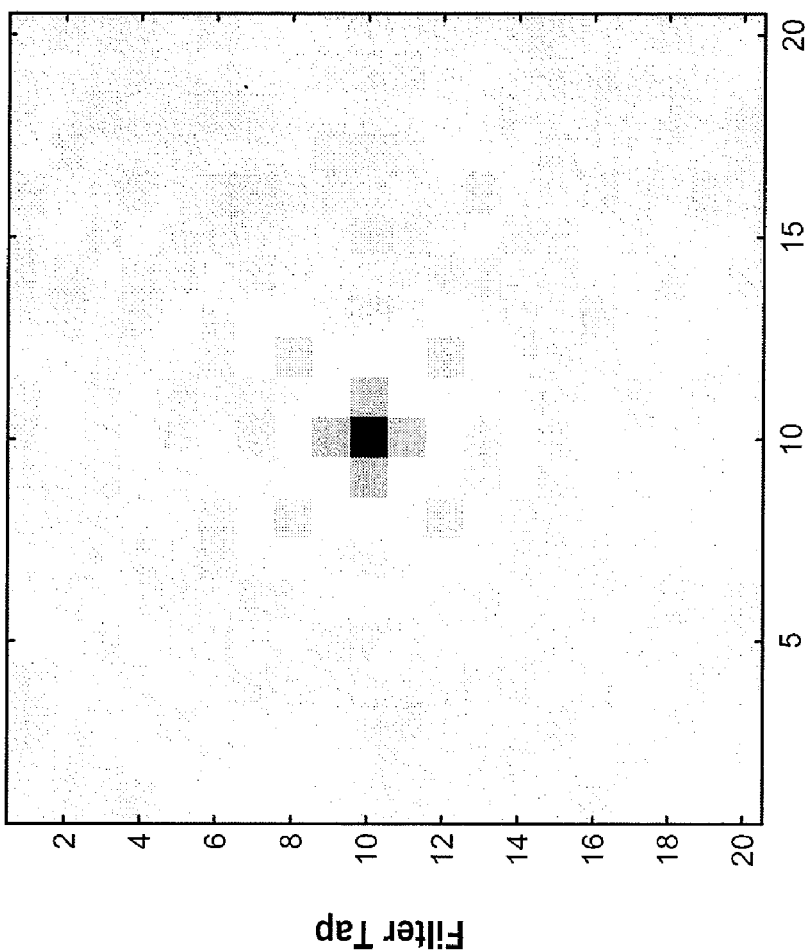
FIG. 38 shows an example of one 2D digital filter.

FIG. 38 shows an example of one 2D digital filter (plotted as an image and based on zero misfocus PSF) that may be used to remove the wavefront coding blur from the sampled PSFs of FIG. 35. This digital filter is for example used within image processing (e.g., within section 240, FIG. 2) as a filter kernel. Notice that this kernel has high values only near the center of the filter and decreasing values related to the distance from the center. The filter, and the sampled PSFs of FIG. 35, are spatially compact.

Figure 39:
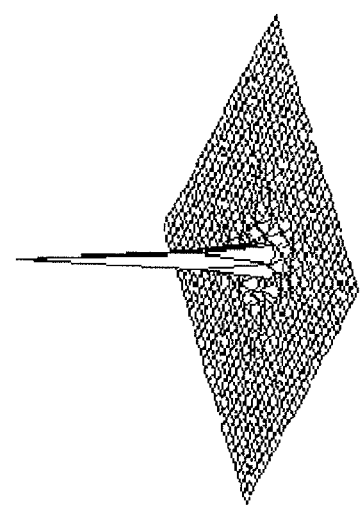
FIG. 39 shows a processed PSF through the filter of FIG. 38.
Figure 39:
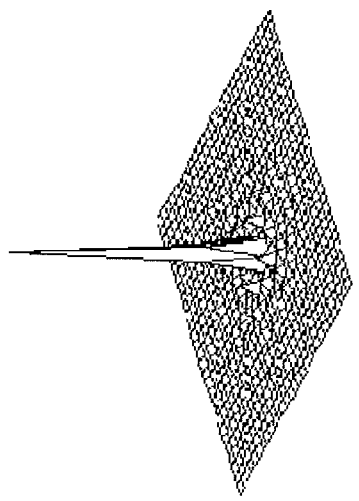
Figure 39:
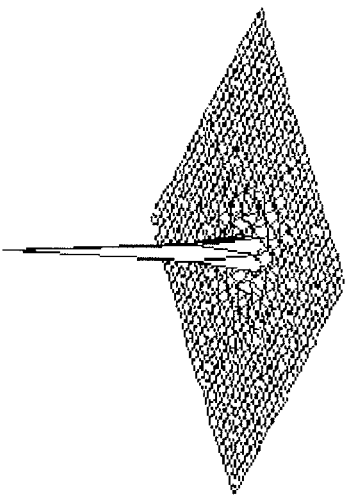

After using the 2D filter of FIG. 38 on the sampled PSFs of FIG. 35, the PSFs of FIG. 39 result. Notice that these PSFs (representing PSFs with wavefront coding and after filtering within an image processing section) have nearly ideal form and are essentially unchanged over the range of misfocus.

Figure 40:
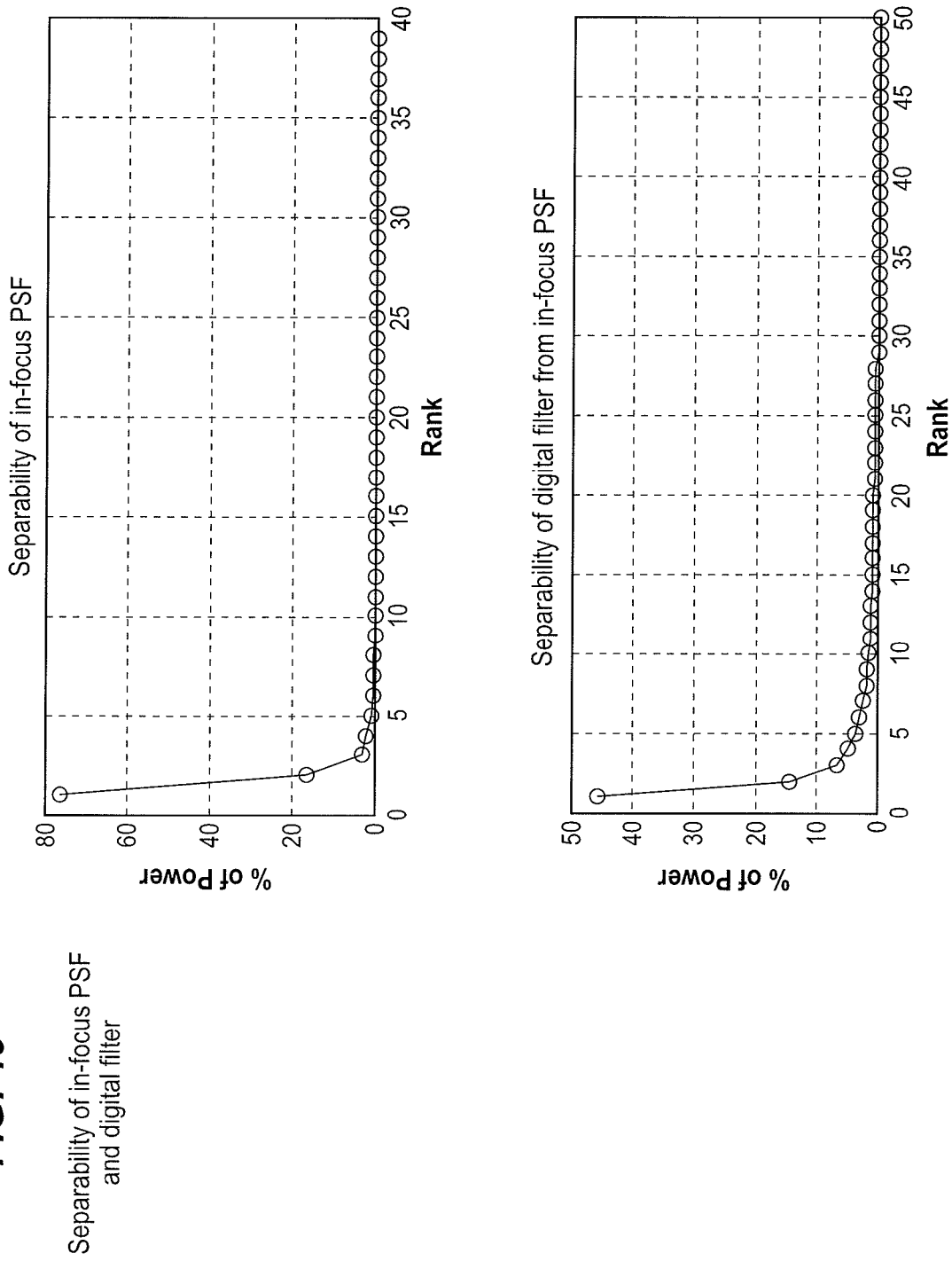
FIG. 40 illustrates an amount of rank power for the in-focus sampled PSF and the digital filter of FIG. 35 and FIG. 38, respectively.

FIG. 40 illustrates an amount of power contained in a geometric concept known as "rank" for the in-focus sampled PSF and the digital filter of FIG. 35 and FIG. 38, respectively. Rectangularly separable optics, such as a cubic described by $P(x)P(y)=\exp(j[X^3+Y^3])$, forms a sampled PSF that is closely approximated as $p(x)p(y)$, where the independent variables x and y are horizontal and vertical axes defined on a square grid. This separable nature allows rectangularly separable filtering that is computationally efficient. One drawback of rectangularly separable optics is that the PSF can spatially shift with misfocus. One useful feature of certain constant profile path optics is that they do not cause the PSF to spatially shift. Constant profile path optics may also produce PSFs, MTFs and corresponding digital filters that approximate low rank, to further facilitate efficient processing. The top plot of FIG. 39 shows that there are only two geometric ranks that have appreciable value for this particular sampled PSF; this system is thus approximated by a rank two system. The corresponding digital filter for this example (the lower plot of FIG. 39) is also low rank and can be made at least as low as the sampled PSF. In practice, the filtering of this example PSF may be accomplished with computationally efficient separable filtering.

Figure 41:
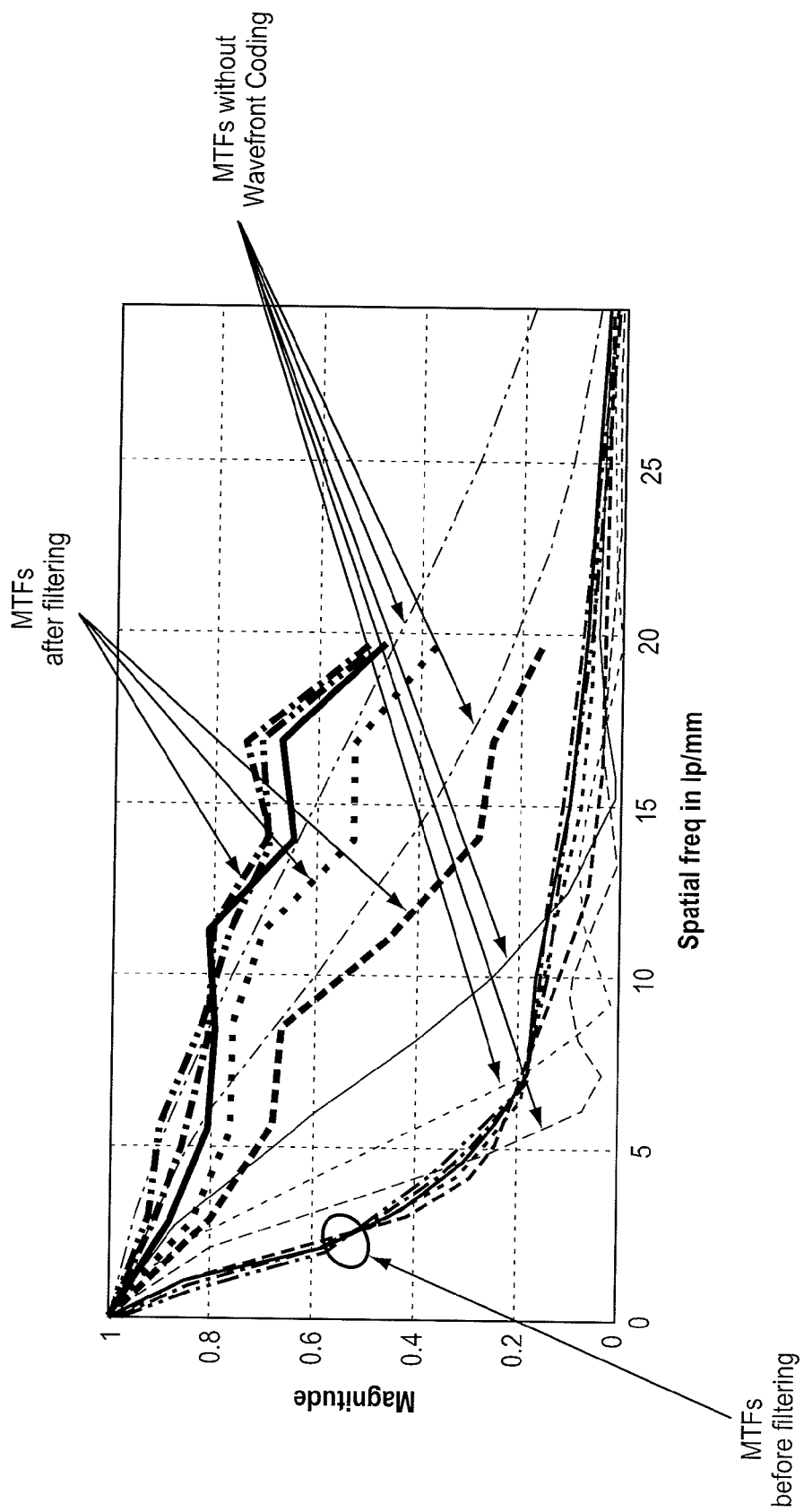
FIG. 41 shows corresponding MTFs before and after filtering and in the spatial frequency domain.

FIG. 41 shows the corresponding MTFs before and after filtering and in the spatial frequency domain. For comparison purposes, also shown are the MTFs of the identical physical system with no wavefront coding. Both systems are shown with misfocus values from 0 to 2 waves in five steps. The MTFs of the system with no wavefront coding is seen to drastically change with misfocus. The MTFs of the system with the constant profile path optics before filtering has essentially no change with misfocus. The filtered MTFs result from filtering by the 2D digital filter of FIG. 38; such MTFs have high values and degrade only for the largest misfocus value. As appreciated by those skilled in the art, other forms of constant profile path optics may control the MTF profile over larger amounts of misfocus by utilizing more processing capability and/or lower MTFs before filtering.

The mathematical form of the contour optics of FIG. 32 may be as follows. The polynomial description of functional form along the paths in four regions:

$$C(x)=0.4661-0.7013x^2, |x|<1$$

The polynomial description of across the path amplitude is:

$$D(y)=-1.8182+0.5170y+2.520y^2-10.1659y^3, \quad 0.25<y<1$$

$$=-1.8182, 0<y<0.25.$$

In this example, the form along the path contours is given by an even second-order polynomial; and the amplitude across the paths is given by a third order polynomial that changes form so that the central region is relatively flat. Using higher order polynomials for along the paths and for the across the path amplitude supports higher performance then shown in these examples.

Figure 42:
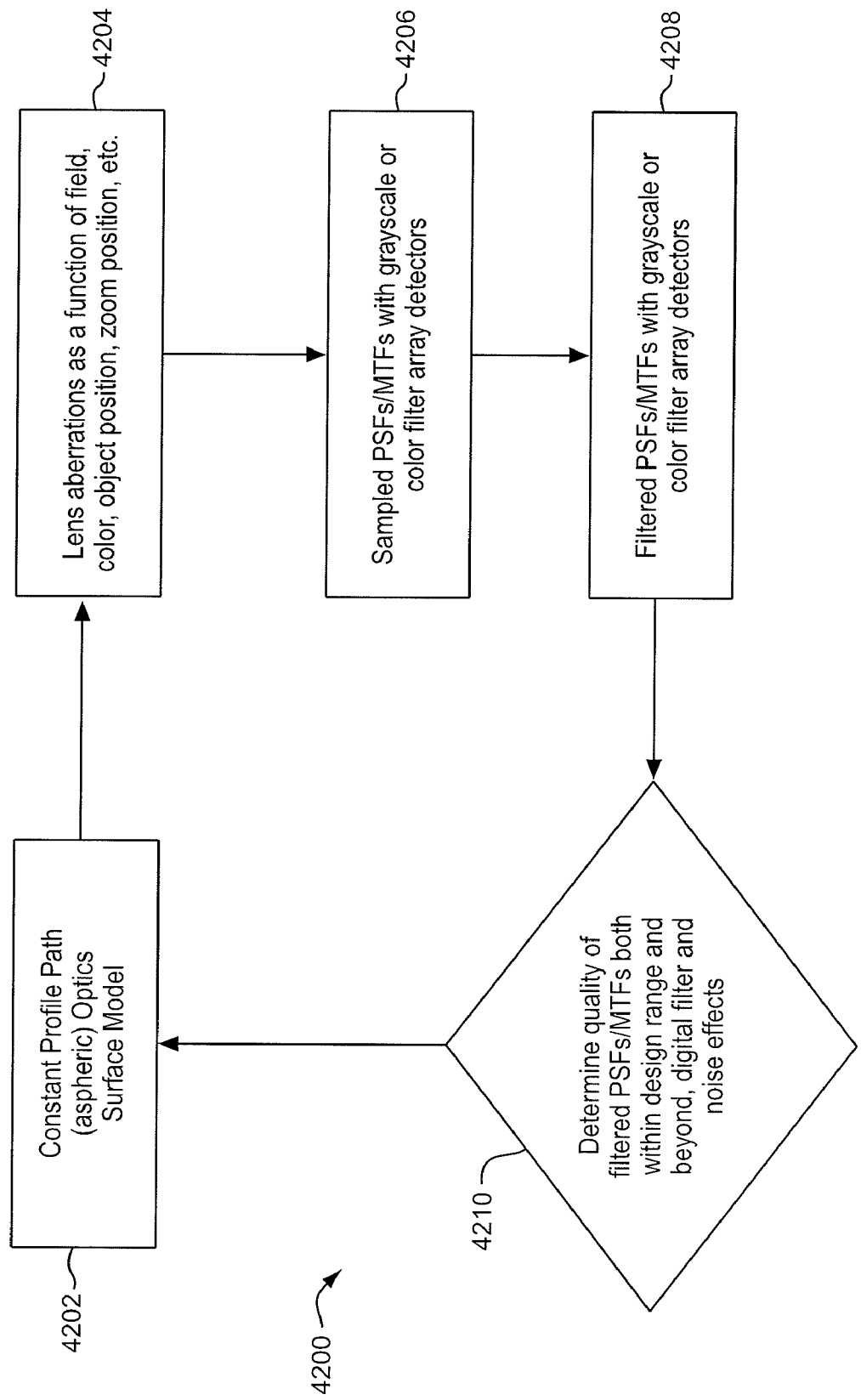
FIG. 42 shows one design process for optimizing optics, detector, wavefront coding optics, digital filter (filter kernel), and/or image processing hardware.

Constant profile path optics may be designed with specialized techniques that allow optimization with non-ideal optics that can have large amounts of aberrations, vignetting, and loose tolerances. These techniques allow optical system design that is not practical by traditional analytical methods. FIG. 42 illustrates a design process 4200 that illustrates certain of these techniques.

In process 4200, optics are modified (in design) and the loop may repeat, as shown. For example, process 4200 includes step 4202 to design constant profile path optics. With a model for the optical surfaces (step 4202), the effects of the lens aberrations can be added (step 4204) with information about the digital detector (step 4206) in order to accurately simulate the sampled PSF and MTF. These lens aberrations are in general a function of field angle, wavelength, object position and zoom position; the aberrations can also be a function of the particular surface form of the constant profile path optic (step 4202). One aberration considered in design process step 4204 is vignetting. While vignetting is often used in design of traditional optics to trade off light gathering for sharpness, vignetting within wavefront coding optics, can lead to a poor match between optical design and the actual optical system. The optical surfaces and aberrations that lead to sampled PSFs can be either simulated through ray-based methods or Fourier Transform methods depending on the speed of the lens being designed and the spatial resolution of the digital detector. Both of these general types of PSF simulation methods are well known to those skilled in the art of optical simulation.

After the sampled PSFs and MTFs have been simulated (steps 4204, 4206), a digital filter is used (step 4208) to remove wavefront coding blur. This digital filter can be general and calculated for each iteration in design process 4200 or can be fixed or limited in form. An example of a limited form digital filter is a rectangularly separable filter. If the digital filter is limited in this way, the design of the constant profile path optics may be optimized for minimum rank PSFs and MTFs since the rank of the separable filter is 1. Other limited digital filters are filters where costs are assigned to particular filter values and sequences of filter values in order to optimize the implementation (e.g., hardware) of the image processing section. These costs may be reduced or increased as part of design process 4200. Further examples of limited digital filters are those that have particular power spectrum characteristics. Since the additive noise is modified by the power spectrum of the digital filter, controlling the characteristics of the filter controls the characteristics of the additive noise after digital filtering. Noise Reduction techniques can be optimized jointly with the characteristics of the noise by limited the digital filter.

After the sampled PSFs/MTFs have been filtered (step 4208), a quality assessment is performed (step 4210). Assessment 4210 is typically system and application specific but may include (a) the quality of the filtered PSFs/MTFs both within and outside of the design range and/or (b) the characteristics of the digital filter (and/or its implementation and/or noise effects). The quality assessment is then used with non-linear optimization to modify the optics and repeat the iteration through process 4200. The modified optics can include particular surfaces that contain the wavefront coding as well as other surfaces, and/or thickness and distances of elements within the optical system. The parameters of the functional form along the paths and across the path amplitude can be similarly optimized.

Changes may be made in the above methods and systems without departing from the scope hereof. It should thus be noted that that the matter contained in the above description or shown in the accompanying drawings should be interpreted as illustrative and not in a limiting sense. For example, those skilled in the art should appreciate that although the wavefront coded element is often shown separate from the optics within an imaging system (e.g., element 210 separate from optics 201), these components may be combined as a single item or group of items without departing from the scope hereof, for example as shown in FIG. 24. The following claims are intended to cover all generic and specific features described herein, as well as all statements of the scope of the present method and system, which, as a matter of language, might be said to fall there between.

What is claimed is:

1. An optical imaging system, comprising:
   a wavefront coding element that codes a wavefront forming an optical image;
   a detector for converting the optical image to a data stream; and
   an image processor for processing the data stream with a reduced set filter kernel to reverse effects of wavefront coding and generate a final image, the reduced set filter kernel having coefficients consisting of sums and differences of power of two coefficients;
   wherein processing comprises utilizing the reduced set filter coefficients to reduce at least one of multipliers and partial product summations.

2. The optical imaging system of claim 1, the filter kernel being spatially complementary to a Point Spread Function (PSF) characterizing the optical imaging system in forming the optical image.

3. The optical imaging system of claim 1, a spatial frequency domain version of the filter kernel being complementary to a spatial frequency spectrum of the optical image.

4. The optical imaging system of claim 3, the wavefront coding element, detector and image processor cooperating such that the optical image is spatially correlated to mathematical processing of the data stream with the reduced set filter kernel.

5. The optical imaging system of claim 4, wherein a rotation of the filter kernel corresponds to like rotation of the wavefront coding element such that the optical image is spatially correlated to mathematical processing of the data stream with the reduced set filter kernel.

6. The optical imaging system of claim 1, the wavefront coded element comprising constant profile path optics.

7. The optical imaging system of claim 6, the reduced set filter kernel being complementary to a PSF resulting from phase modification of the wavefront through the constant profile path optics.

8. The optical imaging system of claim 1, the image processor implementing a filter tap, for each pixel, with logic consisting of a shifter.

9. The optical imaging system of claim 1, the image processor implementing a filter tap, for each pixel, with logic consisting of a shifter and an adder.

10. The optical imaging system of claim 1, the reduced set filter kernel consisting of a plurality of regions wherein coefficients in at least one of the regions have values of zero.

11. The method of claim 10, wherein processing comprises utilizing hardware that takes advantage of the reduced set filter coefficients to reduce at least one of multipliers and partial product summations.

12. The optical imaging system of claim 10, the wavefront coding element modifying the wavefront such that a PSF characterizing the optical imaging system spatially correlates to the regions of the reduced set filter kernel.

13. The optical imaging system of claim 1, the wavefront coding element having one of fourfold symmetry and fivefold symmetry.

14. The optical imaging system of claim 1, the reduced set filter kernel comprising a reduced set scaling filter kernel and a series of scaling taps.

15. The optical imaging system of claim 14, the image processor executing a single summation for any coefficient value of the filter kernel.

16. The optical imaging system of claim 1, the reduced set filter kernel being characterized by a weight matrix.

17. The optical imaging system of claim 1,
   wherein the detector comprises a color detector and
   the reduced set filter kernel comprises a color-specific filter kernel.

* * * * *

UNITED STATES PATENT AND TRADEMARK OFFICE
CERTIFICATE OF CORRECTION

| | | |
|---|---|---|
| PATENT NO. | : 7,995,853 B2 | Page 1 of 2 |
| APPLICATION NO. | : 11/929981 | |
| DATED | : August 9, 2011 | |
| INVENTOR(S) | : Dowski, Jr. et al. | |

It is certified that error appears in the above-identified patent and that said Letters Patent is hereby corrected as shown below:

Column 1, line 8, "owned and U.S." should read --owned and copending U.S.--;
Column 4, line 36, "FIG. 1; and" should read --FIG. 1;--;
Column 5, line 56, "are arranged" should read --and arranged--;
Column 6, line 32, "$2^N\}$" should read --$2^N\}$.--;
Column 10, line 21, "FIG." should read "FIGS."; line 39, "third and faith fourth" should read --third and fourth--;
Column 11, line 3, "II is similarly" should read --11 is similarly--; line 22, "forth" should read --fourth--; line 66, "may to prefer" should read --may prefer--;
Column 12, line 20, "may to prefer" should read --may prefer--; lines 26 and 27, "FIG." should read --FIGS.--;
Column 13, lines 16 and 51, "kernal" should read --kernel--; line 20, "then" should read --than--;
Column 19, line 40, "version" should read --versions--;
Column 21, lines 16-20,
"$D($ $\underline{b}) = b0 + b1(PathNumber) + b2(PathNumber)2 + b3(PathNumber)3 +$

...

PathNumber = 0, 1, 2, 3, ..."
should read --$D(b) = b0 + b1(PathNumber) + b2(PathNumber)2 + b3(PathNumber)3 + ...$
    PathNumber = 0, 1, 2, 3, ....--

Column 22, lines 1, 40 and 55, "then" should read --than--;
Column 24, lines 23-26,
"$D(y) = -1.8182 + 0.5170 y + 2.520 y^2 - 10.1659 y^3$, $0.25 < y < 1$ $= -1.8182, 0 < y < 0.25$."

should read

Signed and Sealed this
Twenty-ninth Day of May, 2012

David J. Kappos
*Director of the United States Patent and Trademark Office*

--$D(y) = -1.8182 + 0.5170\, y + 2.520\, y^2 - 10.1659\, y^3, \quad 0.25 < y < 1$ $= -1.8182, \quad 0 < y < 0.25.$--;

line 32, "then" should read --than--;

Column 25, line 16, "limited" should read --limiting--; line 33, "that that" should read --that--;